US011489428B2

(12) United States Patent
Brinkmann et al.

(10) Patent No.: US 11,489,428 B2
(45) Date of Patent: Nov. 1, 2022

(54) STATOR MODULE

(71) Applicant: Beckhoff Automation GmbH, Verl (DE)

(72) Inventors: Rolf Brinkmann, Bad Salzuflen (DE); Lukas Bentfeld, Delbrueck (DE); Uwe Pruessmeier, Lemgo (DE); Joerg Neufeld, Paderborn (DE)

(73) Assignee: Beckhoff Automation GmbH, Verl (DE)

( * ) Notice: Subject to any disclaimer, the term of this patent is extended or adjusted under 35 U.S.C. 154(b) by 320 days.

(21) Appl. No.: 16/894,169

(22) Filed: Jun. 5, 2020

(65) Prior Publication Data

US 2020/0304008 A1    Sep. 24, 2020

Related U.S. Application Data

(63) Continuation of application No. PCT/EP2018/085787, filed on Dec. 19, 2018.

(30) Foreign Application Priority Data

Dec. 27, 2017    (DE) ..................... 10 2017 131 314.1

(51) Int. Cl.
    *H02K 41/03*    (2006.01)
    *H02K 11/215*   (2016.01)
    (Continued)

(52) U.S. Cl.
    CPC ........... *H02K 41/031* (2013.01); *H02K 11/01* (2016.01); *H02K 11/215* (2016.01); *H02K 11/33* (2016.01);
    (Continued)

(58) Field of Classification Search
    CPC .... H02K 41/031; H02K 11/215; H02K 11/33; H02K 11/01; H02K 2201/18;
    (Continued)

(56) References Cited

U.S. PATENT DOCUMENTS

| 4,126,797 A | 11/1978 | Kling |
| 4,458,227 A | 7/1984 | Petersen |

(Continued)

FOREIGN PATENT DOCUMENTS

| CN | 102223121 A | 10/2011 |
| CN | 103036390 A | 4/2013 |

(Continued)

OTHER PUBLICATIONS

International Preliminary Report on Patentability dated Dec. 19, 2019 for International Patent Application No. PCT/EP2018/085787, 32 pages including English translation.

(Continued)

*Primary Examiner* — Alexander A Singh
(74) *Attorney, Agent, or Firm* — Dorsey & Whitney LLP

(57) ABSTRACT

A stator module for electromagnetically driving a rotor of a planar drive system comprises a connection module to provide drive energy. A power module has a current-generating unit to generate a drive current, which drives the rotor, from the drive energy. A stator unit has a coil conductor, to which the drive current can be applied, for generating a magnetic field which drives the rotor. A sensor module comprises a position-detecting unit to detect a position of the rotor over the sensor unit. The sensor module is arranged in a module housing. The stator unit and power module are arranged on a top side of the module housing and the connection module is arranged on a bottom side. The current-generating unit and the connection module are connected via a drive energy line. The drive energy line passes through the module housing in a manner electrically insulated from the sensor module.

16 Claims, 23 Drawing Sheets

(51) Int. Cl.
  *H02K 11/33* (2016.01)
  *H02K 11/01* (2016.01)
(52) U.S. Cl.
  CPC ......... *H02K 41/03* (2013.01); *H02K 2201/18* (2013.01); *H02K 2211/03* (2013.01)
(58) Field of Classification Search
  CPC .... H02K 2211/03; H02K 41/03; H02K 11/21; H02K 11/225; H02K 29/06; H02K 29/08; H02K 41/00; H02K 41/02; H02K 41/033; H02K 41/035; G01B 7/023
  USPC .......... 310/68 B, 12.01, 12.02, 12.03, 12.04, 310/12.05, 12.06, 12.19
  See application file for complete search history.

(56) References Cited

U.S. PATENT DOCUMENTS

| | | | |
|---|---|---|---|
| 6,226,073 | B1 | 5/2001 | Emoto |
| 6,353,273 | B1 | 3/2002 | Heshmat et al. |
| 9,202,719 | B2 | 12/2015 | Lu et al. |
| 10,116,195 | B2 | 10/2018 | Lu |
| 11,038,410 | B2 | 6/2021 | Brinkmann et al. |
| 2003/0192686 | A1 | 10/2003 | Hisai et al. |
| 2006/0220478 | A1 | 10/2006 | Emoto |
| 2010/0322606 | A1 | 12/2010 | Kurosawa |
| 2012/0098391 | A1* | 4/2012 | Yamasaki ............... H02K 9/227 310/68 D |
| 2012/0156898 | A1 | 6/2012 | Kallee |
| 2012/0307476 | A1* | 12/2012 | Masuzawa ............. H02K 11/33 361/816 |
| 2013/0164687 | A1 | 6/2013 | Binnard et al. |
| 2013/0278087 | A1 | 10/2013 | Kimiabeigi |
| 2014/0062236 | A1* | 3/2014 | Taniguchi ................ H02K 3/28 310/71 |
| 2014/0285122 | A1 | 9/2014 | Lu et al. |
| 2015/0369216 | A1 | 12/2015 | Kisovec |
| 2016/0099623 | A1 | 4/2016 | Böhm et al. |
| 2016/0241173 | A1 | 8/2016 | Prüssmeier et al. |
| 2016/0254722 | A1 | 9/2016 | Yamamoto et al. |
| 2017/0163140 | A1 | 6/2017 | Lu |
| 2017/0179805 | A1 | 6/2017 | Lu |
| 2017/0179806 | A1 | 6/2017 | Lu |
| 2018/0205304 | A1* | 7/2018 | Lu ........................... H02P 25/06 |
| 2018/0212505 | A1 | 7/2018 | Ding |
| 2020/0303997 | A1 | 9/2020 | Brinkmann et al. |
| 2020/0304007 | A1 | 9/2020 | Brinkmann et al. |
| 2020/0304009 | A1 | 9/2020 | Brinkmann et al. |
| 2020/0304010 | A1 | 9/2020 | Brinkmann et al. |
| 2020/0321846 | A1 | 10/2020 | Brinkmann et al. |
| 2021/0091621 | A1 | 3/2021 | Brinkmann et al. |
| 2021/0091622 | A1 | 3/2021 | Brinkmann et al. |
| 2021/0184612 | A1 | 6/2021 | Prüssmeier |
| 2022/0131426 | A1 | 4/2022 | Prüssmeier |

FOREIGN PATENT DOCUMENTS

| | | |
|---|---|---|
| DE | 10054376 A1 | 6/2001 |
| DE | 102018117981 A1 | 1/2020 |
| DE | 102019117430 A1 | 12/2020 |
| DE | 102019117431 A1 | 12/2020 |
| EP | 3107195 A1 | 12/2016 |
| JP | 2011193620 A | 9/2011 |
| WO | 2005004313 A1 | 1/2005 |
| WO | 2010150528 A1 | 12/2010 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |
| WO | 2020260566 A1 | 12/2020 |

OTHER PUBLICATIONS

Examination report dated Dec. 27, 2017 for German patent application No. 102017131314.1, 20 pages including English translation.
International Search Report and Written Opinion dated Apr. 9, 2019 for International Patent Application No. PCT/EP2018/085787, 29 pages including English translation.
First Office Action dated Feb. 24, 2021 in connection with Chinese Patent Application No. 201880089703.2, 9 pages including English translation.

* cited by examiner

STATOR MODULE

CROSS REFERENCE TO RELATED APPLICATIONS

This application is a continuation of International Patent Application PCT/EP2018/085787, filed Dec. 19, 2018, entitled STATOR MODULE, which claims priority to German Patent Application DE 10 2017 131 314.1, filed Dec. 27, 2017, entitled STATOR MODUL, each of which is incorporated by reference herein, in the entirety and for all purposes.

FIELD

The invention relates to a stator module for electromagnetically driving a motor of a planar drive system.

BACKGROUND

Planar drive systems are used, inter alia, in automation technology, in particular in manufacturing technology, handling technology and process technology. A movable element of an installation or machine can be moved or positioned in at least two linearly independent directions by a planar drive system. Planar drive systems can comprise a permanently excited electromagnetic planar motor, wherein the planar motor has a stator with a flat, planar surface and a rotor which is driven and moveable over the surface in at least two linearly independent directions.

The invention relates, in particular, to a planar drive system having an electromagnetic planar motor, in which the drive force on the rotor is generated by conductors which are arranged fixed in position on the stator and through which a drive current flows, and in which the magnetic field which is generated by the drive current interacts with drive magnets which are arranged on the rotor. In order to generate the drive current for moving the rotor, the stator generally has one or more current-generating units. In order to be able to transmit a sufficient amount of force to the rotor, drive currents with a high current intensity sometimes have to be generated. This can lead to high resistance losses in the conductors through which current flows and therefore to intense heating of the stator. The drive current is additionally generally generated in a pulsed manner as an alternating current. This can lead to high electromagnetic alternating fields which can disturb electronic components which are arranged on the stator.

In order to detect the position of the rotor above the stator, the planar drive system can comprise a position-detecting unit which is arranged on the stator and interacts with the rotor. An interaction of this kind can take place, for example, magnetically by magnetic field sensors and magnets which are arranged on the rotor. The interaction between the rotor and the position-detecting unit should be detected with as high a signal-to-noise ratio as possible for precisely determining the position of the rotor.

The planar stator of the drive system can comprise a stator module, which comprises a stator unit with the conductors through which current flows, and also electronic components for generating the drive current and for detecting the position of the rotor. The stator unit with the conductors through which the drive current flows is generally arranged on the top side of the stator module. The stator unit generally has a flat, that is to say planar, surface over which the rotor can be driven during operation. The electronic components for generating the drive current and for detecting the position of the rotor are generally arranged below the stator unit in the stator module.

Documents WO 2013/059934 A1, WO 2015/017933 A1, WO 2015/179962 A1, WO 2015/184553 A1, WO 2015/188281 A1, WO 2017/004716 A1 each describe a planar drive system (displacement devices) which comprises an electromagnetic planar motor with a permanently excited rotor and a stator with a plurality of conductors which can be energized.

SUMMARY

The present invention provides a stator module for an electric planar-drive system.

According to an aspect, a stator module for electromagnetically driving a rotor of a planar drive system comprises a connection module which is designed to provide drive energy. The stator module also comprises a power module which has a current-generating unit which is designed to generate a drive current, which drives the rotor, from the drive energy. The stator module comprises a stator unit which has a coil conductor, to which the drive current can be applied, for generating a magnetic field which drives the rotor. The stator module further comprises a sensor module which comprises a position-detecting unit which is designed to detect a position of the rotor over the sensor unit. The sensor module is arranged in a module housing and the module housing encloses the sensor module. The stator unit and the power module are arranged on a top side of the module housing and the connection module is arranged on a bottom side of the module housing, which bottom side is situated opposite the top side. The current-generating unit of the power module and the connection module are connected via a drive energy line for transmitting the provided drive energy. The drive energy line passes through the module housing and is designed in a manner electrically insulated from the sensor module in the module housing.

According to a further aspect, a stator module for electromagnetically driving a rotor of a planar drive system comprises a connection module which is designed to provide drive energy. The stator module also comprises a power module which has a current-generating unit which is designed to generate a drive current, which drives the rotor, from the drive energy. The stator module comprises a stator unit which has a coil conductor, to which the drive current can be applied, for generating a magnetic field which drives the rotor. The stator module comprises a sensor module which has a position-detecting unit which is designed to detect a position of the rotor over the sensor unit. The sensor module is arranged in a module housing and the module housing encloses the sensor module. The stator unit and the power module, which is arranged beneath the stator unit, are arranged on a top side on a housing cover of the module housing. The connection module is arranged on a bottom side on a housing base of the module housing, which bottom side is situated opposite the top side. The current-generating unit of the power module and the connection module are connected via a drive energy line for transmitting the provided drive energy. The drive energy line passes through the module housing, extends from the connection module, through the housing base, into the module housing, through a connecting cutout of the sensor module and through the housing cover, to the power module and is designed in a manner electrically insulated from the sensor module in the module housing.

EXAMPLES

A direct drive energy line between the connection module and the power module can be designed with a high degree of conductivity, so that only small resistive losses occur in the drive energy line. As a result, heating of the stator module in the case of large flows of current, in particular in the case of high drive currents, is prevented. In addition, it is not necessary for the drive energy to be passed across the sensor module when there is a direct connection between the power module and the connection module, and therefore heating of the sensor module in the case of high current intensities is also prevented. Additionally, heat loss, which is generated by the drive current in the stator unit on the top side of the housing, can be efficiently dissipated to the bottom side of the module housing via the module housing. As a result, the stator module can be cooled via the bottom side and no further cooling components are required on the top side of the stator module, which top side faces the rotor.

The position-detecting unit in the module housing is arranged below the power module and the stator unit. In the case of arrangement of the position-detecting unit beneath the power module and in the module housing, a minimum distance between the rotor and the position-detecting unit, which minimum distance may be required for reliably detecting the position of the rotor, can be maintained. In particular in the case of a position-detecting unit of which the sensors detect a magnetic field which is generated by magnets which are arranged on the rotor, arrangement of the position-detecting unit on the top side of the module housing or on the power module during operation of the planar drive system could lead to saturation of the sensors.

Since the connection module, the sensor module and the power module are arranged one behind the other or one above the other in a vertical direction which is oriented from the bottom side to the top side of the stator module, the module housing can additionally be designed in a particularly compact manner. The connection module, the sensor module and the power module can, in particular, each be designed as flat cuboids or plates which have a smaller extent in the vertical direction than in the horizontal directions which are oriented perpendicularly in relation to the vertical direction. For example, the connection module, the sensor module and the power module can each comprise printed circuit cards or printed circuit boards or circuit boards which are extended in the horizontal directions.

In the case of the stator module, the sensor module is also particularly effectively shielded against electromagnetic interference phenomena by the module housing. In particular, the module housing shields the sensor module and the position-detecting unit from magnetic fields which are caused by the drive current, which is generated on the power circuit boards, or by currents in the connection module. Since the drive energy line is passed from the connection module on the bottom side of the module housing, without electrical contact with the sensor module, through the module housing, to the power module on the top side of the module housing, the effects of interference fields, which are generated during transmission of the drive energy, on the sensor module are likewise kept low.

The module housing can comprise, for example, a metal, in particular aluminum, or can consist of a metal of this kind.

In a development of the stator module, the connection module is designed to provide the current-generating unit with operating energy for generating the drive current from the drive energy. The connection module and the current-generating unit are connected via an operating energy line for transmitting the provided operating energy. The operating energy line passes through the module housing and is designed in a manner electrically insulated from the sensor module in the module housing.

When the operating energy line is embodied as a direct connection between the connection module and the power module, the operating energy line can be designed with a high conductivity, so that only small resistive losses occur during the transmission of the operating energy. Energy for switching the current-generating unit, in particular a current for switching the current-generating unit, for instance a gate current for power transistors of the current-generating unit, can be provided, for example, by the operating energy. The currents for switching purposes can also be comparatively high particularly when switching high drive currents.

In a development of the stator module, the stator module is designed to provide supply energy for operating the position-detecting unit. The power module and the sensor module are connected to one another via a supply line for providing the supply energy. A portion of the supply line is passed from the power module, through the top side of the module housing, to the sensor module in the module housing.

For providing the supply energy, the entire supply line or else only portions of the supply line can carry the supply energy. In particular, for providing the supply energy, a first portion of the supply line can carry the operating energy and a second portion of the supply line can carry the supply energy. An energy-generating unit for generating the supply energy from the operating energy can be arranged between the first and the second portion of the supply line.

Since the supply line is passed from the power module to the sensor module, the stator module can be formed without a direct connection, in particular without a direct ground connection, between the connection module and the sensor module. As a result, ground loops in the stator module are avoided and electromagnetic interference phenomena on the sensor module can be reduced. Interference phenomena of this kind could occur, in particular, when the supply line is formed directly between the connection module and the sensor module and there is additionally a ground connection between the sensor module and the power module, which ground connection, together with a ground connection of the drive energy line between the power module and the connection module, forms a second ground connection between the connection module and the sensor module.

In a development of the stator module, the sensor module comprises a drive control unit which is designed to generate a control signal for controlling the current-generating unit. The drive control unit is connected to the current-generating unit of the power module via a control line, which is passed through the top side of the module housing, for transmitting the control signal. As a result, the control line can be of particularly short design and corruption of the control signal by electromagnetic fields can be avoided.

In a development of the stator module, the connection module is designed to be connected to an external data network. The sensor module has a position-processing unit which is designed to exchange an item of position information of the rotor, which item of position information is obtained from the position-detecting unit, via the external data network. The connection module and the external data network are connected to the position-processing unit of the sensor module via a data line for exchanging the item of position information. The data line is passed from the connection module, through the bottom side of the module housing, to the sensor module.

Since the stator module is connected to the external data network via the connection module which is arranged on the bottom side of the module housing, all connections for connecting the data network can be formed on a bottom side of the stator module, wherein the bottom side is situated opposite the top side of the stator module, which top side faces the rotor, in the vertical direction. As a result, contact can be made with the stator module in a simple manner. In addition, the connections are also still accessible when a plurality of the stator modules are arranged next to one another and adjoining one another.

A direct connection between the connection module and the sensor module by the data line renders it possible to keep the data line short and therefore to prevent interference with or influencing of the data transmission by electromagnetic interference fields. The data line can be DC-isolated from connection lines of the external data network. In so doing, an insulation unit can be arranged between the data line and the connection lines of the external data network, which insulation unit, for example by a transmitter, provides an electrically insulated connection for exchanging the item of position information. The insulation unit can be arranged, for example, on the connection module. The data line can be designed as part of the external data network. In particular, the same signal coding and/or the same network protocol can be used for data transmission via the data line as for data transmission via the external data network. The position-processing unit can be designed, for example, to exchange the item of position information with a superordinate control unit for the planar drive system via the data network.

In a development of the stator module, the drive control unit is designed to exchange control data for actuating the current-generating unit via the data line and the external data network. In this case, the drive control unit and the position-processing unit are designed to communicate via the external data network as independent communication subscribers in each case. Logic isolation between the drive control unit and the position-processing unit is achieved in this way. In particular, the drive control unit and the position-processing unit can be designed as isolated units, for instance as isolated integrated circuits. This renders it possible to realize the drive control unit and the position-processing unit by simple integrated components. The drive control unit can be designed, for example, to exchange the control data with a superordinate control unit for the planar drive system via the data network.

A development of the stator module comprises an intermediate circuit in order to provide the drive energy as DC voltage by an intermediate circuit voltage. The current-generating unit is connected to the intermediate circuit and is designed to generate the drive current from the intermediate circuit voltage as an inverter. The intermediate circuit is arranged on the power module, the drive energy line and the connection module.

Therefore, a DC voltage or a direct current can be used for transmitting the drive energy via the drive energy line. This reduces the magnetic fields which are generated by the drive energy line, in particular the generated magnetic alternating fields, and reduces dielectric losses which occur during the transmission of the drive energy. In addition, the magnetic fields which are generated by the DC voltage intermediate circuit can cause less electromagnetic interference phenomena than electromagnetic alternating fields.

In a development of the stator module, the connection module comprises a conversion unit which is connected to the intermediate circuit and is designed to generate the intermediate circuit voltage from electrical supply energy, which is provided via an external energy supply line, as a rectifier. This allows a direct connection of the stator module to an AC voltage supply, for example to a conventional AC power supply system, in particular to a low-voltage power supply system.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The invention relates substantially to further developments of the planar drive systems which are disclosed in publications WO 2013/059934 A1, WO 2015/017933 A1, WO 2015/179962 A1, WO 2015/184553 A1, WO 2015/188281 A1 and WO 2017/004716 A1. The disclosure content of said documents is also incorporated in full in the subject matter of the present description by reference.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1:
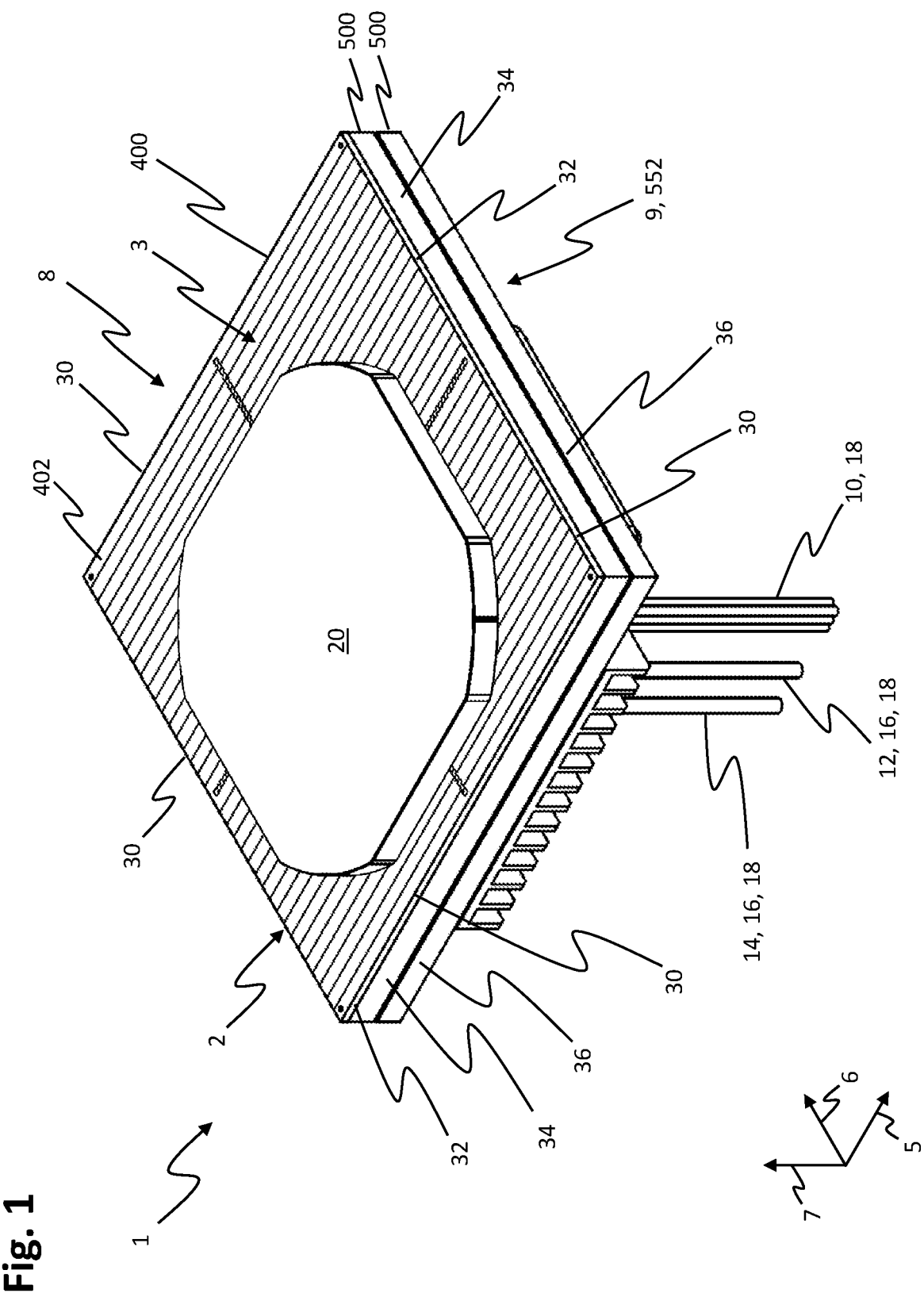
FIG. 1 shows a planar drive system comprising a stator module.

FIG. 1 shows a planar drive system 1 comprising a stator module 2 and a rotor 20. The stator module 2 comprises a module housing 500 and a stator unit 400. The stator module 2 has a top side 8 and a bottom side 9. The stator unit 400 is arranged above the module housing 500 in a vertical direction 7 which is oriented from the bottom side 9 to the top side 8 and on the top side 8 of the stator module 2. The stator unit 400 is designed as a planar stator and has a flat, that is to say planar, stator surface 3 on the top side 8 of the stator module 2. At the same time, the stator surface 3 forms a surface of the stator module 2.

The stator surface 3 is oriented perpendicularly in relation to the vertical direction 7 and extends over the entire top side 8 of the stator unit 400 and of the stator module 2. The stator unit 400 comprises at least one coil conductor 402, to which a drive current can be applied, on the stator surface 3. The stator unit 400 can, as illustrated, have a plurality of coil conductors 402 on the stator surface 3. A drive current can be applied to each of the coil conductors 402. A magnetic field which drives the rotor 20 in interaction with drive magnets of the rotor 20 can be generated by the drive currents in the coil conductors 402. The rotor 20 and the stator unit 400 with the coil conductors 402 through which current flows form an electromagnetic planar motor.

During operation, the rotor 20 is arranged such that it can move over the stator surface 3 of the stator module 2 and can be driven both in a first direction 5 and also in a second direction 6 during operation. The first direction 5 and the second direction 6 are linearly independent. In particular, the first direction 5 and the second direction 6 can be oriented perpendicularly in relation to one another, as illustrated in FIG. 1. The first direction 5 and the second direction 6 are in each case oriented parallel in relation to the stator surface 3 and perpendicularly in relation to the vertical direction 7. Since the rotor 20 can be driven in the first direction 5 and also in the second direction 6 at the same time, it can be driven over the stator surface 3 in any desired direction. The rotor 20 can be held in a floating manner above the stator surface 3 during operation, for example owing to magnetic interaction between the drive magnets and suitable drive currents in the coil conductors 402. In addition to driving the rotor 20 in the first and the second direction 5, 6, driving in the third, vertical direction 7 is also possible.

The stator surface 3 is of rectangular design. In particular, the stator surface 3 can be of square design, as illustrated. The stator surface 3 is delimited by four outer edges 30 which are straight in each case. In each case two outer edges 30 which are situated opposite one another are oriented parallel in relation to the first direction 5, and two further outer edges 30 which are situated opposite one another are oriented parallel in relation to the second direction 6.

An extent of the stator unit 400 in the vertical direction 7 is smaller than an extent of the stator unit 400 in the first and the second direction 5, 6. The stator unit 400 therefore forms a flat cuboid which is extended in the first and the second direction 5, 6 or a plate which is extended in the first and the second direction 5, 6. The stator unit 400 has, between the stator surface 3 and a bottom side of the stator unit 400, which bottom side is situated opposite the stator surface 3, four in each case flat side surfaces 32 which terminate flush with the outer edges 30 of the stator surface 3 on the stator surface 3. The side surfaces 32 of the stator unit 400 are oriented perpendicularly in relation to the stator surface 3.

Like the stator surface 3 and the stator unit 400, the module 500 is of rectangular design in a plan view of the stator surface 3. In particular, the module housing 500 is of square design in the plan view of the stator surface 3. The module housing 500 is designed as a flat cuboid or as a plate, wherein the extent of the module housing 500 in the vertical direction 7 is smaller than in the first and the second direction 5, 6. A top side of the module housing 500, which top side faces the stator unit 400, is arranged so as to adjoin the bottom side of the stator unit 400. The stator unit 400 and the module housing 500 have substantially the same dimensions in the first and the second direction 5, 6.

The module housing 500 has, between the top side of the module housing 500, which top side faces the stator unit 400, and a bottom side 552 of the module housing 500, which bottom side is situated opposite the top side, four in each case flat side surfaces 34. The side surfaces 34 of the module housing 500 can be oriented perpendicularly in relation to the stator surface 3, as illustrated. The side surfaces 34 of the module housing 500 can be oriented in alignment with the side surfaces 32 of the stator unit 400 and adjoin the side surfaces 32 of the stator unit 400. In an alternative embodiment of the stator module 2, the side surfaces 34 of the module housing 500 can also be arranged in a manner recessed into the interior of the stator module 2 in relation to the side surfaces 32 of the stator unit 400. In a further alternative embodiment, the side surfaces 34 can also be arranged in a manner adjoining the side surfaces 32 of the stator unit 400 on the top side of the module housing 500 and taper counter to the vertical direction 7 toward the bottom side 552 of the module housing 500 in the direction of the interior of the stator module 2.

The stator module 2 is of rectangular design in a plan view of the stator surface 3. The stator module 2 has four in each case flat side surfaces 36 between the stator surface 3 which is arranged on the top side 8 of the stator module 2 and the bottom side 9 which is situated opposite the top side 8. The side surfaces 36 of the stator module 2 are formed by the side surfaces 32 of the stator unit 400 in the region of the stator unit 400 and by the side surfaces 34 of the module housing 500 in the region of the module housing 500.

The side surfaces 36 of the stator module 2 therefore terminate with the outer edges 30 of the stator surface 3 on the stator surface 3 and the outer edges 30 of the stator surface 3 form outer edges of the stator module 2 on the stator surface 3 at the same time. In particular, the stator surface 3 extends in the first direction 5 and in the second direction 6 in each case between two of the side surfaces 36 of the stator module 2 and the outer edges 30 delimit the extent of the stator surface 3, the stator unit 400 and the stator module 2 at the side surfaces 36 of the stator module 2 in the first direction 5 and in the second direction 6.

The side surfaces 36 of the stator module 2 can each be oriented perpendicularly in relation to the stator surface 3, as illustrated. In alternative embodiments of the stator module 2, the side surfaces 36 of the stator module 2 can also be recessed in the direction of the interior of the stator module 2 or taper from the top side 8 toward the bottom side 9 in the direction of the interior of the stator module 2 in the region of the module housing 500.

Whereas the stator module 2 is of flat design on its surface which is formed by the stator surface 3, the stator module 2 can be of non-flat or uneven design on the bottom side 9 which is situated opposite the stator surface 3. In particular, further components can be arranged on the module housing 500 or the stator module 2 on the bottom side 9 of the stator module 2 or on the bottom side 552 of the module housing 500. These further components extend in the first direction 5 or in the second direction 6 at most as far as the outer edges 30 of the stator unit 3, so that the further components do not protrude beyond the outer edges 30 in the first or the second direction 5, 6.

Connections for connecting the stator module 2 to a plurality of connection lines 18 are arranged on the bottom side 552 of the module housing 500. The connection lines 18 can comprise, for example, an input line 12 of a data network 16, an output line 14 of the data network 16 and an energy supply line 10 for supplying the stator module 2 with electrical energy, as illustrated. In particular, electrical energy for generating the drive currents can be supplied to the stator module 2 via the energy supply line 10. The electrical energy which is supplied via the energy supply line 10 can also be used for generating operating energy and/or supply energy of electronic components of the stator module 2.

The stator surface 3 can have an extent of between 100 mm and 500 mm, in particular of between 120 mmm and 350 mm, in particular of 240 mm, in the first direction 5. The stator surface 3 can have an extent of between 100 mm and 500 mm, in particular of between 120 mm and 350 mm, in particular of 240 mm, in the second direction 6. The stator module 2 can have an extent of between 10 mm and 100 mm, in particular of between 15 mm and 60 mm, in particular of 30 mm, in the vertical direction 7. The module housing 500 can have an extent of between 8 mm and 80 mm, in particular of between 13 mm and 55 mm, in particular of 26.6 mm, in the vertical direction 7. The module housing 500 can have the same extent as the stator surface 3 in the first and/or the second direction 5, 6.

Several instances of the stator module 2 can be arranged next to one another in such a way that the outer edges 30 of adjacent stator modules 2 lie against one another and the stator surfaces 3 of the stator modules 2 form a continuous working surface over which the rotor 20 can be moved without interruption. Since the side surfaces 36 of the stator module 2 terminate flush with the stator surface 3 at the outer edges 30, the stator surfaces 3 of two stator modules 2 which are arranged next to one another can be arranged in a manner virtually seamlessly adjoining one another by way of the stator modules 2 being arranged with side surfaces 32 of the stator units 400 lying against one another or outer edges 30 of the stator surfaces 3 lying against one another.

Figure 2:
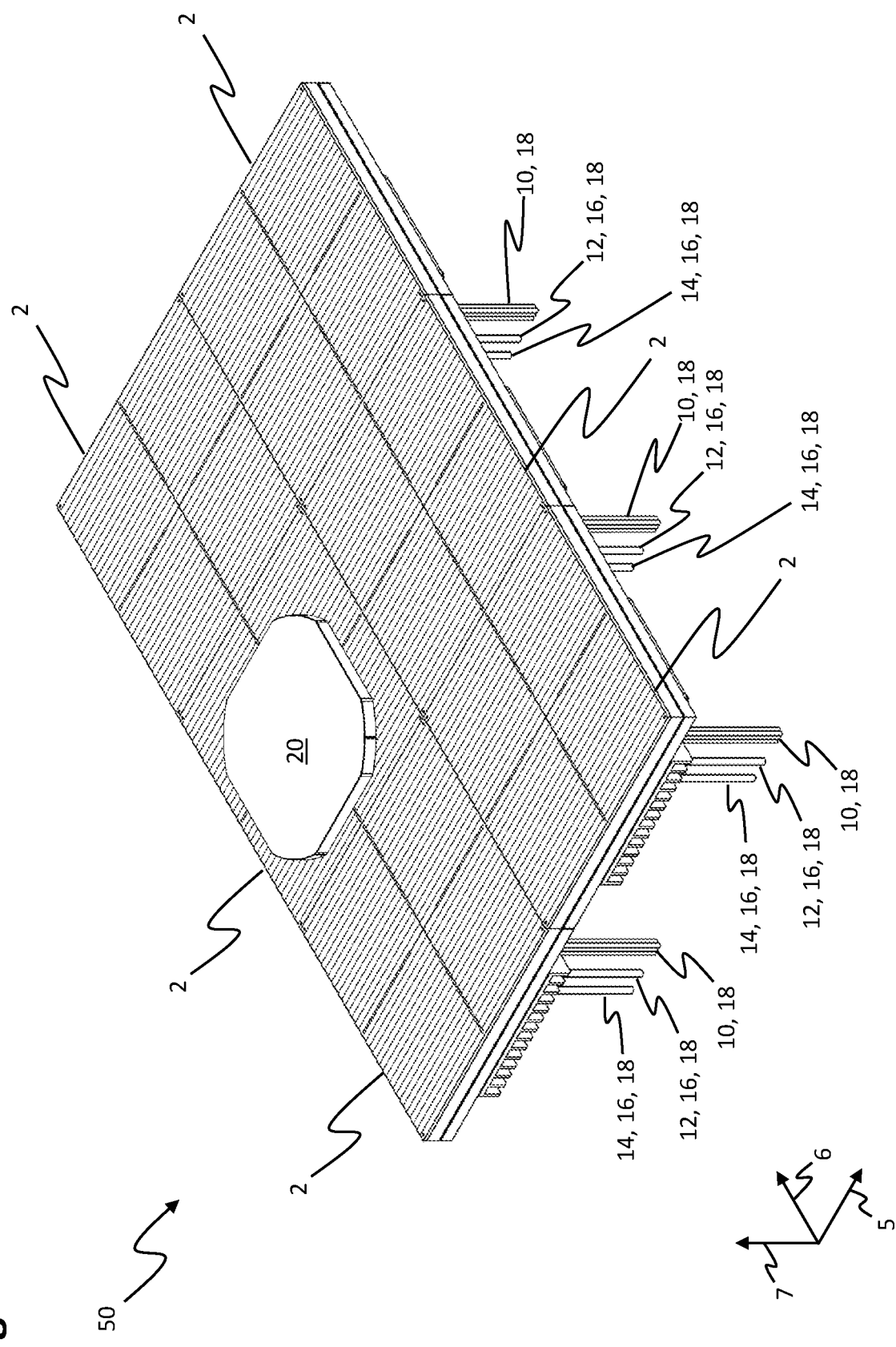
FIG. 2 shows a further planar drive system comprising a plurality of stator modules.

FIG. 2 shows a view of a further planar drive system 50 with six stator modules 2 which are arranged next to one another. The stator modules 2 are designed like the stator module 2 which is illustrated in FIG. 1. The stator modules 2 are arranged next to one another in two first rows which lie next to one another in the first direction 5 and are extended along the second direction 6 and in three second rows or columns which lie next to one another in the second direction 6 and are extended along the first direction 5. Adjacent stator modules 2 are in each case arranged in a manner adjoining one another in such a way that the outer edges 30 of the stator surfaces 3 of adjacent stator modules 2 lie against one another. As a result, the stator surfaces 3 of the stator modules 2 form a continuous, planar working surface for the rotor 20. The rotor 20 can be moved seamlessly from the stator surface 3 of one of the stator modules 2 to the or over the stator surface 3 of the adjacent stator module 2.

The stator modules 2 can be connected via the data network 16 in order to exchange data for operating the planar drive system 50, with one another. In addition, the stator modules 2 can be connected to a central control unit via the data network 16. The central control unit can be designed to provide control data for moving the rotor via the data network 16. The stator modules 2 can be connected, in particular in series, to the data network 16. In so doing, the output line 14 of a stator module 2 can be connected to the input line 12 of an adjacently arranged stator module 2 in each case. In this way, for example, the stator modules 2 in the first or second rows can be connected to one another in series. In addition, in each case the last stator modules 2 of adjacent first and, respectively, second rows can be connected to one another at the ends of the first and, respectively, second rows via the data network 16.

The stator modules 2 can be connected to the energy supply line 10 in series. In particular, the stator modules 2 in the first or second rows can be connected in series to the energy supply line 10. In addition, in each case the last stator modules 2 of adjacent first and, respectively, second rows can be connected to one another at the ends of the first and, respectively, second rows via the energy supply line 10.

The stator modules 2 can be joined, in principle, to planar drive systems of any desired size in the first and second direction 5, 6. Control signals and/or energy can be supplied to each of the stator modules 2 via the connection lines 18.

In alternative embodiments of the further planar drive system 50, the stator modules 2 can also be connected in star to a central energy supply device and/or a central control unit via respectively dedicated connection lines 18.

Alternative embodiments of the stator modules 2 can also have electrical connecting elements by which control signals and/or electrical energy can be transmitted from one stator module 2 to the adjacent stator module 2. The electrical connecting elements can be designed in such a way that a data and/or electrical connection between adjacently arranged stator modules 2 can be established when the stator modules 2 are arranged adjacently. Connecting elements of this kind can be arranged, for example, on the side surfaces 36 of the stator modules 2. The connecting elements can be designed, for example, as plug-in connectors or as contact surfaces. The connecting elements can comprise the energy supply line 10 and/or the input line 12 of the data network 16 and/or the output line 14 of the data network 16.

In the case of the planar drive system 1 or the further planar drive system 50, further network subscribers can be connected to the data network 16, in addition to the stator modules 2. The further network subscribers can be designed, for example, as input units for reading in sensor signals and/or as output units for outputting control signals. The sensor signals can be read in by sensors which are arranged on the planar drive systems 1, 50 or on machines which the planar drive systems 1, 50 comprising. The control signals can be output to actuators which are arranged on the planar drive systems 1, 50 or on machines which the planar drive systems 1, 50 comprise.

Figure 3:
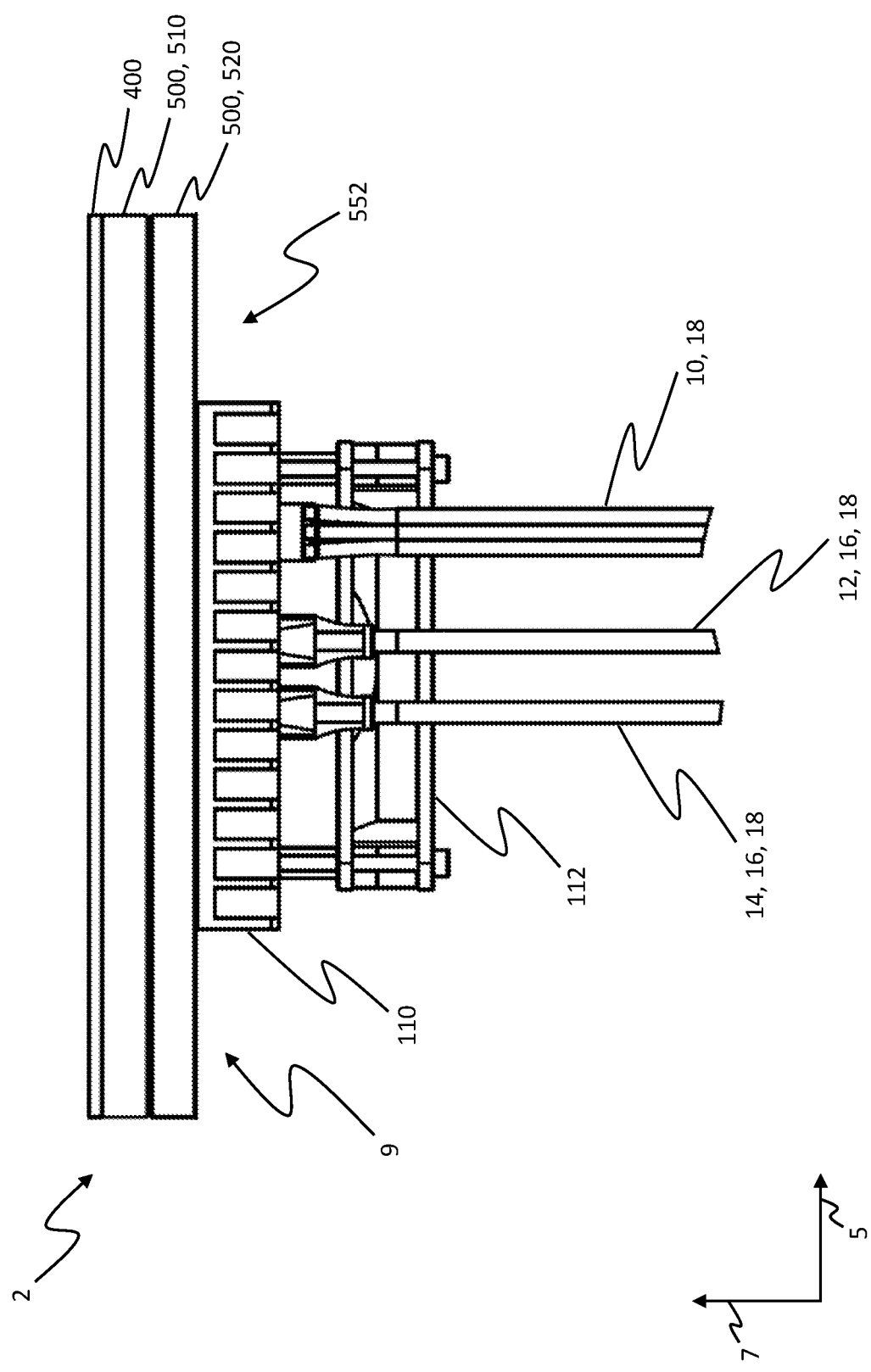
FIG. 3 shows a side view of the stator module from FIG. 1.

FIG. 3 shows a side view of the stator module 2. The module housing 500 comprises a housing cover 510 and a housing base 520. The housing cover 510 is arranged above the housing base 520 in the vertical direction 7. A top side of the housing base 520 is arranged in a manner facing a bottom side of the housing cover 510. The stator unit 400 with the coil conductors 402 is arranged on a top side of the housing cover 510. A bottom side of the housing base 520 forms the bottom side 552 of the module housing 500.

A module covering 110 is arranged on the bottom side of the housing base 520, wherein a top side of the module covering 110 is arranged in a manner facing the bottom side of the housing base 520. The module covering 110 encloses an installation space, which is located on the bottom side of the housing base 520, for a connection module of the stator module 2. The energy supply line 10 and the input and the output line 12, 14 of the data network 16 make contact with the stator module 2 on a bottom side of the module covering 110. A fan 112 can be arranged on the bottom side 552 of the module housing 500 or on the bottom side of the module covering 110, as illustrated in FIG. 3, in order to cool the bottom side 9 of the stator module 2 and the bottom side of the module covering 110.

Figure 4:
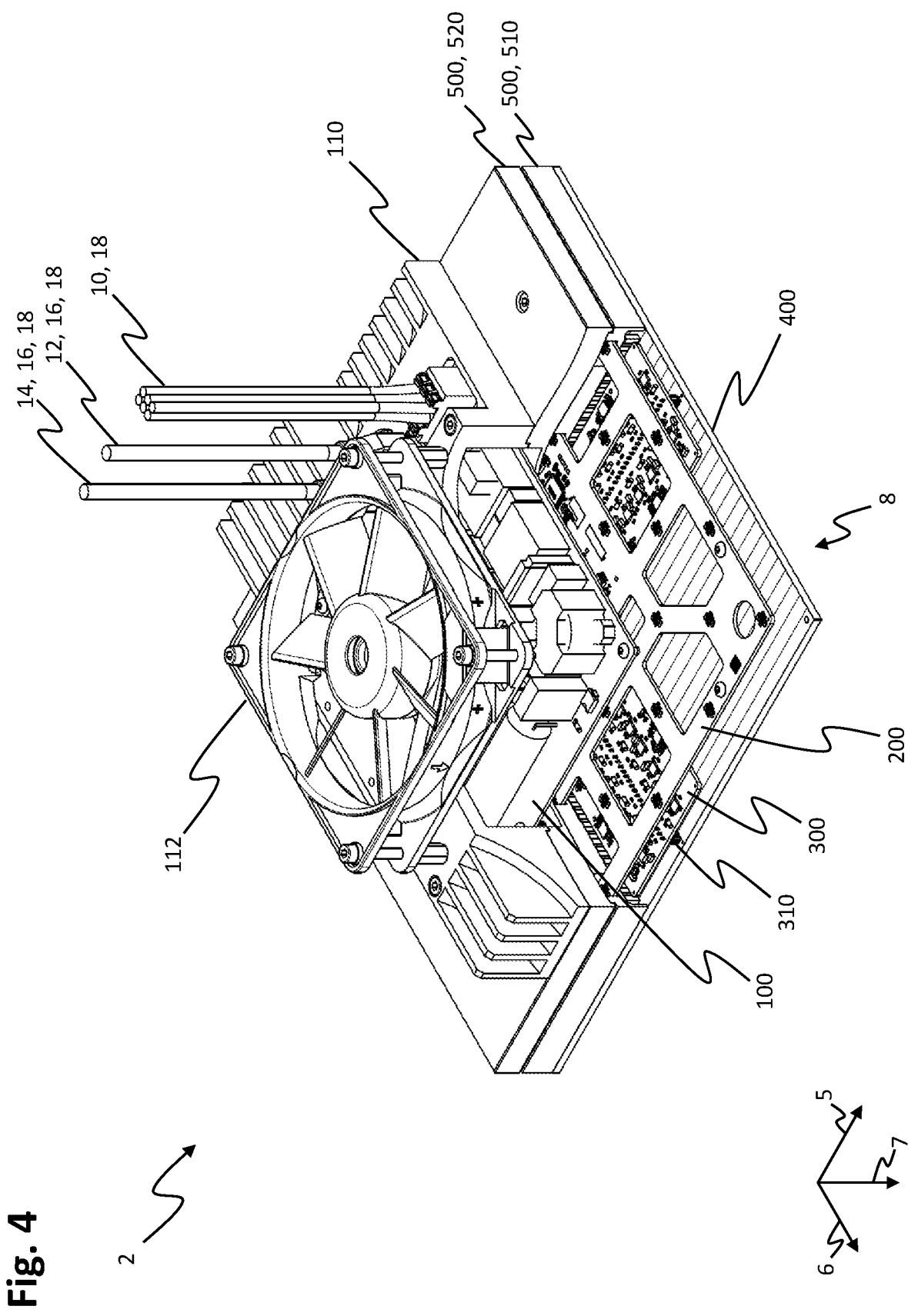
FIG. 4 shows a partially sectioned perspective view of the stator module from below.
Figure 5:
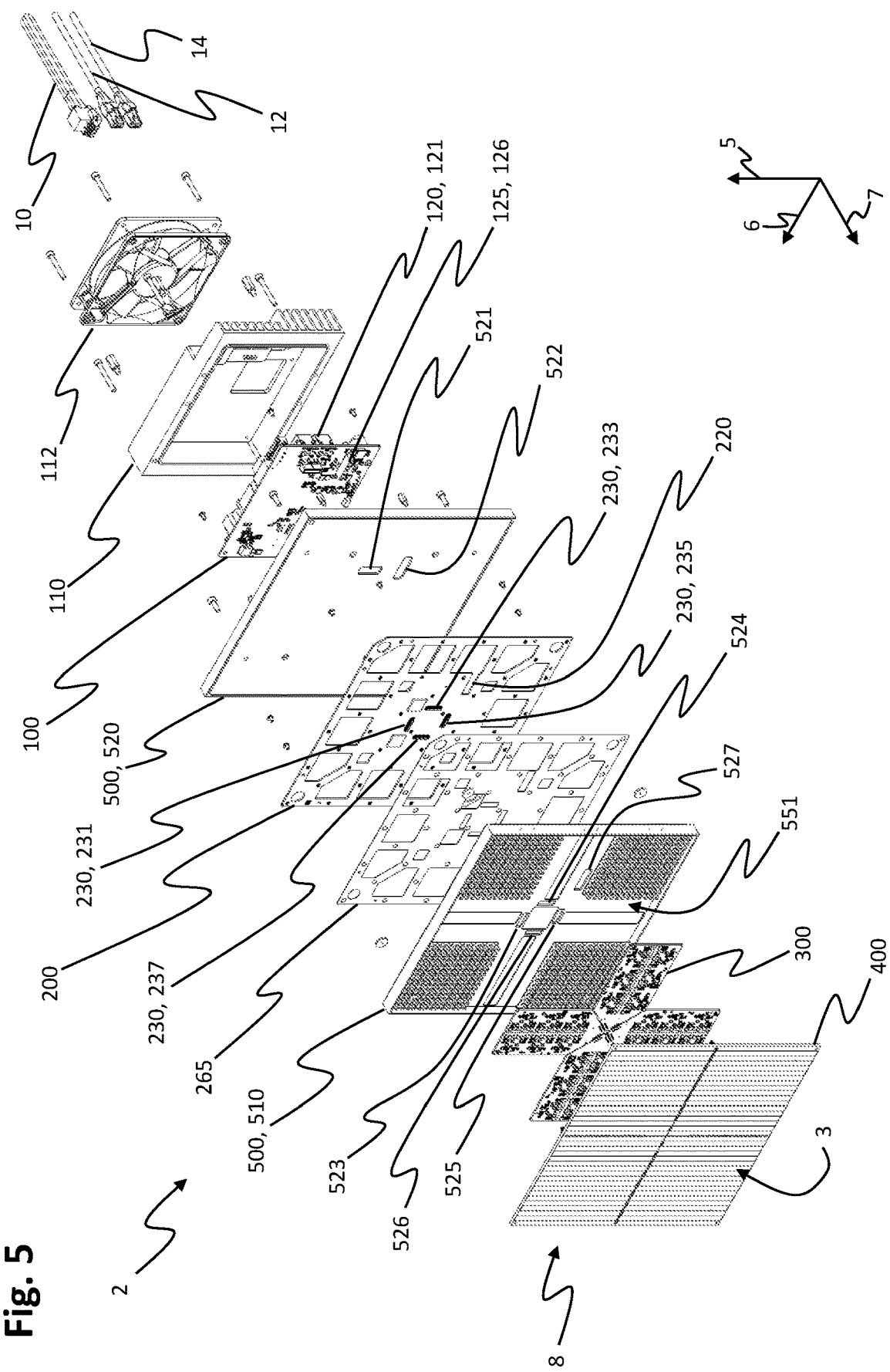
FIG. 5 shows a perspective exploded view of the stator module from above.
Figure 6:
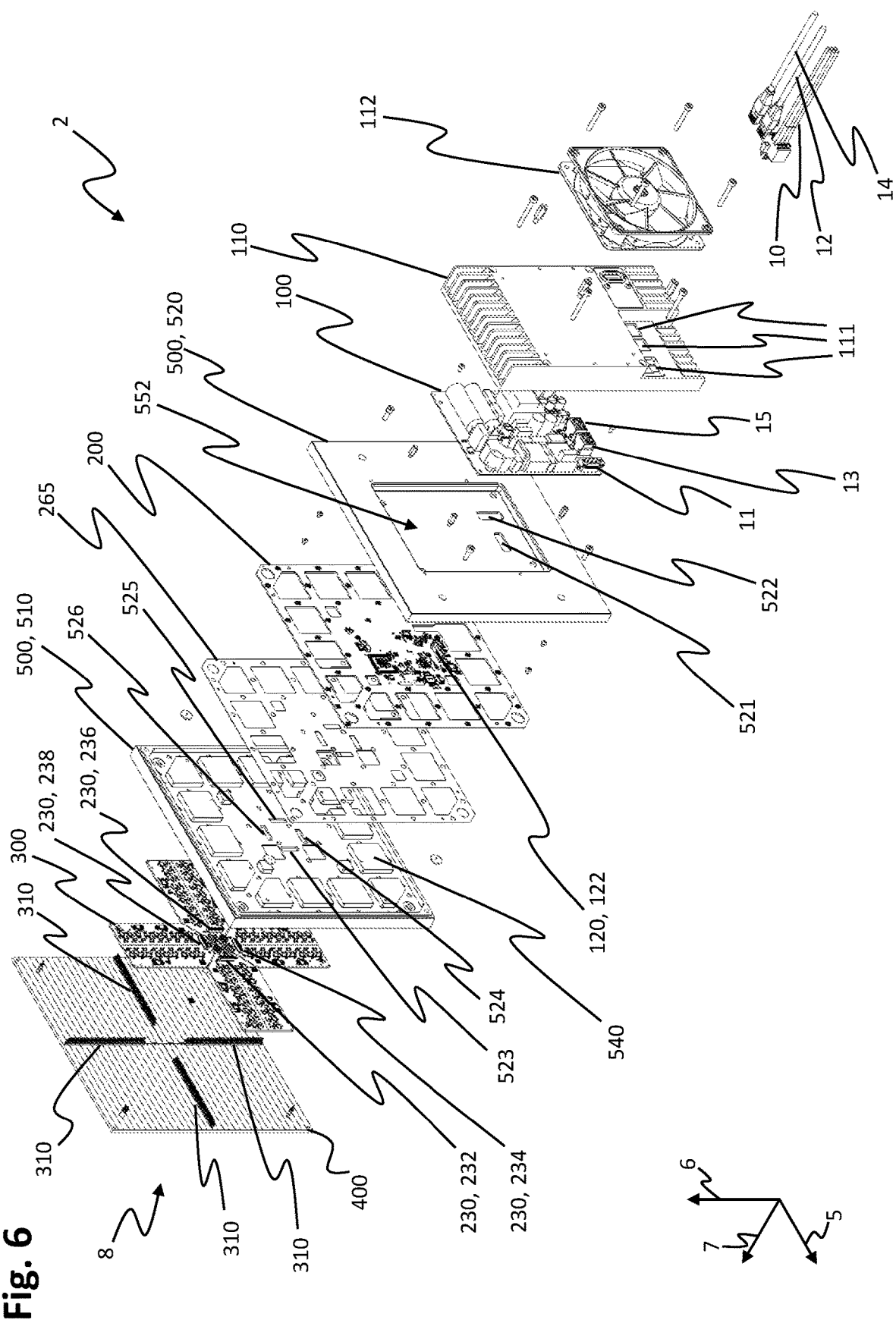
FIG. 6 shows a perspective exploded view of the stator module from below.

FIG. 4 shows a partially sectioned perspective view of the stator module 2 from below. FIG. 5 shows a perspective exploded view of the stator module 2 from above, wherein, inter alia, the top sides of the components or modules which are comprised by the stator module 2 can be seen in each case. FIG. 6 shows a perspective exploded view of the stator module 2 from below, wherein, inter alia, the bottom sides of the components or modules which are comprised by the stator module 2 can be seen in each case. The components or modules of the stator module 2 are each oriented in such a way that the vertical direction 7 is oriented from the bottom side to the top side of the individual components or modules in each case. In order to avoid repetition, the following description relates to all three FIGS. 4, 5 and 6, without reference specifically being made to the respective figure once again.

The stator unit 400, which once again has the stator surface 3 on its top side, is arranged on the top side 8 of the stator module 2. A power module 300 is arranged below the stator unit 400 in the vertical direction 7. The power module 300 is arranged on the bottom side of the stator unit 400 and the stator unit 400 is arranged on a top side of the power module 300. The housing cover 510 of the module housing 500 is arranged below the power module 300 in the vertical direction 7. The housing cover 510 and the module housing 500 are arranged on a bottom side of the power module 300. The power module 300 is arranged on the top side 551 of the housing cover 510 and of the module housing 500. The power module 300 is partially enclosed by the housing cover 510 on the top side 551 of the housing cover 510. In particular, the power module 300 is enclosed by the housing cover 510 in the first direction 5 and in the second direction 6. As a result, the power module 300 is embedded into the housing cover 510 on the top side 551 of the housing cover 510.

A sensor module 200 is arranged below the housing cover 510 in the vertical direction 7. The sensor module 200 is arranged on the bottom side of the housing cover 510 and the housing cover 510 is arranged on a top side of the sensor module 200. In particular, the sensor module 200 is arranged in a cutout which is formed on the bottom side of the housing cover 510. The sensor module 200 is enclosed by the housing cover 510, in particular by a border of the housing cover 510 which surrounds the cutout, on the side surfaces 34 of the module housing 500.

An insulation layer 265 is arranged between the bottom side of the housing cover 510 and the top side of the sensor module 200. The insulation layer 265 is designed to electrically insulate the sensor module 200 from the housing cover 510. The insulation layer 265 can be designed as a thin, electrically insulating film. The insulation layer 265 can bear both against the top side of the sensor module 200 and also against the bottom side of the housing cover 510 when the module housing 500 is closed.

The housing base 520 is arranged below the sensor module 200 in the vertical direction 7. The housing base 520 is arranged on a bottom side of the sensor module 200 and the sensor module 200 is arranged on the top side of the housing base 520. The housing base 520 bears against the housing cover 510 on the bottom side of the housing cover 510 and covers the cutout which is formed on the bottom side of the housing cover 510. The module housing 500 which is formed by the housing cover 510 and the housing base 520 therefore encloses the sensor module 200 both laterally and also at its top and bottom side. The sensor module 200 is arranged in the interior of the module housing 500. In other embodiments of the module housing 500, the housing base 520 can also have a cutout, in which the sensor module 200 is arranged, on its top side. In this case, the housing cover 510 can additionally be designed without a cutout on its bottom side, so that the housing cover 510 only covers the cutout on the top side of the housing base 520.

The connection module 100 is arranged below the housing base 520 in the vertical direction 7. The connection module 100 is arranged on the bottom side 552 of the housing base 520 and of the module housing 500. The housing base 520 is arranged on a top side of the connection module 100. A cutout, which forms an installation space for arranging the connection module 100, is formed in the housing base 520 on the bottom side 552 of the housing base 520. The connection module 100 is at least partially arranged in the installation space. The connection module 100 can be fastened to the bottom side 552 of the housing 520 by fasteners, for instance screws.

The connection module 100 is surrounded by a module covering 110 which is arranged on the bottom side 552 of the housing base 520. A top side of the module covering 110 is arranged in a manner facing the bottom side of the housing base 520. A cutout, which at least partially surrounds the connection module 100, is formed on the top side of the module covering 110. A border of the module covering 110, which border surrounds the cutout in the top side of the module covering 110, bears against the housing base 520 on the bottom side 552 of the housing base 520 and surrounds the installation space which is formed on the bottom side 552 of the housing base 520. The installation space and the connection module 100 which is arranged in the installation space are therefore covered by the module covering 110.

In an alternative embodiment of the stator module 2, the bottom side 552 of the housing base 520 can also be of flat design and not have a cutout. In this case, the connection module 100 can be fully arranged in the cutout which is formed on the top side of the module covering 110 and in the installation space which is formed by the cutout. In a further alternative embodiment of the stator module 2, the connection module 100 can also be fully arranged in the cutout which is formed in the bottom side 552 of the housing base 520 and in the installation space which is formed by this cutout. The top side of the module covering 110 can be of flat design, in particular without the cutout, and cover the cutout in the bottom side 552 of the housing base 520. In this case, the module covering 110 can be designed as a plate.

The fan 112 is arranged on a bottom side of the module covering 110. Spacers can be arranged between the fan 112 and the module covering 110, as illustrated in FIGS. 5 and 6, in order to arrange the fan 112 at a distance from the module covering 110. The spacers can be designed, for example, as screw bolts.

The module housing 500 comprising the housing cover 510 and/or the housing base 520 and/or the module covering 110 can contain a metal, in particular steel, for instance non-magnetic stainless steel or aluminum, or can consist of a metal of this kind.

The further components which are provided with reference symbols and are illustrated in FIGS. 4, 5 and 6 will be discussed in greater detail within the scope of the further description, and therefore this can be dispensed with at this point in order to avoid repetition.

Figure 7:
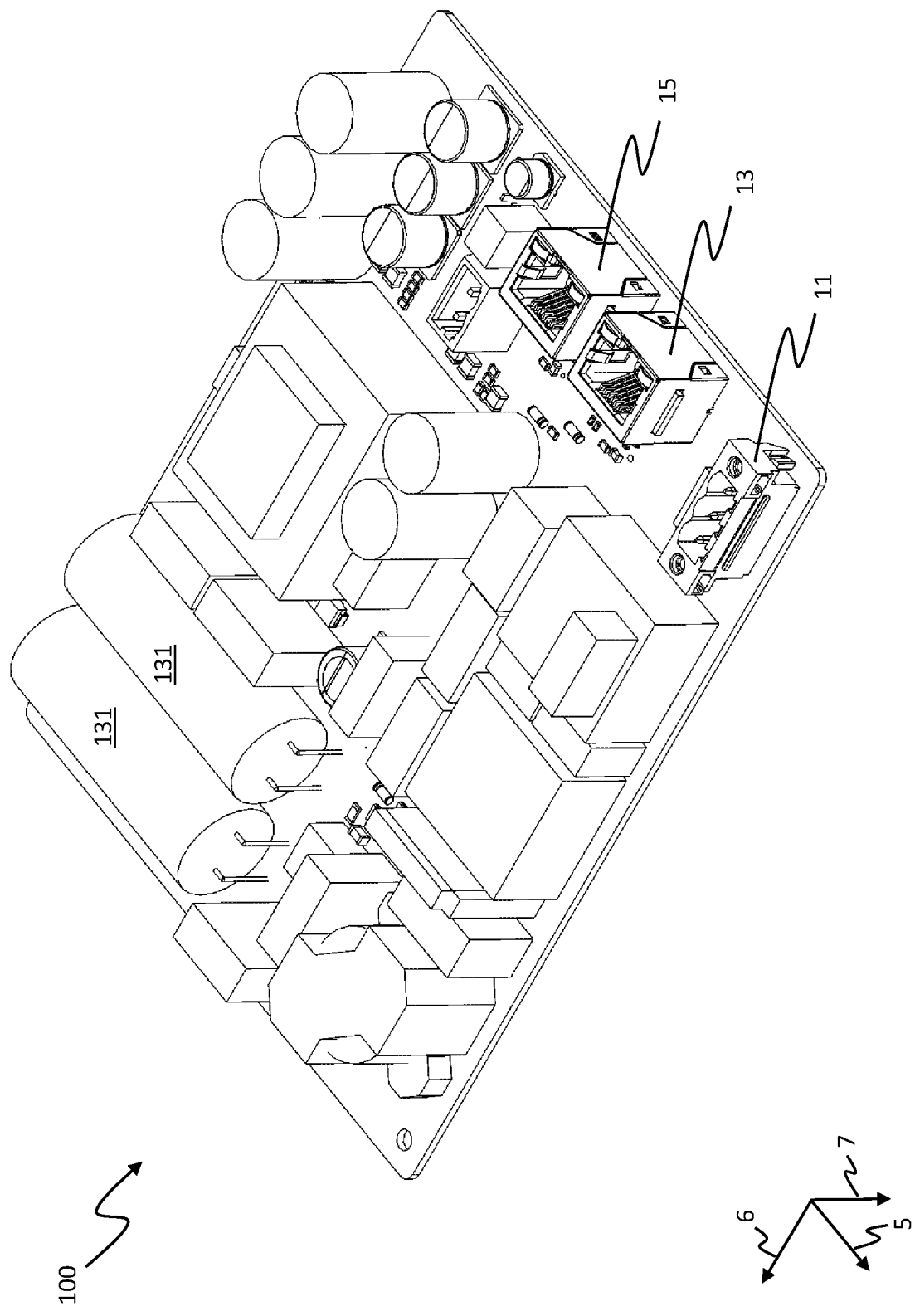
FIG. 7 shows a perspective view of the bottom side of a connection module of the stator module.

FIG. 7 shows a schematic perspective illustration of the bottom side of the connection module 100. The connection module 100 is designed as a plate of which the extent in the vertical direction 7 is smaller than in the first and the second direction 5, 6. The connection module 100 can be designed, for example, as a printed circuit board, which is populated with electronic parts, and contain an insulating material. The connection module 100 has a substantially rectangular shape in the plane which is spanned by the first and the second direction 5, 6. The connection module 100 comprises electronic parts which are arranged on its bottom side. In addition, a first connection 11 for connecting the energy supply line 10, a second connection 13 for connecting the input line 12 of the data network 16 and a third connection 15 for connecting the output line 14 of the data network 16 to the connection module 100 are arranged on the bottom side.

The connection 11, 13, 15 are designed to establish electrical contact between the connection lines 18 and the connection module 100. The connection 11, 13, 15 can be designed as elements of a plug-in connection, in particular as jacks, as illustrated. The second connection 13 and the third connection 15 can be designed as network jacks, in particular as RJ 45 jacks. The connection 11, 13, 15 are each accessible from outside the stator module 2 via apertures 111 which are formed in the module covering 110 on the bottom side of the module covering 110 and are illustrated in FIG. 6. The connection 11, 13, 15 are each arranged on the connection module 100 in such a way that they lie above the apertures 111 in the vertical direction 7.

Figure 8:
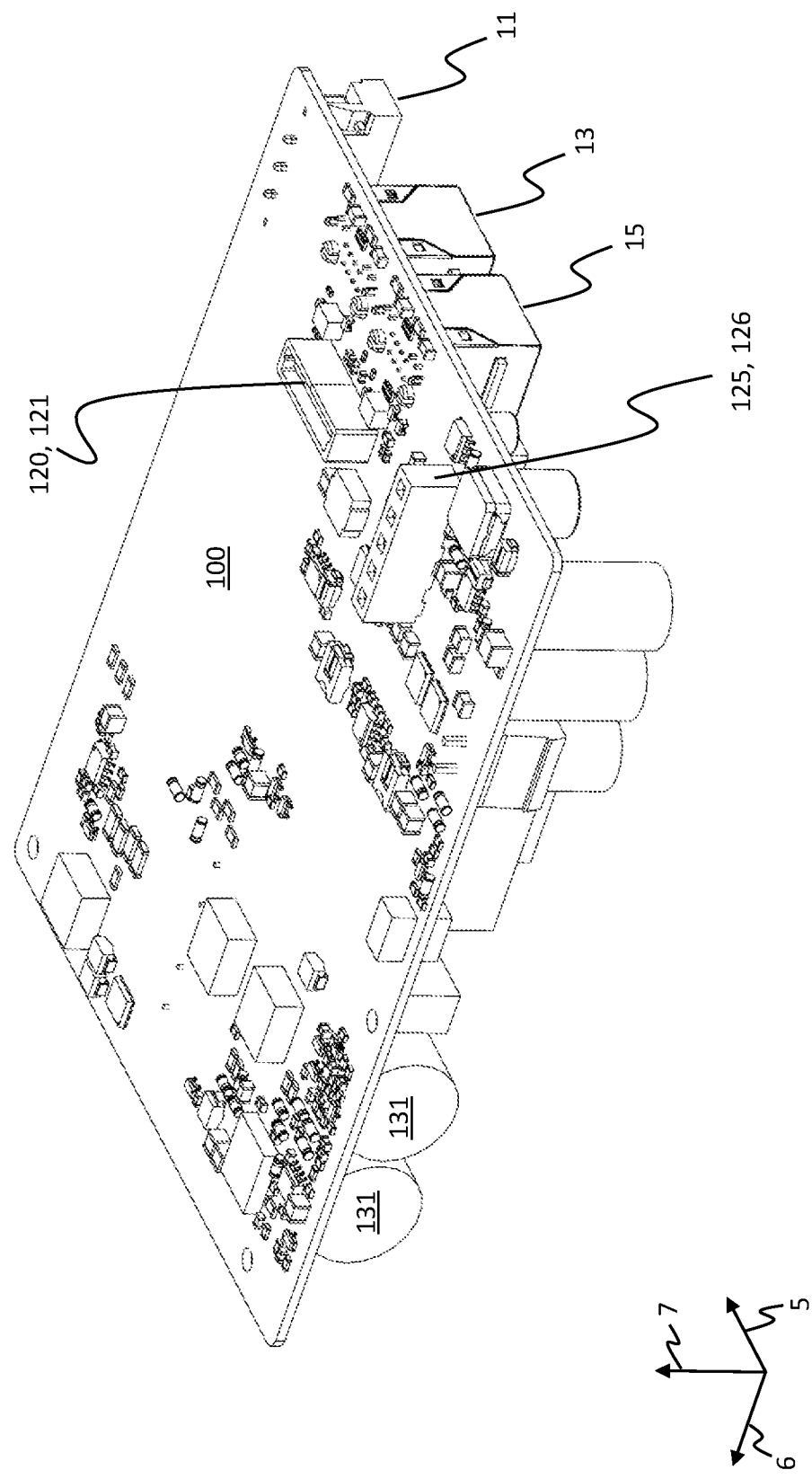
FIG. 8 shows a perspective view of the top side of the connection module.

FIG. 8 shows a schematic perspective illustration of the top side of the connection module 100. Electronic parts can likewise be arranged on the top side of the connection module 100. A first coupling element 121 of a first connecting line 120 and a first coupling element 126 of a second connecting line 125 can be arranged on the connection module 100 on the top side. The first coupling elements 121, 126 can be designed as elements of a plug-in connection, as illustrated. In particular, the first coupling elements 121, 126 can be designed as jacks. As an alternative, the first coupling element 121 of the first connecting line 120 and/or the first coupling element 126 of the second connecting line 125 can also be designed as a plug. The plug-in connection of the first connecting line 120 can be designed as a shielded plug-in connection. The plug-in connection of the second connecting line 125 can be designed as an unshielded plug-in connection.

Figure 9:
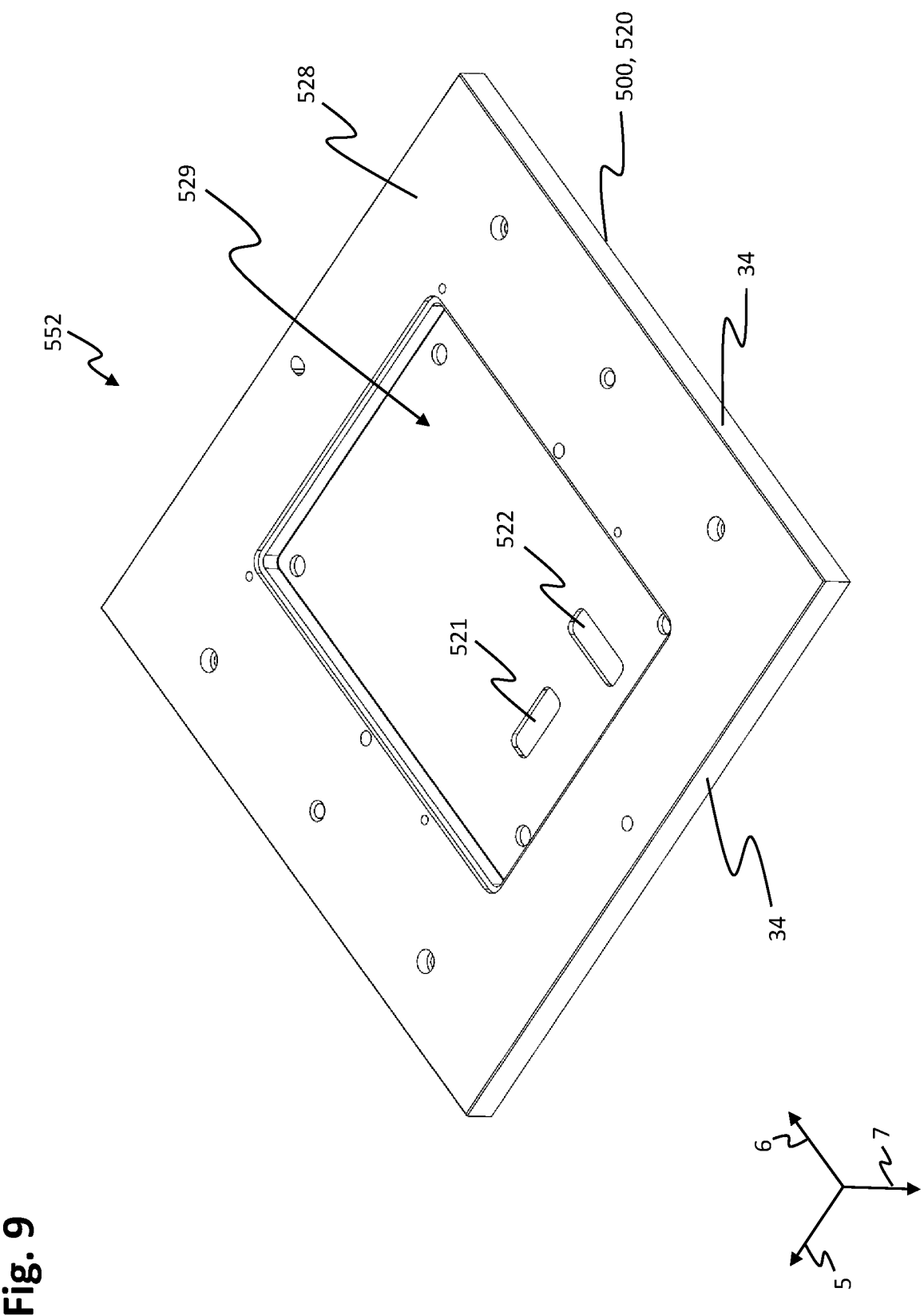
FIG. 9 shows a perspective view of the bottom side of a housing base of the stator module.

FIG. 9 shows a schematic perspective illustration of the bottom side 552 of the housing base 520 and of the module housing 500. The housing base 520 is designed as a plate. An extent of the housing base 520 in the first and the second direction 5, 6 is greater than an extent of the housing base 520 in the vertical direction 7 in each case. The housing base 520 has a substantially rectangular, in particular square, shape in the plane which is spanned by the first and the second direction 5, 6. The housing base 520 has a base surface 528 on its bottom side 552. The base surface 528 is of substantially flat design and at its borders adjoins the lower edges of the side surfaces 34 of the module housing 500.

The cutout 529 for receiving the connection module 100 is formed in the base surface 528 of the housing base 520 on the bottom side 552 of the housing base 520. The cutout 529 is of substantially rectangular design with four edges which are arranged at a right angle in relation to one another. The cutout 529 is arranged in the base surface 528 substantially centrally in the first and the second direction 5, 6. The base surface 528 surrounds the cutout 529 at all four edges, so that the base surface 528 forms a border which encircles the cutout 529. The cutout 529 forms at least a portion of the installation space for receiving the connection module 100. A further portion of the installation space can be formed by the interior of the module covering 110.

The housing base 520 is designed to electrically and/or magnetically shield the sensor module 200, which is arranged above the housing base 520, from the connection module 100. In particular, that portion of the housing base 520 which is located between the connection module 100 and the sensor module 200 in the region of the cutout 529 forms an electrical and/or magnetic shielding of this kind.

Figure 10:
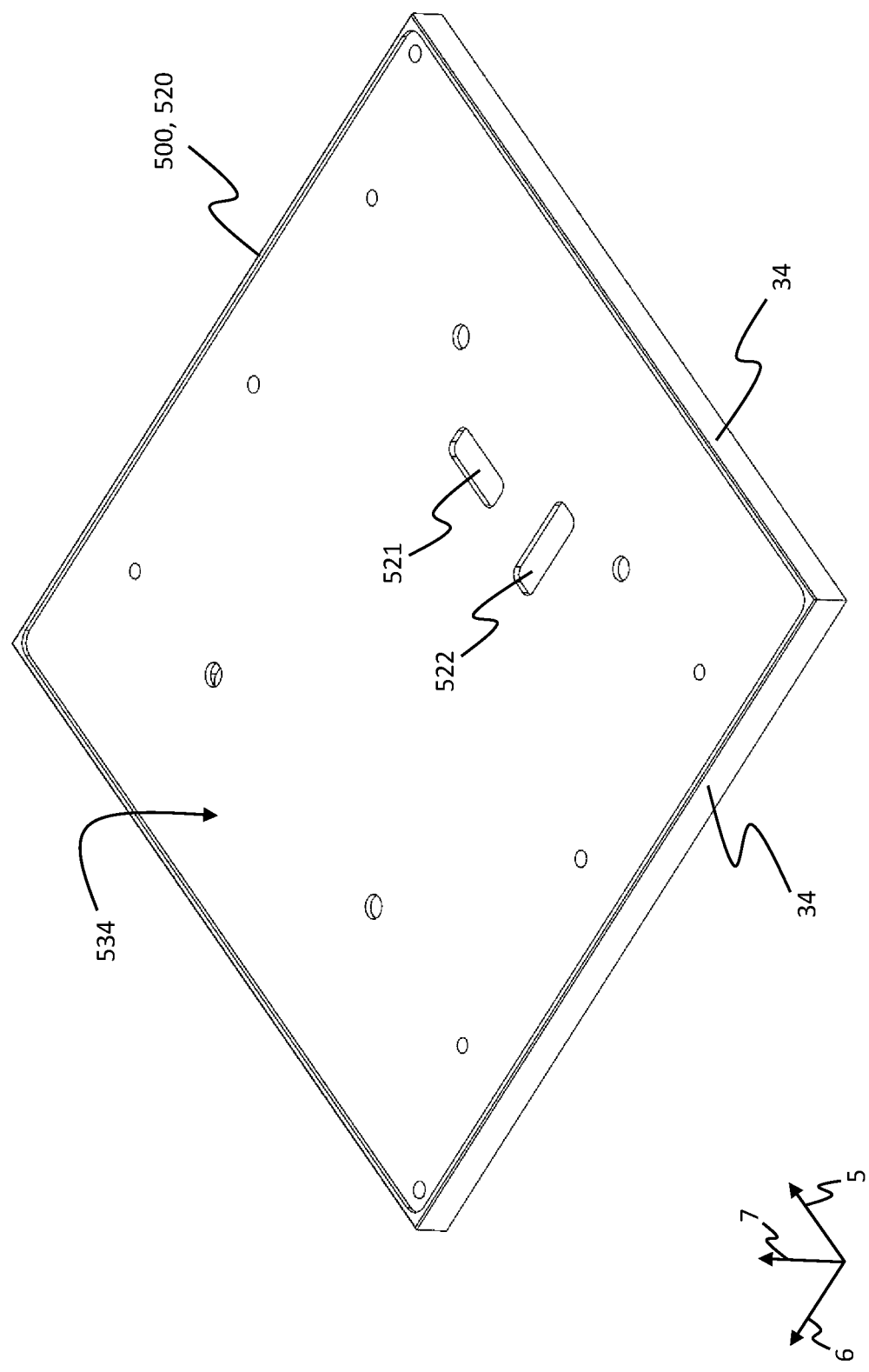
FIG. 10 shows a perspective view of the top side of the housing base.

FIG. 10 shows a schematic perspective illustration of the top side of the housing base 520. The housing base 520 is of substantially flat design with a flat surface 534 on the top side. The surface 534 is of substantially rectangular design and is surrounded at its borders by an encircling border which is raised in the vertical direction 7.

A first connecting opening 521 and a second connecting opening 522 are formed in the housing base 520. As is clear from FIG. 5, the first connecting opening 521 is arranged above the first coupling element 121 of the first connecting line 120 in the vertical direction 7, and therefore the first coupling element 121 of the first connecting line 120 is accessible from the top side of the housing base 520 via the first connecting opening 521. In addition, the second connecting opening 522 is arranged above the first coupling element 126 of the second connecting line 125 in the vertical direction 7, and therefore the first coupling element 126 of the second connecting line 125 is accessible from the top side of the housing base 520 via the second connecting opening 522.

Figure 11:
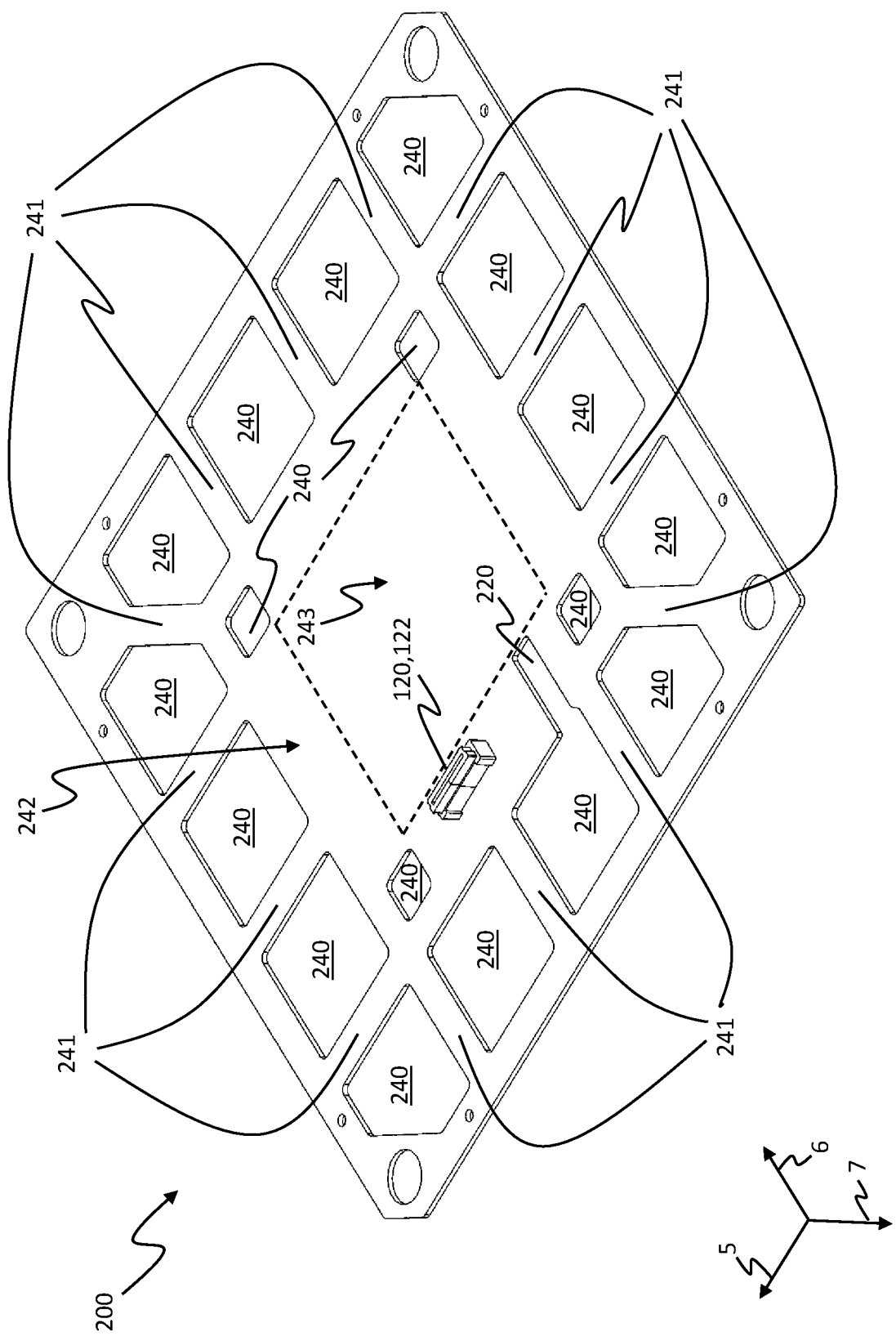
FIG. 11 shows a perspective view of the bottom side of a sensor module of the stator module.

FIG. 11 shows a schematic perspective illustration of the bottom side of the sensor module 200. The sensor module 200 is designed as a plate of which the extent in the vertical direction 7 is smaller than in the first and the second direction 5, 6. The sensor module 200 has a substantially rectangular, in particular square, shape in the plane which is spanned by the first and the second direction 5, 6. The sensor module 200 can be designed, for example, as a printed circuit board, which is populated with electronic parts and components, and contain an insulating material. The electronic parts can be arranged, inter alia, on the bottom side of the sensor module 200.

The sensor module 200 is electrically conductively connected to the connection module 100 via the first connecting line 120. The first connecting line 120 is passed from the connection module 100, through the bottom side 522 of the housing base 520, to the sensor module 200. In particular, the first connecting line 120 passes through the first connecting opening 521 in the housing base 520. As is illustrated in FIG. 11, a second coupling element 122 of the first connecting line 120 can be arranged on the bottom side of the sensor module 200. As is clear from FIGS. 5 and 6, the second coupling element 122 of the first connecting line 120 is arranged in such a way that it makes electrically conductive contact with the first coupling element 121 of the first connecting line 120, which first coupling element is arranged on the top side of the connection module 100, through the first connecting opening 521 in the housing base 520. If the first connecting line 120 is designed as a plug-in connection, the second coupling element 122 of the first connecting line 120 can be designed as a plug or as a jack.

As an alternative, the first connecting line 120 can also be designed as a cable connection. A cable connection of this kind can comprise a multicore cable, in particular a multicore flat ribbon cable. The cable can comprise a connecting element, for instance a plug or a jack, at each of the two ends, said connecting elements making electrically conductive contact with the first and the second coupling element 121, 122 of the first connecting line 120. As an alternative, the stator module 2 can be embodied either without the first coupling element 121 or without the second coupling element 122 of the first connecting line 120 and the cable of the first connecting line 120 can be fastened either to the connection module 100 or to the sensor module 200, for example by a solder connection. The first connecting line 120 can be designed as an unshielded line, in particular the first connecting line 120 can comprise unshielded plug-in connectors and/or cables.

Figure 12:
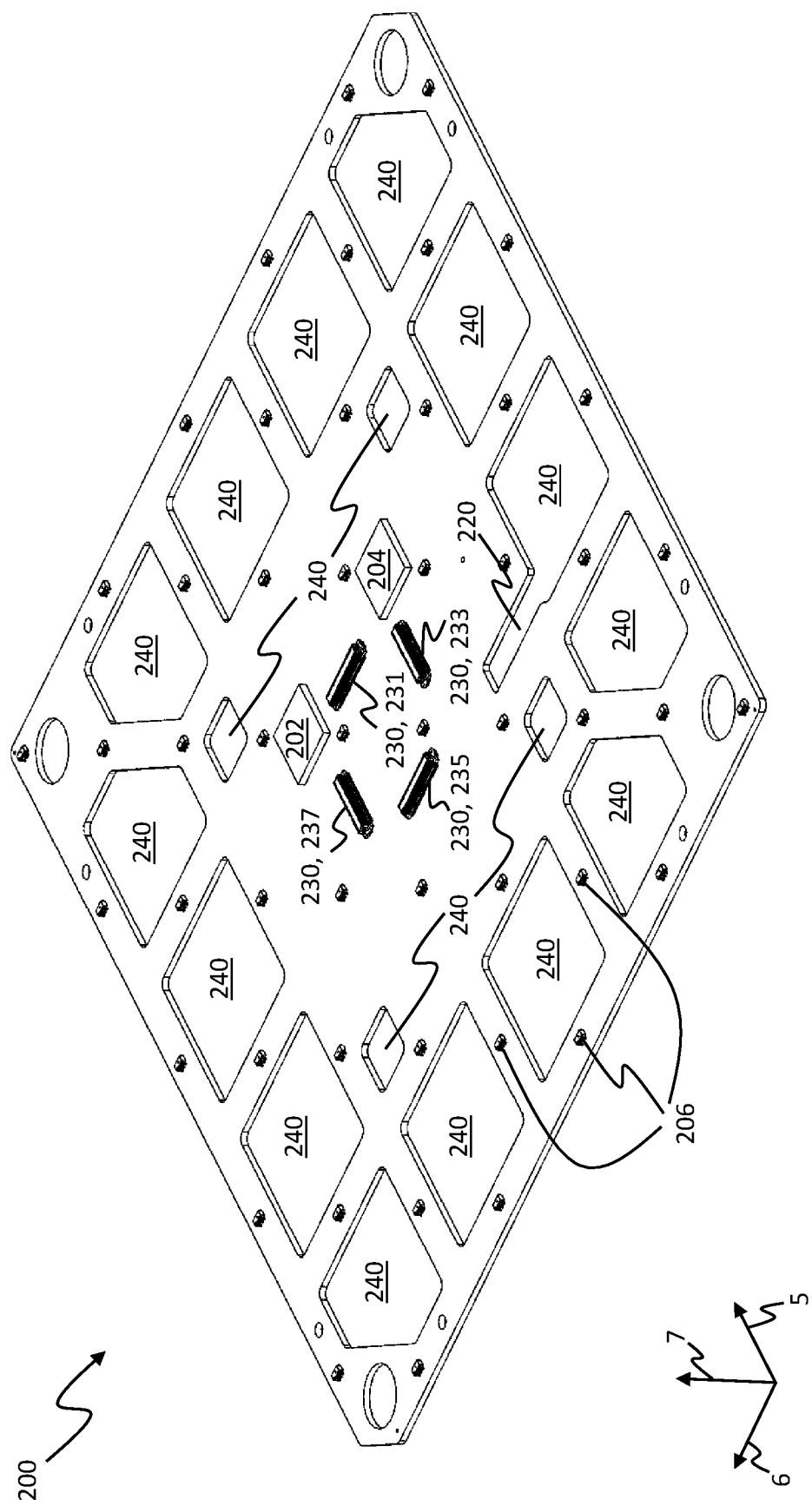
FIG. 12 shows a perspective view of the top side of the sensor module.

FIG. 12 shows a schematic perspective illustration of the top side of the stator module 200. A position-detecting unit 206 is arranged on a substantially flat surface of the sensor module 200. In addition, a plurality of further position-detecting units 206 are arranged on the surface of the sensor module 200. The position-detecting units 206 are arranged on the sensor module 200 in a manner distributed at regular intervals from one another and over the entire surface of the sensor module 200. The position-detecting units 206 can be arranged, for example, in a regular grid. The position-detecting units 206 can also be arranged in a plurality of, in particular two, regular grids which are offset in relation to one another.

The position-detecting units 206 are designed to detect a position of the rotor 20 over the stator unit 400. The position-detecting units 206 can be designed, for example, to generate a sensor signal which represents the position of the rotor 20. The position-detecting units 206 can be designed, for example, to detect a magnetic field which is generated by magnets which are arranged on the rotor 20. The magnets which are arranged on the rotor 20 may be, for example, drive magnets of the rotor 20. The position-detecting units 206 can be designed, for example, as magnetic field sensors, for instance as digital or analog Hall sensors. The position-detecting units 206 can be designed to detect field components of the detected magnetic field in one, two or three linearly independent directions in space. For example, the position-detecting units 206 can be designed to detect the field components in the first direction 5, and/or the second direction 6 and/or the vertical direction 7.

Furthermore, electronic components can be arranged on the sensor module 200 on the top side of the sensor module 200 in addition to the position-detecting units 206. For example, as illustrated in FIG. 12, a first processing unit 202 and a second processing unit 204 can be arranged on the surface of the sensor module 200. The first and the second processing unit 202, 204 can be designed as an integrated circuit, for instance as a microprocessor, an FPGA or a microcontroller. Apart from the position-detecting units 206 and the processing units 202, 204, the surface of the sensor module 200 can be free of electronic components.

In alternative embodiments of the stator module 200, the position-detecting unit 206 and/or the first processing unit 202 and/or the second processing unit 204 can also be arranged on the bottom side of the sensor module 200. In further alternative embodiments, the first processing unit 202 and/or the second processing unit 204 can also be arranged at a different location in the stator module 2, for instance on the connection module 100 or the power module 300.

The sensor module 200 is electrically conductively connected to the power module 300 via a third connecting line 230. The third connecting line 230 can comprise one or more plug-in connections. The third connecting line 230, illustrated in FIG. 12, comprises a first coupling element 231 which is arranged on the top side of the stator module 200 and is part of a first plug-in connection. The third connecting line 230 can further comprise a second coupling element 233 as part of a second plug-in connection, a third coupling element 235 as part of a third plug-in connection and a fourth coupling element 237 as part of a fourth plug-in connection. The second to fourth coupling elements 233, 235, 237 are arranged on the top side of the sensor module 200, like the first coupling element 231. The coupling elements 231, 233, 235, 237 can be designed as plugs, as illustrated. However, the coupling elements 231, 233, 235, 237 can also be designed as jacks. In alternative embodiments of the sensor module 200, the third connecting line 230 can also comprise fewer than four coupling elements, for example only the first coupling element 231, or more than four coupling elements. The third connecting line 230, in particular the coupling elements 231, 233, 235, 237 of the third connecting line 230, are arranged in the center of the sensor module 200 in the first and the second direction 5, 6.

As is clear from FIGS. 11 and 12, the sensor module 200 has a connecting cutout 220. The connecting cutout 220 can be designed as an aperture or as a passage opening in the sensor module 200. As is clear from FIGS. 5 and 6, the connecting cutout 220 is arranged above the second connecting opening 522 of the housing base 520 and above the first coupling element 126 of the second connecting line 125. The first coupling element 126 of the second connecting line 125 is accessible from the top side of the sensor module 200 via the connecting cutout 220.

The printed circuit board of the sensor module 200 can have one or more copper layers in which conductor tracks for making contact with the electronic parts which are arranged on the printed circuit board are formed. The copper layers can have a thickness of from 10 μm to 50 μm, in particular of from 20 μm to 40 μm, in particular of 35 μm. Contact can be made with the electronic parts via finely structured conductor tracks which are formed in the copper layer or layers. The finely structured conductor tracks can have a width of between 50 µm and 250 µm, in particular of between 100 µm and 150 µm, in particular of 5125 µm.

Figure 13:
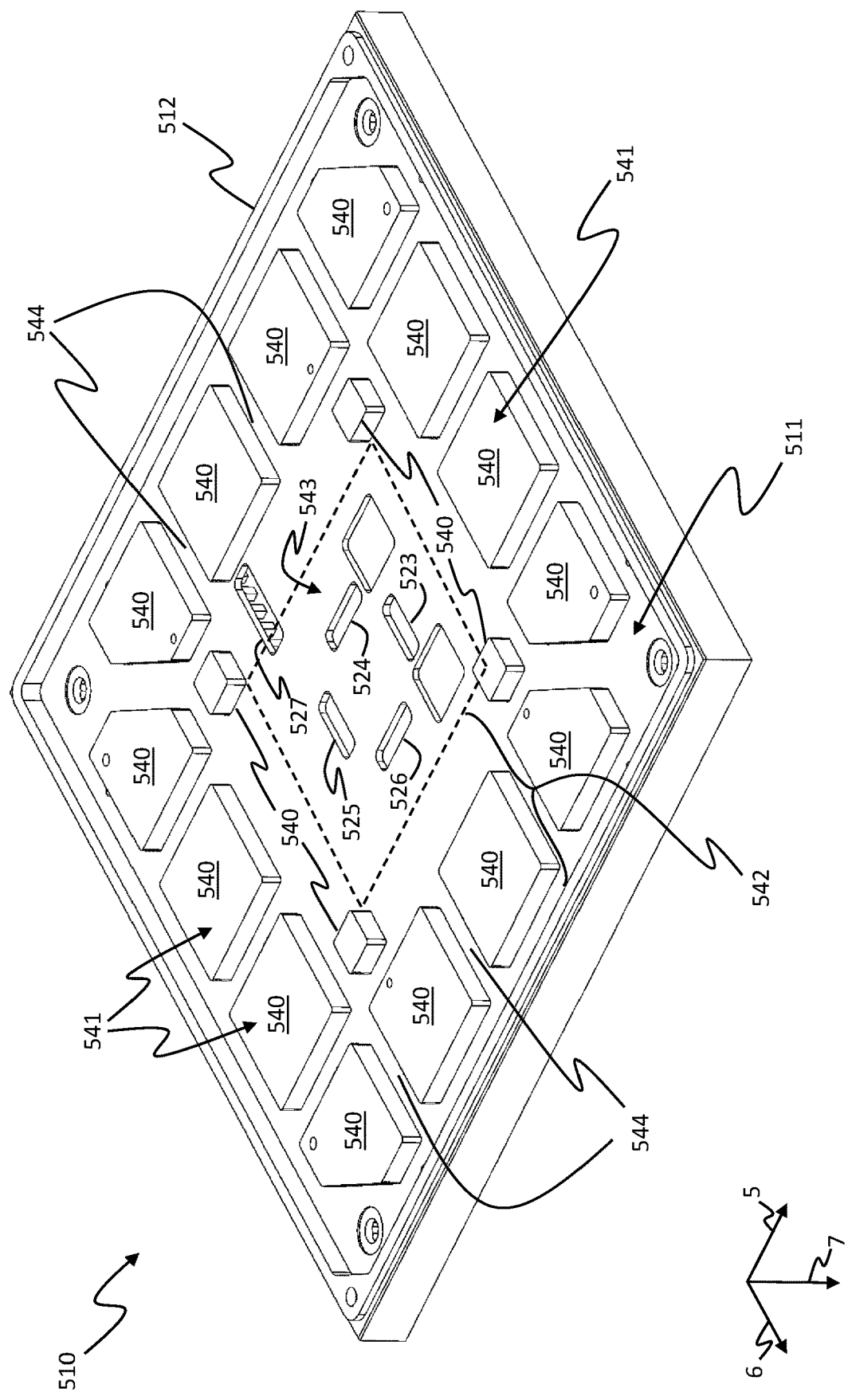
FIG. 13 shows a perspective view of the bottom side of a housing cover of the stator module.

FIG. 13 shows a schematic perspective illustration of the bottom side of the housing cover 510. The housing cover 510 is designed as a plate. An extent of the housing cover 510 in the first and the second direction 5, 6 is greater than an extent of the housing cover 510 in the vertical direction 7 in each case. The housing cover 510 has a substantially rectangular, in particular a square, shape in the plane which is spanned by the first and the second direction 5, 6.

The housing cover 510 has the cutout 511, which is surrounded by the raised border 512, on its bottom side. The border 512 is designed in a manner encircling the cutout 511 along the outer sides of the housing cover 510. When the module housing 500 is closed, the border 512 can lie on the surface 534 of the housing base 520. As an alternative or in addition, the encircling border which is formed on the surface 534 of the housing base 520 can lie on the housing cover 510 when the module housing 500 is closed. The encircling border which is formed on the surface 534 of the housing base 520 can be arranged in a manner offset in relation to the border 512, which is formed on the bottom side of the housing cover 510, in the direction of the interior of the module housing 500. As an alternative, the border 512 which is formed on the bottom side of the housing cover 510 can also be arranged in a manner offset in relation to the encircling border, which is formed on the surface 534 of the housing base 520, in the direction of the interior of the module housing 500. Therefore, in general, the border 512 which is formed on the bottom side of the housing cover 510 and the encircling border which is formed on the surface 534 of the housing base 520 can be arranged in a manner offset in relation to one another in the plane which is spanned by the first and the second direction 5, 6. The cutout 511 is shaped in such a way that the sensor module 200 can be inserted into the cutout 511. The sensor module 200 is surrounded by the border 512 when said sensor module is inserted into the cutout 511.

The stator housing 500 comprises thermally conductive elements 540. The thermally conductive elements 540 are arranged within the stator housing 500, in particular within the border 512 which is formed on the housing cover 510 and within the encircling border which is formed on the housing base 520. The thermally conductive elements 540 are formed separately from the border 512 which is formed on the housing cover 510 and the encircling border which is formed on the housing base 520. The thermally conductive elements 540 are designed to establish a thermally conductive connection between the top side 551 of the module housing 500 and the bottom side 552 of the module housing 500.

The thermally conductive elements 540 are formed on the bottom side of the housing cover 520. The thermally conductive elements 540 are arranged within the cutout 511 and are designed as raised portions which are raised counter to the vertical direction 7 and have a level and flat upper surface 541. The thermally conductive elements 540 can consist of the same material as the housing cover 520. The thermally conductive elements 540 can be connected, in particular integrally in terms of material, to the housing cover 520.

The thermally conductive elements 540 are arranged in a border region 542 of the cutout 511 and of the housing cover 510. The border region 542 can have a constant width and comprise more than 50%, in particular more than 75%, in particular more than 85%, of the total surface area of the housing cover 510 in the first and the second direction 5, 6.

In particular, a central region 543 of the housing cover 510, which central region is surrounded by the border region 542, is free of the thermally conductive elements 540. The central region 543 is arranged centrally in the cutout 511. The central region comprises that area of the housing cover 510 which is not covered by the border region in the first and the second direction 5, 6. The thermally conductive elements 540 are arranged next to one another in the border region 542 and in an encircling manner along the border of the housing cover 510. Adjacent thermally conductive elements 540 are arranged at a distance from one another in each case, and therefore an intermediate space 544 is formed between adjacent thermally conductive elements 540 in each case.

As is clear from FIGS. 11 and 12, the sensor module 200 has housing through-passages 240. The housing through-passages 240 are designed as passage openings which are formed in the sensor module 200. In particular, the housing through-passages 240 are designed as passage openings which are formed in the printed circuit board of the sensor module 200. The housing through-passages 240 are shaped and arranged in such a way that each of the thermally conductive elements 540 is respectively arranged in one of the housing through-passages 240 when the sensor module 200 is arranged in the closed module housing 500. The housing through-passages 240 therefore form through-openings for the thermally conductive elements 540 in the sensor module 200.

Like the thermally conductive elements 540, the housing through-passages 240 are arranged in a border region 242, which encircles the border of the sensor module 200, in the first and the second direction 5, 6. Webs 241, which run from the outer edges of the sensor module 200 into a central region 243 of the sensor module 200, are respectively formed between adjacent housing through-passages 240. The central region 243 is formed centrally in the sensor module 200 and is surrounded by the border region 242. The border region 242 and the central region 243 of the sensor module 200 have substantially the same dimensions as the border region 542 and the central region 543 of the housing cover 510.

A first portion of the webs 241 runs in each case parallel to the first or the second direction 5, 6 and therefore perpendicularly in relation to that outer edge of the sensor module 200 on which the web 241 in question is arranged. A second portion of the webs 241, consisting of two webs 241, runs in the border region in each case diagonally from one of the four corners of the sensor module 200 in the direction of the opposite corner of the sensor module 200. The housing through-passages 240 are each arranged in such a way that in each case one of the housing through-passages 240 is situated centrally opposite each of the webs 241 of the first portion on the opposite outer edge of the sensor module 200. One of the position-detecting units 206 is arranged on the webs 241 of the first portion in each case. When the sensor module 200 is arranged in the module housing 500, the webs 241 are located within the intermediate spaces 544 between the thermally conductive elements 540.

The thermally conductive elements 540 are designed to lie on the housing base 520 when the module housing 500 is closed, and therefore a thermally conductive connection is formed between the housing base 520 and the housing cover 510 via the thermally conductive elements 540. In particular, the upper surfaces 541 of the thermally conductive elements 540 bear against the housing base 520 when the module housing 500 is closed. For example, the upper surfaces 541 can bear flat against the housing base 520. In the case of the stator module 2, the upper surfaces 541 lie flat on the surface 534 of the housing base 520.

In alternative embodiments of the stator module 2, the thermally conductive elements 540 can also establish a thermally conductive connection between the top side 551 and the bottom side 552 of the module housing 500 by way of being connected integrally in terms of material to the housing base 520 and, when the module housing 500 is closed, bearing against the housing cover 510, for instance against the bottom side of the housing cover 510. In order to improve the thermal conduction, a thermally conductive paste can be arranged or applied between the thermally conductive elements 540 and the module housing 500 at the locations at which the thermally conductive elements 540 bear against the housing base 520 or the housing cover 510.

Figure 14:
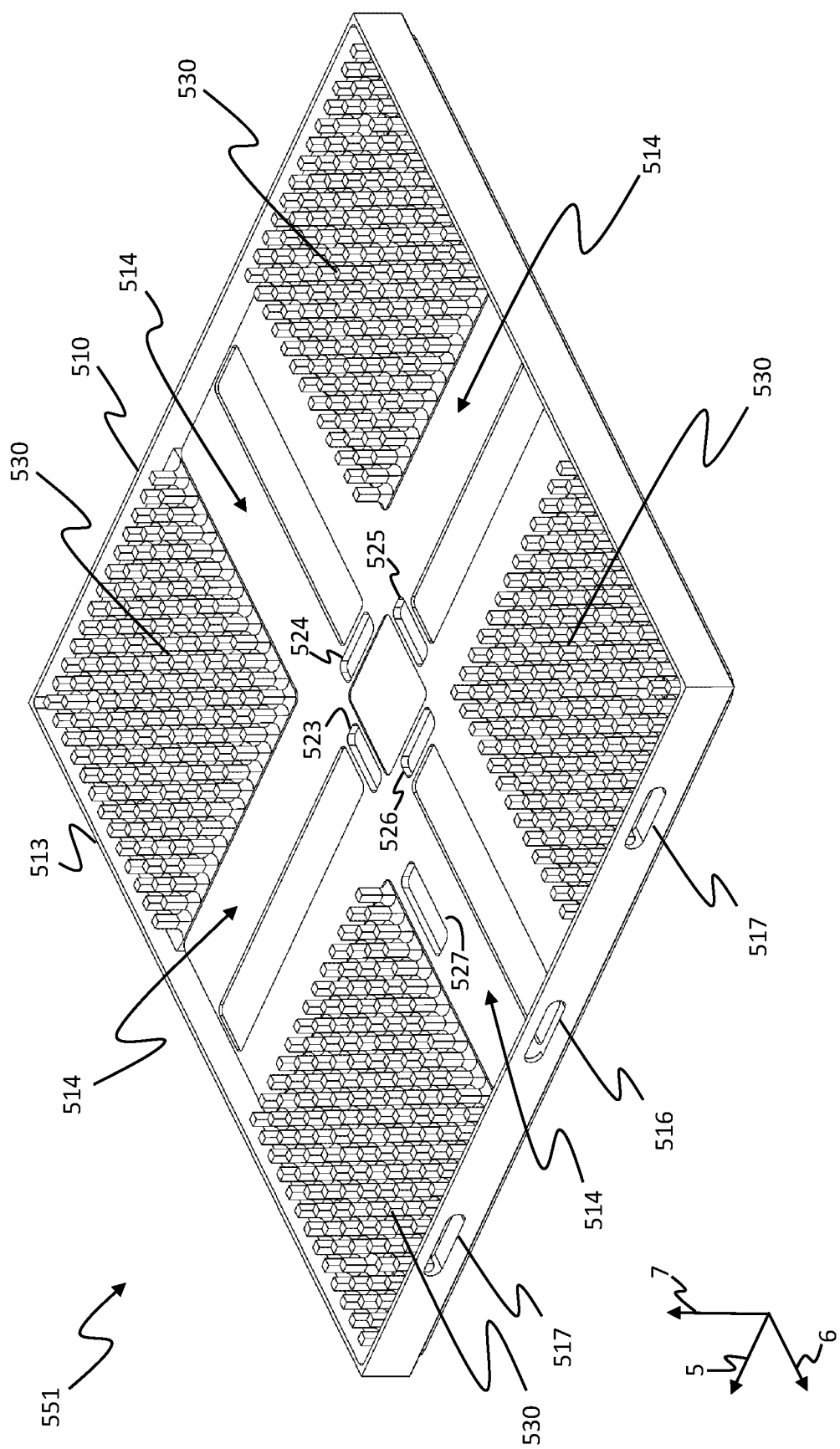
FIG. 14 shows a perspective view of the top side of the housing cover.

FIG. 14 shows a schematic perspective illustration of the top side of the housing cover 510. The top side of the housing cover 510 forms the top side 551 of the module housing 500 at the same time. The housing cover 510 has an installation space 514 for the power module 300 on the top side. The installation space 514 is of cruciform design and is surrounded by an encircling raised border 513 at the outer edges of the housing cover 510. The installation space 514 runs from one of the outer edges to the opposite outer edge in the center of the housing cover 510 in the first direction 5 and in the second direction 6 in each case.

The housing cover 510 also has four thermally conductive structures 530 on the top side 551. One of the thermally conductive structures 530 is arranged in each of the four corners of the housing cover 510. The thermally conductive structures 530 are each of rectangular design in a plan view of the top side 551 of the housing cover 510. The thermally conductive structures 530 can each have the same dimensions in the first and the second direction 5, 6 and be of square design in a plan view of the top side 551 of the housing cover 510. The cruciform installation space 514 for the power module 300 extends between the thermally conductive structures 530 which are arranged in the corners of the housing cover 510. The thermally conductive structures 530 have a height in the vertical direction 7 which corresponds to the height of the border 513 in the vertical direction 7.

The thermally conductive structures 530 have flat bearing surfaces, which bear against a bottom surface of the stator unit 400 on the bottom side of the stator unit 400, on their top side. The thermally conductive structures 530 can be designed as cuboids and can be closed in the first direction 5 and in the second direction 6 and can be designed without interruptions. In this case, upper surfaces of the cuboids can form the bearing surfaces.

However, the thermally conductive structures 530 can also have interruptions in the first direction 5 and/or in the second direction 6. In particular, the thermally conductive structures 530 can each have a large number of rods or cylinders which are oriented along the vertical direction 7, as illustrated in FIG. 14. The rods can each be arranged in a regular grid at a distance from one another in the first direction 5 and in the second direction 6. In particular, the rods can each be at the same distance in relation to one another in the first and the second direction 5, 6. The rods and, respectively, cylinders have flat bearing surfaces on the top side in each case.

The rods and, respectively, cylinders can each have square bearing surfaces in a plan view of the surface of the housing cover 510, as illustrated in FIG. 14. The bearing surfaces can each form base surfaces of the rods and, respectively, cylinders. In alternative embodiments of the housing cover 510, the rods can also have a round, diamond-shaped or hexagonal bearing surface or base surface. The rods and, respectively, cylinders can each have a smaller extent in the first and the second direction 5, 6 than in the vertical direction 7, as illustrated in FIG. 14. In alternative embodiments the rods and, respectively, cylinders can also have a greater extent in the first and the second direction 5, 6 than in the vertical direction 7.

In alternative embodiments of the housing cover 510 with thermally conductive structures 530 which have interruptions in the first and/or the second direction 5, 6, the thermally conductive structures 530 can also comprise webs which are raised in the vertical direction 7 and form a honeycomb structure, a grid structure comprising intersecting webs or a linear structure comprising parallel webs which are arranged next to one another. In this case, the webs each comprise flat bearing surfaces on their top side.

The thermally conductive structures 530 can be connected integrally in terms of material to the housing cover 510, as illustrated in FIG. 14. In alternative embodiments of the stator module 2, the thermally conductive structures 530 can also be formed separately from the housing cover 510 and formed from a metal, for example steel, copper or aluminum. The thermally conductive structures which are formed separately from the housing cover 510 can be arranged on and/or fastened to the top side 551 of the housing cover 510 at the same locations as the thermally conductive structures 530 illustrated in FIG. 14. As an alternative or in addition, the thermally conductive elements 540 which are arranged in the interior of the module housing 500 can also be formed separately from the housing cover 510 and/or the housing base 520 and can be arranged at the same locations as the thermally conductive elements 540 which are formed in a manner connected integrally in terms of material to the housing cover 510.

As is clear from FIGS. 13 and 14, the housing cover 510 has a third connecting opening 523, a fourth connecting opening 524, a fifth connecting opening 525 and a sixth connecting opening 526. The third to sixth connecting openings 523, 524, 525, 526 are designed as passage holes in the center of the housing cover 510. The third connecting opening 523 is arranged above the first coupling element 231 of the third connecting line 230, the fourth connecting opening 524 is arranged above the second coupling element 233 of the third connecting line 230, the first connecting opening 525 is arranged above the third coupling element 235 of the third connecting line 230 and the sixth connecting opening 526 is arranged above the fourth coupling element 237 of the third connecting line 230. The first to fourth coupling elements 231, 233, 235, 237 are accessible from the top side 551 of the module housing 500 and of the housing cover 510 through the third to sixth connecting openings 523, 524, 525, 526.

The housing cover 510 also has a seventh connecting opening 527. The seventh connecting opening 527 is arranged above the connecting cutout 220 in the sensor module 200, above the second connecting opening 522 in the housing base 520 and above the first coupling element 126 of the second connecting line 125, which first coupling element is arranged on the top side of the connection module 100. The first coupling element 126 of the second connecting line 125 is accessible from the top side 551 of the module housing 500 and of the housing cover 510 via the seventh connecting opening 527, the connecting cutout 220 and the second connecting opening 522.

Figure 15:
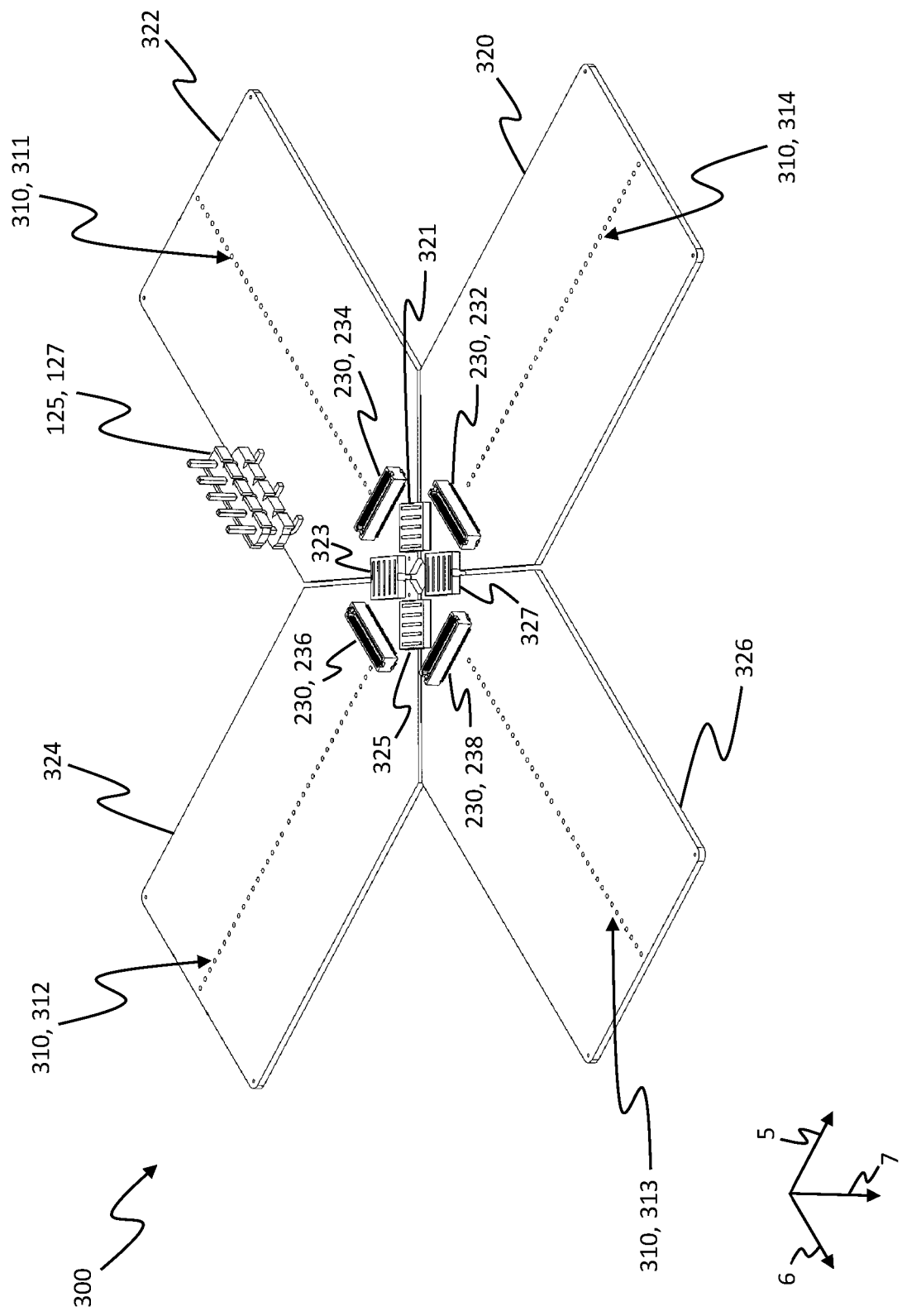
FIG. 15 shows a perspective view of the bottom side of a power module of the stator module.

FIG. 15 shows a schematic perspective illustration of the bottom side of the power module 300. The power module 300 is of substantially flat design on its bottom side. Electronic parts or components can be arranged on the power module 300 on the bottom side. The power module 300 is designed as a plate. An extent of the power module 300 in the first and the second direction 5, 6 is greater than an extent of the power module 300 in the vertical direction 7 in each case. The power module 300 can comprise a printed circuit board with electronic parts or components which are arranged on the printed circuit board.

The printed circuit board of the power module 300 can have one or more copper layers in which conductor tracks for making contact with the electronic parts which are arranged on the printed circuit board are formed. The copper layers can have a thickness of from 10 µm to 500 µm, in particular of from 50 µm to 100 µm, in particular of 70 µm. The conductor tracks can have a minimum width of 50 µm or 100 µm, in particular of 200 µm or of 300 µm.

The power module 300 is designed in a cruciform manner with two beams which are oriented perpendicularly in relation to one another and are oriented along the first and the second direction 5, 6 in the plane which is spanned by the first and the second direction 5, 6. The beams of the power module 300 have the same extents in the first direction 5 and in the second direction 6 in each case.

The power module 300 comprises a first module unit 320, a second module unit 322, a third module unit 324 and a fourth module unit 326. The module units 320, 322, 324, 326 are of identical design, provided that no differences are described below. The first and the third module unit 320, 324 form that beam of the cruciform power module 300 which is oriented along the first direction 5, and the second and the fourth module unit 322, 326 form that beam of the cruciform power module 300 which is oriented along the second direction 6.

The module units 320, 322, 324, 326 each have a part which is of rectangular design in a plan view of the bottom side of the module units 320, 322, 324, 326 in the plane which is spanned by the first and the second direction 5, 6. The base of a triangular part, which substantially has the shape of an isosceles triangle in a plan view of the bottom side of the module units 320, 322, 324, 326, adjoins one side of the rectangular part. The module units 320, 322, 324, 326 are arranged in a cruciform manner around a common central point, wherein the apexes of the triangular parts of the module units 320, 322, 324, 326 are arranged in a manner each facing one another at the central point. The first module unit 320 and the third module unit 324 are arranged in a manner opposite one another in the first direction 5, wherein the apexes of the triangular parts of the first and the third module unit 320, 324 are arranged in a manner each facing one another at the central point. The second module unit 322 and the fourth module unit 326 are arranged in a manner opposite one another in the second direction 6, wherein the apexes of the parts, which are designed as isosceles triangles, of the second and the fourth module unit 322, 326 are arranged in a manner each facing one another at the central point.

One limb of the triangular part of the second module unit 322 is arranged next to one limb of the triangular part of the first module unit 320. A further limb of the triangular part of the second module unit 322 is arranged next to one limb of the triangular part of the third module unit 324. One limb of the triangular part of the fourth module unit 326 is arranged next to a further limb of the triangular part of the first module unit 320. A further limb of the triangular part of the fourth module unit 326 is arranged next to a further limb of the triangular part of the third module unit 324.

The module units 320, 322, 324, 326 are electrically conductively connected to one another via connection 321, 323, 325, 327. In addition, the connection 321, 323, 325, 327 can be designed to mechanically rigidly connect the module units 320, 322, 324, 326 to one another. A first connection 321 connects the first module unit 320 to the second module unit 322, a second connection 323 connects the second module unit 322 to the third module unit 324, a third connection 325 connects the third module unit 324 to the fourth module unit 326 and a fourth connection 327 connects the fourth module unit 326 to the first module unit 320. In alternative embodiments the power module 300 can be integrally formed from a single continuous plate and without the module units 320, 322, 324, 326 and connection 321, 323, 325, 327.

The connection 321, 323, 325, 327 are each arranged on the limbs of the triangular parts of the module units 320, 322, 324, 326. The connection 321, 323, 325, 327 connect limbs of adjacent module units 320, 322, 324, 326, which limbs are respectively arranged next to one another.

The connection 321, 323, 325, 327 can be designed as electrical plug-in connectors, for instance as printed circuit board connectors. The connection 321, 323, 325, 327 can, in particular, also be designed as printed circuit board connectors which can be pressed in. The connection 321, 323, 325, 327 can be pressed into contact holes, which are formed in the module units 320, 322, 324, 326, on the bottom side of the module units 320, 322, 324, 326 for example. In particular, the connection 321, 323, 325, 327 can form a solder-free electrically conductive connection between the module units 320, 322, 324, 326.

The power module 300 is electrically conductively connected to the connection module 100 via the second connecting line 125. The second connecting line 125 passes from the connection module 100, through the housing base 520, through the interior of the module housing 500 and through the housing cover 510, to the power module 300. In particular, the second connecting line 125 passes through the second connecting opening 522 in the housing base 520, through the connecting cutout 220 of the sensor module 200 and through the seventh connecting opening 527 in the housing cover 510.

For example, a second coupling element 127 of the second connecting line 125 can be arranged on the bottom side of the power module 300, as illustrated in FIG. 15. The second coupling element 127 of the second connecting line 125 can be arranged on the bottom side of the second module unit 322 of the power module 300. As is clear from FIGS. 5 and 6, the second coupling element 127 is arranged in such a way that the second coupling element 127 of the second connecting line 125 makes electrically conductive contact with the first coupling element 126 of the second connecting line 125, which first coupling element is arranged on the top side of the connection module 100, through the seventh connecting opening 527 in the housing cover 510, through the connecting cutout 220 in the sensor module 200 and through the second connecting opening 522 in the housing base 520. If the second connecting line 125 is designed as a plug-in connection, the second coupling element 127 of the second connecting line 125 can be designed as a plug or as a jack.

Like the first connecting line 120, in alternative embodiments of the stator module 2, the second connecting line 125 can also be designed as a cable connection. A cable connection of this kind can comprise a multicore cable, in particular a multicore flat ribbon cable. The cable can comprise a connecting element, for instance a plug or a jack, at each of the two ends, said connecting elements making electrically conductive contact with the first and the second coupling element 126, 127 of the second connecting line 125. As an alternative, the stator module 2 can be embodied either without the first coupling element 126 of the second connecting line 125 or without the second coupling element 127 of the second connecting line 125 and the cable of the second connecting line 125 can be fastened either to the connection module 100 or to the power module 300, for example by a solder connection. The second connecting line 125 can be designed as a shielded line, in particular the second connecting line 125 can comprise shielded plug-in connectors and/or cables.

The power module 300 is electrically conductively connected to the sensor module 200 via the third connecting line 230. The third connecting line 230 passes from the power module 300, through the top side 551 of the module housing 500, to the sensor module 200 which is arranged in the module housing 500. In particular, the connecting line 230 passes through the housing cover 510, more precisely through the third, the fourth, the fifth and the sixth connecting opening 523, 524, 525, 526 in the housing cover 510. For example, a first mating element 232, a second mating element 234, a third mating element 236 and a fourth mating element 238 of the third connecting line 230 can be arranged on the bottom side of the power module 300, as illustrated in FIG. 15.

As is clear from FIGS. 5 and 6, the first mating element 232 is arranged in such a way that it makes electrically conductive contact with the first coupling element 231 of the third connecting line 230, which first coupling element is arranged on the top side of the sensor module 200, through the third connecting opening 523 in the housing cover 510. The second mating element 234 is arranged in such a way that it makes electrically conductive contact with the second coupling element 233 of the third connecting line 230, which second coupling element is arranged on the top side of the sensor module 200, through the fourth connecting opening 524 in the housing cover 510. The third mating element 236 is arranged in such a way that it makes electrically conductive contact with the third coupling element 235 of the third connecting line 230, which third coupling element is arranged on the top side of the sensor module 200, through the fifth connecting opening 525 in the housing cover 510. The fourth mating element 238 is arranged in such a way that it makes electrically conductive contact with the fourth coupling element 237 of the third connecting line 230, which fourth coupling element is arranged on the top side of the sensor module 200, through the sixth connecting opening 526 in the housing cover 510. If the third connecting line 230 is designed as a plug-in connection, the mating elements 232, 234, 236, 238 can be designed as a plug or as a jack.

The module units 320, 322, 324, 326 are electrically conductively connected to the sensor module 200 in each case separately and individually via line elements of the third connecting line 230 which are electrically insulated from one another. The line elements each comprise one of the mating elements 232, 234, 236, 238 and the corresponding coupling element 231, 233, 235, 237 on the sensor module 200. The first mating element 232 is arranged on the first module unit 320, the second mating element 234 is arranged on the second module unit 322, the third mating element 236 is arranged on the third module unit 324 and the fourth mating element 238 is arranged on the fourth module unit 326. The third connecting line 230 makes contact with the power module 300 in the center close to its point of intersection. To this end, the mating elements 232, 234, 236, 238 are arranged in the center of the power module 300. The mating elements 232, 234, 236, 238 are arranged in the triangular parts of the module units 320, 322, 324, 326.

The module units 320, 322, 324, 326, apart from the second coupling element 127 of the second connecting line 125, can each be of identical design. In particular, the module units 320, 322, 324, 326 can each have identical dimensions and/or an identical conductor track layout and/or be populated with electronic parts in an identical manner. In addition, apart from the second coupling element 127 of the second connecting line 125, all other connecting elements, for instance the mating elements 232, 234, 236, 238, can each be arranged in the same positions on the module units 320, 322, 324, 326.

In alternative embodiments of the invention, the third connecting line 230, the plug-in connectors thereof or the coupling elements 231, 233, 235, 237 thereof can also be arranged in an outer region, in particular in the border region 242, of the sensor module 200. In this case, the third connecting opening 523, the fourth connecting opening 524, the fifth connecting opening 525 and the sixth connecting opening 526 are also arranged in an outer region, in particular in the border region 542, of the housing cover 510. The third connecting line 230, the plug-in connector thereof and/or the mating elements 232, 234, 236, 238 thereof are/is arranged on the power module 300 in an outer region of the power module 300. In particular, the plug-in connectors or the mating elements 232, 234, 236, 238 can be arranged in the rectangular region of the module units 320, 322, 324, 326 of the power module 300. For example, the plug-in connectors or the mating elements 232, 234, 236, 238 can be arranged at outer ends of the module units 320, 322, 324, 326 which are situated opposite the common central point of the module units 320, 322, 324, 326.

Figure 16:
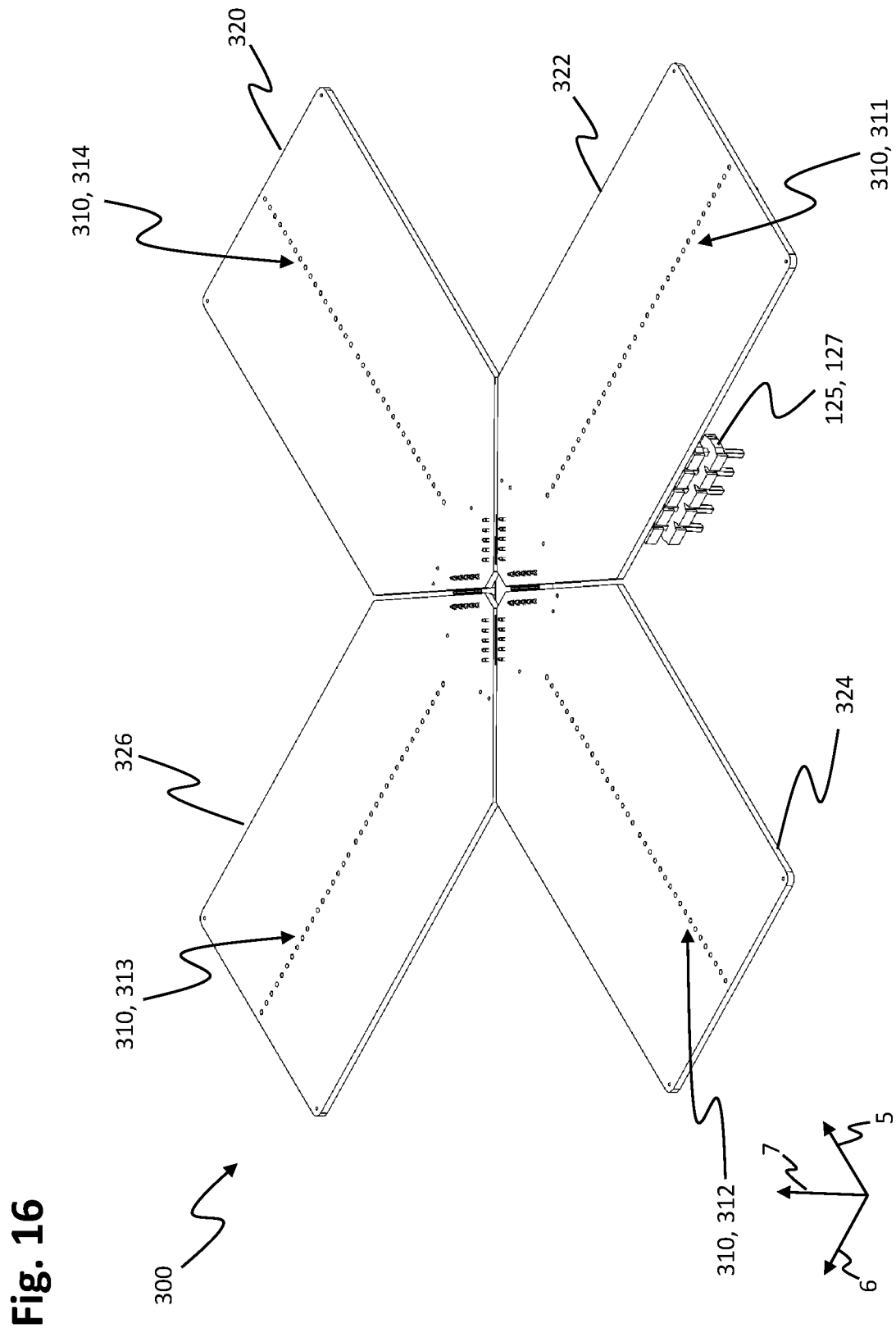
FIG. 16 shows a perspective view of the top side of the power module.

FIG. 16 shows a schematic perspective illustration of the top side of the power module 300. The power module 300 is of substantially flat design on the top side. Electronic parts or components can be arranged on the power module 300 on the top side.

Figure 17:
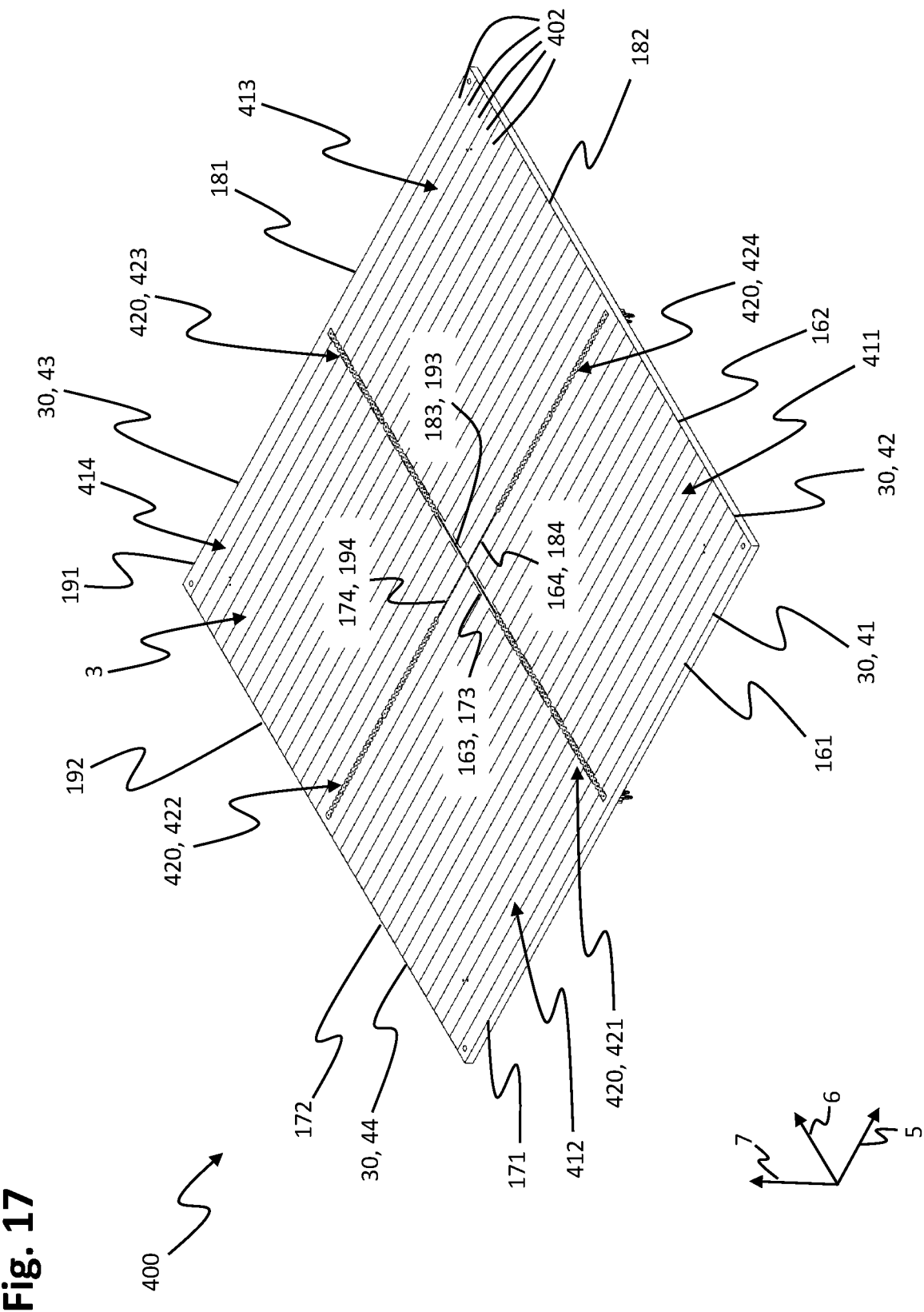
FIG. 17 shows a perspective view of the top side of a stator unit of the stator module.

FIG. 17 shows a schematic perspective illustration of the top side of the stator unit 400. The stator unit 400 is designed as a cuboidal plate of which the extent in the vertical direction 7 is smaller than in the first and the second direction 5, 6. The stator unit 400 has a substantially rectangular, in particular square, shape in the plane which is spanned by the first and the second direction 5, 6. The stator unit 400 can be designed, for example, as a, in particular multilayered, printed circuit board and contain an insulating material. The flat stator surface 3 forms the surface of the stator unit 400.

The coil conductors 402 of the stator unit 400 can be designed as electrically conductive, in particular metal, conductor tracks of the printed circuit board. The coil conductors 402 can each have a thickness of greater than 10 μm, in particular greater than 50 μm, in particular greater than 100 μm. In addition, the coil conductors 402 can have a thickness of less than 1 mm, in particular less than 500 μm. In particular, the coil conductors 402 can have a thickness of 250 μm or 210 μm.

The stator unit 400 comprises a first stator sector 411, a second stator sector 412, a third stator sector 413 and a fourth stator sector 414. Provided that no differences are described below, the stator sectors 411, 412, 413, 414 are each of identical construction. The stator sectors 411, 412, 413, 414 for their part each comprise a portion of the elongate coil conductors 402. Each of the coil conductors 402 is completely arranged in one of the stator sectors 411, 412, 413, 414.

The coil conductors 402 of the individual stator sectors 411, 412, 413, 414 are designed in a manner electrically insulated from the coil conductors 402 of the other stator sectors 411, 412, 413, 414. In particular, the stator sectors 411, 412, 413, 414 are designed such that they can be energized independently of one another. The stator sectors 411, 412, 413, 414 are designed such that they can be contacted independently of one another. In particular, there is no electrically conductive connection between the stator sectors 411, 412, 413, 414 or the coil conductors 402 of different stator sectors 411, 412, 413, 414 on the stator unit 400.

The stator sectors 411, 412, 413, 414 are of rectangular design. In particular, the stator sectors 411, 412, 413, 414 can be of square design, so that an extent of the stator sectors 411, 412, 413, 414 in the first direction 5 corresponds to an extent of the stator sectors 411, 412, 413, 414 in the second direction 6. The stator sectors 411, 412, 413, 414 all each have the same dimensions in the first and the second direction 5, 6.

The stator sectors 411, 412, 413, 414 are arranged in a manner adjoining one another in two rows, which are situated next to one another, in the first direction 5 and likewise in two rows, which are situated next to one another, in the second direction 6. The stator sectors 411, 412, 413, 414 of adjacent rows are each arranged in a manner adjoining one another. Along the first direction 5, the stator unit 400 comprises one row containing the first stator sector 411 and the second stator sector 412 and a further row containing the third stator sector 413 and the fourth stator sector 414. Along the second direction 6, the stator unit 400 comprises a row containing the first stator sector 411 and the third stator sector 413 and a further row containing the second stator sector 412 and the fourth stator sector 414.

The stator sectors 411, 412, 413, 414 each have, in the first direction 5 and in the second direction 6, an extent which is half the size of an extent of the stator surface 3, of the stator unit 400 and of the stator module 2 in the corresponding direction. The boundaries of the stator sectors 411, 412, 413, 414 therefore run in the first and the second direction 5, 6 in each case in the center of the stator surface 3 and of the stator unit 400 and intersect in the center of the stator surface 3 and of the stator unit 400. The stator sectors 411, 412, 413, 414 each comprise a quarter of the surface area, that is to say a quadrant, of the stator surface 3 and of the stator unit 400.

The stator sectors 411, 412, 413, 414 each have two outer edges, wherein in each case one of the outer edges is oriented along the first direction 5 and the other of the outer edges is oriented along the second direction 6. The outer edges each terminate flush with the outer edges 30 of the stator surface 3.

In particular, a first outer edge 161 of the first stator sector 411, which first outer edge is oriented along the first direction 5, and a first outer edge 171 of the second stator sector 412, which first outer edge is oriented along the first direction 5, are arranged in a manner terminating with a first outer edge 41 of the stator surface 3, which first outer edge is oriented along the first direction 5. A second outer edge 162 of the first stator sector 411, which second outer edge is oriented along the second direction 6, and a second outer edge 182 of the third stator sector 413, which second outer edge is oriented along the second direction 6, are arranged in a manner terminating with a second outer edge 42 of the stator surface 3, which second outer edge is oriented along the second direction 6. A first outer edge 181 of the third stator sector 413, which first outer edge is oriented along the first direction 5, and a first outer edge 191 of the fourth stator sector 414, which first outer edge is oriented along the first direction 5, are arranged in a manner terminating with a third outer edge 43 of the stator surface 3, which third outer edge is oriented along the first direction 5 and is situated opposite the first outer edge 41. A second outer edge 172 of the second stator sector 412, which second outer edge is oriented along the second direction 6, and a second outer edge 192 of the fourth stator sector 414, which second outer edge is oriented along the second direction 6, are arranged in a manner terminating with a fourth outer edge 44 of the stator surface 3, which fourth outer edge is oriented along the second direction 6 and is situated opposite the second outer edge 42.

The stator sectors 411, 412, 413, 414 are arranged in a manner adjoining one another in the interior of the stator unit 400. The stator sectors 411, 412, 413, 414 each have two inner edges, wherein in each case one of the inner edges is oriented along the first direction 5 and one of the inner edges is oriented along the second direction 6.

A first inner edge 163 of the first stator sector 411, which first inner edge is oriented along the second direction 6, is arranged on a first inner edge 173 of the second stator sector 412, which first inner edge is oriented along the second direction 6. A second inner edge 174 of the second stator sector 412, which second inner edge is oriented along the first direction 5, is arranged on a second inner edge 194 of the fourth stator sector 414, which second inner edge is oriented along the first direction 5. A first inner edge 183 of the third stator sector 413, which first inner edge is oriented along the second direction 6, is arranged on a first inner edge 193 of the fourth stator sector 414, which first inner edge is oriented along the second direction 6. A second inner edge 184 of the third stator sector 413, which second inner edge is oriented along the first direction 5, is arranged on a second inner edge 164 of the first stator sector 411, which second inner edge is oriented along the first direction 5.

In the case of the stator module 2, the first inner edges 163, 173, 183, 193 of the stator sectors 411, 412, 413, 414 each lie on a first line which is oriented along the second direction 6 and the second inner edges 164, 174, 184, 194 lie on a second line which is oriented along the first direction 5. The first inner edges 163, 173 of the first and the second stator sector 411, 412 are arranged in alignment with the first inner edges 183, 193 of the third and the fourth stator sector 413, 414 on the first line. The second inner edges 164, 184 of the first and the third stator sector 411, 413 are arranged in alignment with the second inner edges 174, 194 of the second and the fourth stator sector 412, 414 on the second line.

The first line runs perpendicularly in relation to the second line. The first line is arranged in the first direction 5 in the center of the stator module 2 and of the stator unit 400 between the first stator sector 411 and the second stator sector 412, and also between the third stator sector 413 and the fourth stator sector 414. In particular, the first line is arranged centrally between the second and the fourth outer edge 42, 44 of the stator surface 3 and of the stator module 2. The first line forms a first center line of the stator surface 3 and of the stator module 2, which first line is oriented along the second direction 6. The second line is arranged in the second direction 6 in the center of the stator module 2 and of the stator unit 400 between the first stator sector 411 and the third stator sector 413, and also between the second stator sector 412 and the fourth stator sector 414. In particular, the second line is arranged centrally between the first and the third outer edge 41, 43 of the stator surface 3 and of the stator module 2. The second line forms a second center line of the stator surface 3 and of the stator module 2, which center line is oriented along the first direction 5.

On the first line, a first contact structure 421 is arranged between the first stator sector 411 and the second stator sector 412 and a third contact structure 423 is arranged between the third stator sector 413 and the fourth stator sector 414. On the second line, a second contact structure 422 is arranged between the second stator sector 412 and the fourth stator sector 414 and a fourth contact structure 424 is arranged between the first stator sector 411 and the third stator sector 413. The first and the third contact structure 421, 423 each have connection points which are arranged next to one another on the second line. The second and the fourth contact structure 422, 424 each have connection points which are arranged next to one another on the first line. The connection points can each be designed as contact holes or vias (vertical interconnect access) in the stator unit 400 and comprise conductively coated passage openings through the stator unit 400. The first, the second, the third and the fourth contact structure 421, 422, 423, 424 together form a cruciform contact arrangement 420 which is oriented along the center lines of the stator unit 400 in the first and the second direction 5, 6.

The coil conductors 402 are arranged in a plurality of stator layers or stator planes, which are situated one above the other, within the stator sectors 411, 412, 413, 414, wherein each of the stator layers has only coil conductors 402 which are extended either substantially along the first direction 5 or substantially along the second direction 6. Apart from the extent of the coil conductors 402 and provided that no differences are described below, the stator sectors 411, 412, 413, 414 are of identical design on the different stator layers. In the stator unit 400 of the stator module 2 illustrated in FIG. 17, the stator layer on the stator surface 3 comprises only coil conductors 402 which are extended substantially along the first direction 5.

Figure 18:
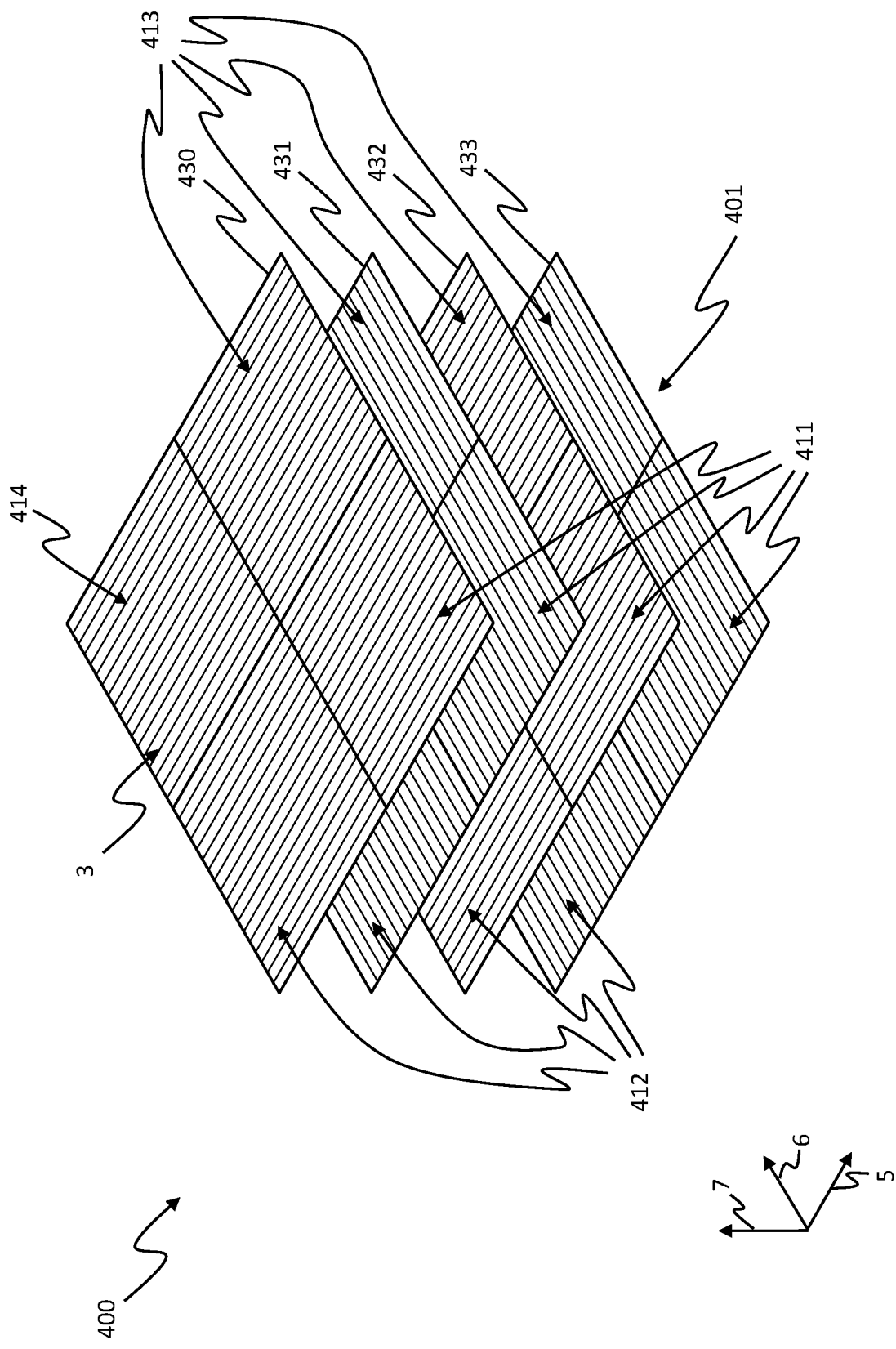
FIG. 18 shows a perspective exploded view of the stator unit with individual stator layers.

The stator layer, visible in FIG. 17, on the stator surface 3 forms a first stator layer of the stator unit 400. The stator unit 400 further comprises at least one second stator layer below the first stator layer in the vertical direction 7. FIG. 18 shows a schematic perspective illustration of an exploded view of the stator unit 400 with the individual stator layers. The contact structures 421, 422, 423, 424 are arranged between the stator sectors 411, 412, 413, 414.

The stator unit 400 comprises a second stator layer 431 beneath the first stator layer 430, which first stator layer is arranged on the stator surface 3, a third stator layer 432 beneath the second stator layer 431 and a fourth stator layer 433 beneath the third stator layer 432 in the vertical direction 7. Provided that no differences are described below, the second, the third and the fourth stator layer 431, 432, 433 are designed like the first stator layer 430, illustrated in FIG. 17, on the stator surface 3 of the stator unit 400. The stator layers 430, 431, 432, 433 which are arranged one above the other are each designed in a manner electrically insulated from one another. For example, the stator layers 430, 431, 432, 433 can each be designed as conductor track layers of a multilayer printed circuit board which are insulated from one another.

Unlike in the first and the third stator layer 430, 432, the coil conductors 402 are expanded substantially along the second direction 6 in the second stator layer 431 and the fourth stator layer 433. The stator sectors 411, 412, 413, 414 each have the same dimensions in all of the stator layers 430, 431, 432, 433. In particular, stator sectors 411, 412, 413, 414 which are situated one above the other each have the same dimensions in the first direction 5 and in the second direction 6 in all of the stator layers 430, 431, 432, 433. The coil conductors 402 of the individual stator sectors 411, 412, 413, 414 are each designed in a manner electrically insulated from the coil conductors 402 of the other stator sectors 411, 412, 413, 414 in the second, the third and the fourth stator layer 431, 432, 433, as in the first stator layer 430.

Alternative embodiments of the stator unit 400 can comprise further stator layers which are arranged one beneath the other in the vertical direction 7 beneath the stator layers 430, 431, 432, 433. In this case, stator layers with coil conductors 402 which are extended substantially along the first direction 5 and stator layers with coil conductors 402 which are extended substantially along the second direction 6 can be arranged one above the other in a respectively alternating manner.

The connection points, illustrated in FIG. 17, of the contact structures 421, 422, 423, 424 are designed for making electrically conductive contact with the coil conductors 402. The first contact structure 421, which is arranged between the first stator sector 411 and the second stator sector 412, comprises all of the connection points of coil conductors 402 which are arranged in the first and the second stator sector 411, 412 in the stator layers 430, 432 with coil conductors 402 which are oriented substantially along the first direction 5. In particular, the first contact structure 421 comprises all of the connection points of the coil conductors 402 which are arranged in the first and the second stator sector 411, 412 in the first and the third stator layer 430, 432.

The third contact structure 423, which is arranged between the third stator sector 413 and the fourth stator sector 414, comprises all of the connection points of coil conductors 402 which are arranged in the third and the fourth stator sector 413, 414 in the stator layers 430, 432 with coil conductors 402 which are oriented substantially along the first direction 5. In particular, the third contact structure 423 comprises all of the connection points of the coil conductors 402 which are arranged in the third and the fourth stator sector 413, 414 in the first and the third stator layer 430, 432.

The second contact structure 422, which is arranged between the second stator sector 412 and the fourth stator sector 414, comprises all of the connection points of coil conductors 402 which are arranged in the second and the fourth stator sector 412, 414 in the stator layers 431, 433 with coil conductors 402 which are oriented substantially along the second direction 6. In particular, the second contact structure 422 comprises all of the connection points of the coil conductors 402 which are arranged in the second and the fourth stator sector 412, 414 in the second and the fourth stator layer 431, 433.

The fourth contact structure 424, which is arranged between the first stator sector 411 and the third stator sector 413, comprises all of the connection points of coil conductors 402 which are arranged in the first and the third stator sector 411, 413 in the stator layers 431, 433 with coil conductors 402 which are oriented substantially along the second direction 6. In particular, the fourth contact structure 424 comprises all of the connection points of the coil conductors 402 which are arranged in the first and the third stator sector 411, 413 in the second and the fourth stator layer 431, 433.

The connection points of all of the coil conductors 402, which are extended along the first direction 5, are arranged on the first line which is oriented along the second direction 6. The connection points of all of the coil conductors 402, which are oriented along the second direction 6, are arranged on the second line which is oriented along the first direction 5.

The coil conductors 402 in the individual stator sectors 411, 412, 413, 414 can each be interconnected to form polyphase systems with a common star point. The star point can be formed on the stator unit 400. In particular, the coil conductors 402 can be interconnected to form three-phase systems with a common star point. The three-phase systems can each comprise six adjacent coil conductors 402. The number of adjacent coil conductors in one of the three-phase systems can also respectively be three, twelve or another multiple of three.

The polyphase systems can be contact-connected on the stator unit 400 in such a way that a drive current can be applied to each of the polyphase systems independently of the other polyphase systems. As an alternative, in each case two or more of the polyphase systems can also be connected to one another on the stator unit 400 in such a way that a common drive current is applied to each of the connected polyphase systems together. For example, the connected polyphase systems can be connected on the stator unit 400 in series or in parallel.

The stator sectors 411, 412, 413, 414 can each comprise eighteen coil conductors 402 in each stator layer 430, 431, 432, 433, as illustrated in FIGS. 17 and 18. In each case six adjacent coil conductors 402 can be interconnected to form a three-phase system and the stator sectors 411, 412, 413, 414 can each comprise three three-phase systems which are situated next to one another in the first direction 5 and in each case three three-phase systems which are situated next to one another in the second direction 6. In this case, coil conductors 402, which are expanded substantially in the same direction 5, 6 and lie one above the other in the stator layers 430, 431, 432, 433, can be interconnected in series to form a common three-phase system. In this case, the coil conductors 402 can be interconnected in such a way that the same drive current is applied to each of the coil conductors 402 which are situated one above the other in the vertical direction 7. Therefore, the three-phase systems have three phases which are assembled from coil conductors 402 which are situated one above the other in the stator layers 430, 431, 432, 433.

For example, all of the coil conductors 402 which are situated one above the other and are oriented in parallel can each be connected in series in the individual stator layers 430, 431, 432, 433. In particular, the coil conductors 402 of three-phase systems which are situated one above the other in the first stator layer 430 and in the third stator layer 432, and also the coil conductors 402 of three-phase systems which are situated one above the other in the second stator layer 431 and in the fourth stator layer 433, can in each case be interconnected in series to form a common three-phase system. In this case, all of the coil conductor 402 of the first and third stator layer 430, 432 and of the second and fourth stator layer 431, 433, which coil conductors lie one above the other in the vertical direction and are oriented in parallel, can be connected in series in each case.

When the coil conductors 402 are interconnected to form three-phase systems with a common star point, the three free connections of the individual phrases can each be electrically conductively connected to one of the connection points. If the stator sectors 411, 412, 413, 414 each comprise three three-phase systems in the first direction 5 and three three-phase systems in the second direction 6 with six coil conductors 402 in each case, the stator sectors 411, 412, 413, 414 each have eighteen connections which are connected to eighteen connection points of the contact arrangement 420. The first, the second, the third and the fourth contact structure 421, 422, 423, 424 then each comprise eighteen connection points.

An electrically conductive connection between the connection points and the coil conductors 402 of the phases of the polyphase systems can take place in any desired stator layer 430, 431, 432, 433 of the stator unit 400. In particular, there can be an electrically conductive connection between one of the connection points and one of the coil conductors 402 in the stator layers 431, 432 which are arranged in the interior of the stator unit 400 in the vertical direction 7. The stator layers 431, 432 which are arranged in the interior of the stator unit 400 form inner layers of the stator unit 400, while the stator layers 430, 433 which are arranged on the stator surface 3 and on a base surface 401 of the stator unit 400, which base surface is situated opposite the stator surface 3, form outer layers of the stator unit 400. The inner layers are therefore arranged between the outer layers. In the stator unit 400 illustrated in FIG. 18, the first stator layer 430 and the fourth stator layer 433 each form outer layers and the second stator layer 431 and the third stator layer 432 each form inner layers of the stator unit 400.

Instead of interconnecting the coil conductors 402 to form polyphase systems, in alternative embodiments of the stator unit 400, the coil conductors 402 or coil conductors 402 of a plurality of stator layers 430, 431, 432, 433, which coil conductors are situated one above the other and are connected in series in each case, can also be separately connected to respectively dedicated connection points. In particular, each of the coil conductors 402 can be connected to one of the connection points individually and independently of all of the other coil conductors 402 and an electric drive current can be applied to each of said coil conductors via the respective connection point.

The stator unit 400 is free of connection points or contact structures on the outer edges 30 of the stator surface 3. In particular, the coil conductors 402 of the stator unit 400 are contacted exclusively via the first, the second, the third and the fourth contact structure 421, 422, 423, 424 which are arranged in the interior, in particular on the center lines, of the stator unit 400 and of which the connection points are contacted. The stator unit 400 is designed for a drive current to be applied to the coil conductors 402 exclusively via connection points which are arranged on the center lines of the stator surface 3.

Figure 19:
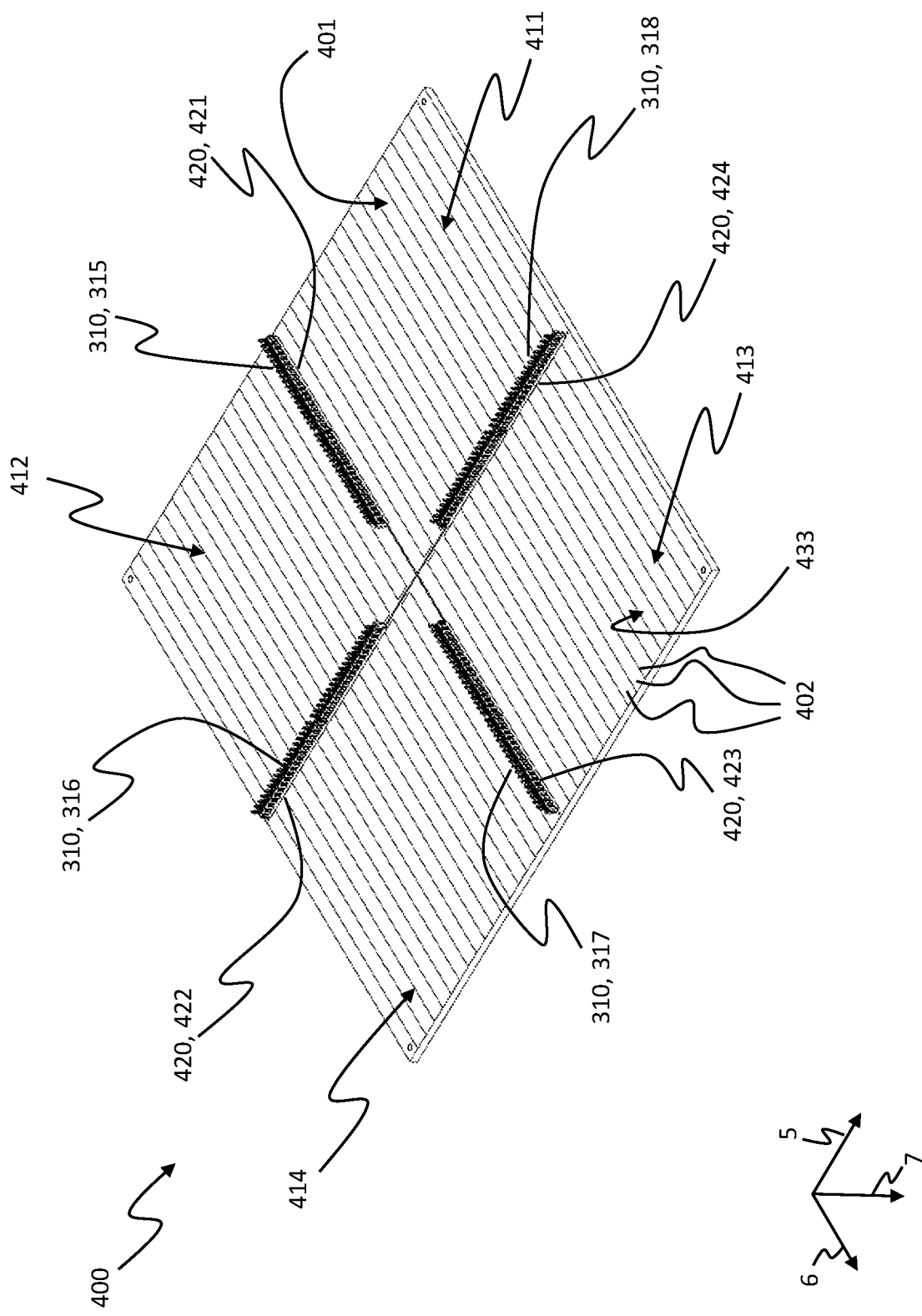
FIG. 19 shows a perspective view of the bottom side of the stator unit.

FIG. 19 shows a schematic perspective illustration of the bottom side of the stator unit 400. The base surface 401 of the stator unit 400, which base surface is situated opposite the stator surface 3, is of flat design. The coil conductors 402 of the fourth stator layer 433 are arranged on the base surface 401. The stator unit 400 can be free of electronic parts or components on its bottom side. The cruciform contact arrangement 420 can be contacted from the bottom side of the stator unit 400. For example, the contact holes of the contact arrangement 420 can be exposed on the bottom side of the stator unit 400.

The stator unit 400 and the power module 300 are electrically conductively connected to one another via a fourth connecting line 310. The fourth connecting line 310 passes from the top side of the power module 300 to the bottom side and the base surface 401 of the contact unit 400.

The contact arrangement 420 of the stator unit 400 is electrically conductively connected to a connection arrangement 311, 312, 313, 314, illustrated in FIG. 16, of the power module 300 via the fourth connecting line 310. The connection arrangement 311, 312, 313, 314 of the power module 300 can be of cruciform design, like the contact arrangement 420 of the stator unit 400. The connection arrangement 311, 312, 313, 314 of the power module 300 can comprise, for example, conductively coated passage openings or contact holes. The contact holes of the connection arrangement 311, 312, 313, 314 of the power module 300 can be designed like the contact holes of the contact arrangement 420 of the stator unit 400. The contact holes of the connection arrangement 311, 312, 313, 314 of the power module 300 can be arranged directly beneath the contact holes of the contact arrangement 420 of the stator unit 400 and can be oriented in alignment with the contact holes of the contact arrangement 420 of the stator unit 400, so that a contact hole in the stator module 300, which contact hole is aligned with the relevant contact hole in the stator unit 400, is situated opposite each contact hole in the stator unit 400, and vice versa.

As illustrated in FIG. 16, the cruciform connection arrangement 311, 312, 313, 314 of the power module 300 is arranged along the center lines of the power module 300 which run in the first direction 5 and the second direction 6. In particular, the cruciform connection arrangement 311, 312, 313, 314 of the power module 300 is arranged centrally on the beam of the power module 300 of cruciform design. In particular, the power module 300 comprises a first connection arrangement 311 which is arranged centrally on the beam of the power module 300 in the first direction 5, which beam is oriented along the second direction 6, a second connection arrangement 312 which is arranged centrally on the beam of the power module 300 in the second direction 6, which beam is oriented along the first direction 5, a third connection arrangement 313 which is arranged centrally on the beam of the power module 300 in the first direction 5, which beam is oriented along the second direction 6, and in a manner arranged opposite the first connection arrangement 311, and a fourth connection arrangement 314 which is arranged centrally on the beam of the power module 300 in the second direction 6, which beam is oriented along the first direction 5, and in a manner arranged opposite the second connection arrangement 312.

The first connection arrangement 311 is arranged on the second module unit 322 of the power module 300, the second connection arrangement 312 is arranged on the third module unit 324, the third connection arrangement 313 is arranged on the fourth module unit 326 and the fourth connection arrangement 314 is arranged on the first module unit 320. The connection arrangements 311, 312, 313, 314 are each arranged centrally on the module units 320, 322, 324, 326, in particular centrally on the rectangular parts of the module units 320, 322, 324, 326.

The first connection arrangement 311 of the power module 300 is arranged below the first contact structure 421 of the stator unit 400, the second connection arrangement 312 of the power module 300 is arranged below the second contact structure 422 of the stator unit 400, the third connection arrangement 313 of the power module 300 is arranged below the third contact structure 423 of the stator unit 400 and the fourth connection arrangement 314 of the power module 300 is arranged below the fourth contact structure 424 of the stator unit 400. The connection arrangements 311, 312, 313, 314 of the power module 300 are oriented parallel to the contact structure 421, 422, 423, 424 of the stator unit 400 which is respectively situated thereabove.

The fourth connecting line 310 is of cruciform design. The fourth connecting line 310 comprises a contact 315, 316, 317, 318, illustrated in FIG. 19, via which the connection arrangement 311, 312, 313, 314 of the power module 300 is electrically conductively connected to the contact structure 421, 422, 423, 424 of the stator unit 400. The contact 315, 316, 317, 318 can, as illustrated in FIG. 19, comprise a first contact 315 which connects the first connection arrangement 311 of the power module 300 to the first contact structure 421 of the stator unit 400, a second contact 316 which connects the second connection arrangement 312 of the power module 300 to the second contact structure 422 of the stator unit 400, a third contact 317 which connects the third connection arrangement 313 of the power module 300 to the third contact structure 423 of the stator unit 400, and a fourth contact 318 which connects the fourth connection arrangement 314 of the power module 300 to the fourth contact structure 424 of the stator unit 400.

The fourth connecting line 310 can comprise one or more pin strips which are arranged in a cruciform manner. In particular, the contact 315, 316, 317, 318 can each comprise one pin strip, as is illustrated in FIGS. 6 and 19. The pin strips comprise electrically conductive pins which are arranged next to one another and which can be designed as straight, round cylinders. The pins are arranged in a manner engaging into the contact holes of the connection arrangement 311, 312, 313, 314 of the power module 300 and into the opposite contact holes of the contact arrangement 420 of the stator unit 400 in order to establish an electrically conductive connection between the contact structures 421, 422, 423, 424 and the connection arrangements 311, 312, 313, 314. The contact 315, 316, 317, 318 comprising pin strips can be designed, in particular, as press-in connectors or press-fit connectors which are pressed into the contact holes in the stator unit 400 and/or into the contact holes in the power module 300.

In particular, each module unit 320, 322, 324, 326 of the power module 300 can be electrically conductively connected to precisely one of the contact structures 421, 422, 423, 424 of the stator unit 400 via in each case precisely one of the contact 315, 316, 317, 318. The second module unit 322 is connected to the first contact structure 421 of the stator unit 400 via the first contact 315, the third module unit 324 is connected to the second contact structure 422 of the stator unit 400 via the second contact 316, the fourth module unit 326 is connected to the third contact structure 423 of the stator unit 400 via the third contact 317 and the first module unit 320 is connected to the fourth contact structure 424 of the stator unit 400 via the fourth contact 318.

The first module unit 320 is electrically conductively connected to the coil conductors 402 of the first and the third stator sectors 411, 413, which coil conductors are oriented along the second direction 6, via the fourth connecting line 310. The second module unit 322 is electrically conductively connected to the coil conductors 402 of the first and the second stator sector 411, 412, which coil conductors are oriented along the first direction 5, via the fourth connecting line 310. The third module unit 324 is electrically conductively connected to the coil conductors 402 of the second and the fourth stator sector 412, 414, which coil conductors are oriented along the second direction 6, via the fourth connecting line 310. The fourth module unit 326 is electrically conductively connected to the coil conductors 402 of the third and the fourth stator sector 413, 414, which coil conductors are oriented along the first direction 5, via the fourth connecting line 310.

Figure 20:
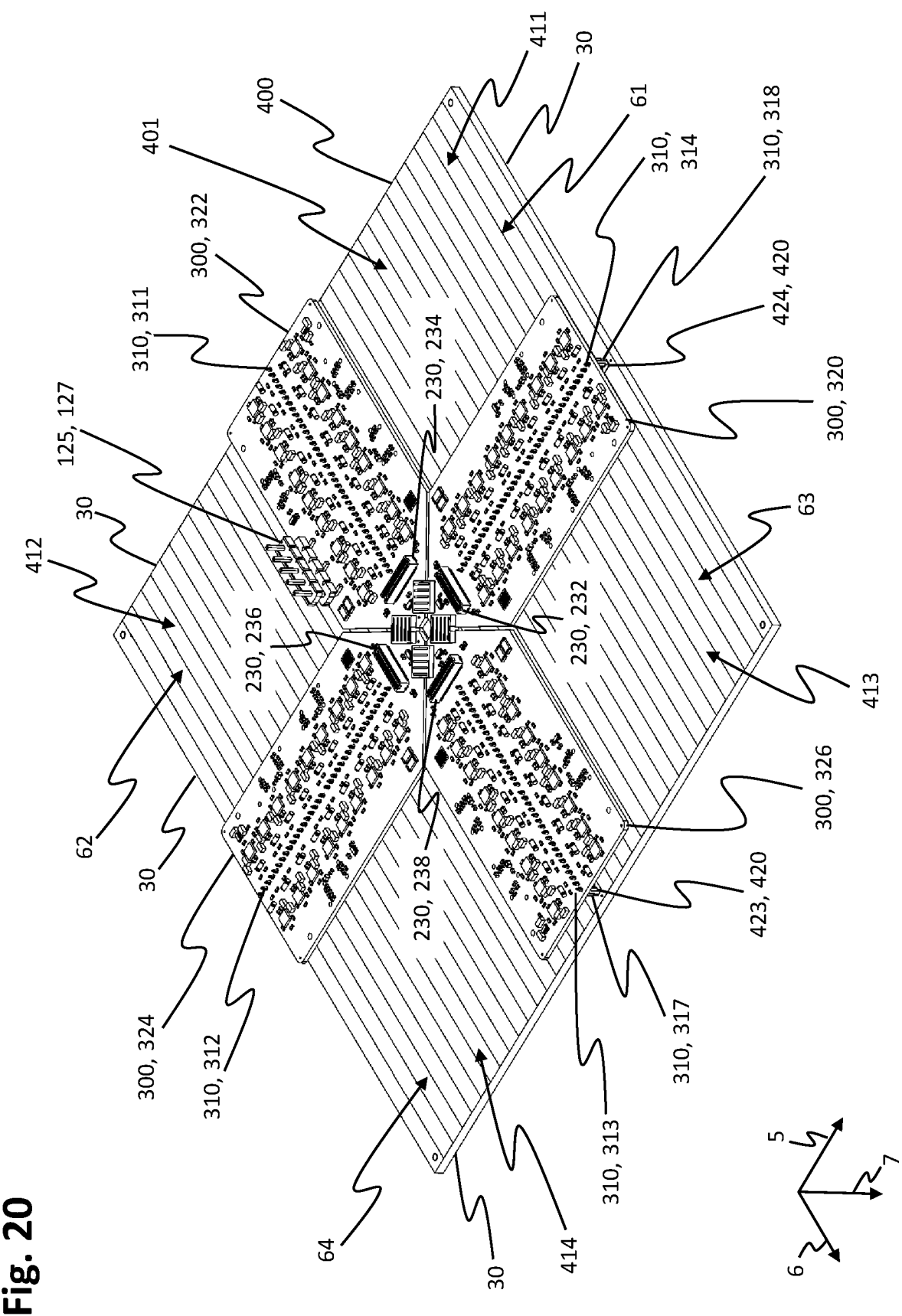
FIG. 20 shows a perspective view of the bottom side of the power module with the stator unit which is connected to the power module.

FIG. 20 shows a schematic perspective illustration of the bottom side of the power module 300 and of the stator unit 400, wherein the power module 300 is connected to the stator unit 400 via the fourth connecting line 310. The electronic components which are arranged on the bottom side of the power module 300 are illustrated in FIG. 20.

The fourth connecting line 310 can be designed as a mechanically fixed or rigid connection between the power module 300 and the stator unit 400. At the same time, the fourth connecting line 310 can be designed to be elastic enough to compensate for different coefficients of thermal expansion of the stator unit 400 and of the power module 300 without loss of the electrical contact-connection. A mechanically fixed and rigid connection together with compensation of different coefficients of thermal expansion can be achieved, inter alia, wherein the fourth connecting line 310 has contact 315, 316, 317, 318 which comprise pin strips or press-in connectors.

The stator unit 400 and the power module 300 can be arranged at a fixed distance from one another in the vertical direction 7 and the fourth connecting line 310 can be designed to electrically conductively connect the stator unit 400 and the power module 300 over the distance. The distance can be dimensioned in such a way that a sufficient amount of installation space for electronic components is available on the top side of the power module 300 between the stator unit 400 and the power module 300. A distance which is dimensioned in such a way is provided, in particular, by the fourth connecting line 310 with contact 315, 316, 317, 318 which are designed as pin strips or press-in connectors. As an alternative or in addition, the distance can be dimensioned in such a way that electromagnetic coupling between the coil conductors 402 of the stator unit 400 and conductor surfaces or conductor tracks on the power module 300 is minimized. This is the case, inter alia, with the fourth connecting line 310 with contact 315, 316, 317, 318 which are designed as pin strips or press-in connectors. The distance can be, for example, between 2.5 mm and 10 mm, in particular 5 mm.

In alternative embodiments of the stator module 2, the contact 315, 316, 317, 318 can also comprise an electrical plug-in connector or a plurality of electrical plug-in connectors which electrically conductively connect the connection arrangement 311, 312, 313, 314 of the power module 300 and the contact arrangement 420 of the stator unit 400. Contact 315, 316, 317, 318 with electrical plug-in connectors can also be designed to connect the stator unit 400 and the power module 300 over the distance required for arranging the electronic components and/or to have an elasticity for compensating for different coefficients of thermal expansion and/or to establish a mechanically fixed connection between the stator unit 400 and the power module 300. In further alternative embodiments of the stator module 2, the contact 315, 316, 317, 318 can also be designed as a solder connection, wherein the connection arrangement 311, 312, 313, 314 of the power module 300 and the contact arrangement 420 of the stator unit 400 are designed as solder contact areas and are electrically conductively connected via the solder connection.

As illustrated in FIG. 20, the cruciform power module 300 overlaps the base surface 401 of the stator unit 400 in the region of the cruciform contact arrangement 420 of the stator unit 400. In particular, the power module 300 overlaps the contact arrangement 420 itself. A first clearance 61 is formed above the first stator sector 411. In addition, a second clearance 62 can be formed above the second stator sector 412, a third clearance 63 can be formed above the third stator sector 413 and a fourth clearance 64 can be formed above the fourth stator sector 414, as illustrated in FIG. 20. At the clearances 61, 62, 63, 64, the base surface 401 of the stator unit 400 is not overlapped by the power module 300 and the base surface 401 of the stator unit 400 is accessible at the clearances 61, 62, 63, 64 from the bottom side of the power module 300 and the top side 551 of the module housing 500.

More than 30% of the base surface 401 the stator unit 400 can be accessible from the bottom side of the power module 300 and the top side 551 of the module housing 500 in the clearances 61, 62, 63, 64. In particular, more than 40%, more than 50%, in particular 52% to 56%, in particular 54%, of the base surface 401 of the stator unit 400 can be accessible in the clearances 61, 62, 63, 64.

The clearances 61, 62, 63, 64 are arranged above the stator sectors 411, 412, 413, 414 in each case in corner regions of the rectangular stator unit 400, wherein the corner regions each adjoin the outer edges 30 of the stator unit 400 which run along the first direction 5 and along the second direction 6. The clearances 61, 62, 63, 64 are of rectangular design and extend in the first and the second direction 5, 6 in each case between one of the outer edges 30 of the stator unit 400 and an outer edge of the power module 300.

The first clearance 61 adjoins the first module unit 320 and the second module unit 322. The first clearance 61 is located or extends between the second module unit 322 and an outer edge 30 of the stator surface 3, which runs along the second direction 6, in the first direction 5 and between the first module unit 320 and an outer edge 30 of the stator surface 3, which outer edge runs along the first direction 5, in the second direction 6. The second clearance 62 adjoins the second module unit 322 and the third module unit 324. The second clearance 62 is located or extends between the second module unit 322 and an outer edge 30 of the stator surface 3, which outer edge runs along the second direction 6, in the first direction 5 and between the third module unit 324 and an outer edge 30 of the stator surface 3, which outer edge runs along the first direction 5, in the second direction 6.

The third clearance 63 adjoins the first module unit 320 and the fourth module unit 326. The third clearance 63 is located or extends between the fourth module unit 326 and an outer edge 30 of the stator surface 3, which runs along the second direction 6, in the first direction 5 and between the first module unit 320 and an outer edge 30 of the stator surface 3, which outer edge runs along the first direction 5, in the second direction 6. The fourth clearance 64 adjoins the third module unit 324 and the fourth module unit 326. The fourth clearance 64 is located or extends between the fourth module unit 326 and an outer edge 30 of the stator surface 3, which outer edge runs along the second direction 6, in the first direction 5 and between the third module unit 324 and an outer edge 30 of the stator surface 3, which outer edge runs along the first direction 5, in the second direction 6.

The stator unit 400 and the power module 300 which is arranged on the bottom side of the stator unit 400 are arranged on the top side 551 of the module housing 500 or of the housing cover 510. The stator unit 400 lies on the housing cover 510 at the outer edges 30 of the stator surface 3 and at the side surfaces 32 of the stator unit 400. In particular, the stator unit 400 lies on that border 513 which is formed on the top side 551 of the housing cover 510 at the outer edges 30 of the stator surface 3 and at the side surfaces 32 of the stator unit 400.

The power module 300 is arranged in the installation space 514, which is surrounded by the border 513, on the top side 551 of the housing cover 510. In particular, the power module 300 is arranged and embedded between the thermally conductive structures 530, which are formed on the top side 551 of the housing cover 510, in the first and the second direction 5, 6. The stator unit 400 which lies on the border 513 covers the installation space 514 for the power module 300 on its top side.

The thermally conductive structures 530 are respectively arranged in the clearances 61, 62, 63, 64 which are located on the bottom side of the stator unit 400. The base surface 401 of the stator unit 400 respectively bears against the thermally conductive structures 530, which are arranged on the top side 551 of the module housing 500, in the clearances 61, 62, 63, 64. In particular, the base surface 410 of the stator unit 400 respectively lies on the flat bearing surfaces of the thermally conductive structures 530 in the clearances 61, 62, 63, 64.

There is a thermally conductive connection between the module housing 500 and the stator unit 400. The thermally conductive connection can be established, in particular, by way of the base surface 401 of the stator unit 400 bearing against the bearing surfaces of the thermally conductive structures 530.

The stator unit 400 and the power module 300 can be connected to the module housing 500 via an adhesive connection. In particular, the stator unit 400 and the power module 300 with the housing cover 510 can be potted by a potting compound. For example, the installation space 514 with the power module 300, which is located in the installation space 514, between the stator unit 400 and the housing cover 510 can be potted with the potting compound. The potting compound can be of electrically insulating design. The stator unit 400 and the stator housing 500 can likewise be thermally conductively connected via the adhesive connection and/or the potting compound. The potting compound can have a thermal conductivity of more than 0.3 W/m·K, in particular of more than 0.5 W/m·K, in particular of 0.61 W/m·K.

As illustrated in FIG. 14, the module housing 500, in particular the housing cover 510, has a filling opening 516 via which the potting compound can be introduced into the installation space 514. The filling opening 516 can be arranged on one of the side surfaces 34 of the module housing 500. In particular, a filling opening 516 can be formed on the side surface 34 in the region of the encircling border 513 on the top side 551 of the module housing 500 or housing cover 510. The filling opening 516 constitutes a connection between the exterior of the stator module 2 and the installation space 514, which is formed on the top side 551 of the module housing 500, between the stator unit 400 and the module housing 500.

A method for introducing the potting compound into the installation space 514 can comprise arranging the stator unit 400 and the power module 300, which is connected to the stator unit 400 via the fourth connecting line 310, on the top side 551 of the module housing 500. In this case, the power module 300 can be arranged in the installation space 514. In addition, during the arrangement, the installation space 514 at the encircling border 513 can be closed by the stator unit 400 which bears against the border 513. The method can then comprise filling the potting compound into the installation space via the filling opening 516. Before filling, the method can comprise erecting the module housing 500 and the stator unit 400, in the case of which the module housing 500 is moved to a position in which the filling opening 516 is oriented upward in relation to the direction of gravity. In particular, the module housing 500 can be arranged in such a way that the module housing 500 lies on a substrate on a side surface 34 which is situated opposite the side surface 34 with the filling opening 516. The method can then comprise curing of the potting compound.

The filling opening 516 can be arranged centrally on the side surface 34 of the module housing 500 in the first or the second direction 5, 6. In addition to the filling opening 516, the module housing 500 can comprise further filling openings 517. The further filling openings 517 can be arranged on the same side surface 34 of the module housing 500 as the filling opening 516. For example, the module housing 500 can comprise two further filling openings 517, as is illustrated in FIG. 14. The further filling openings 517 can respectively be arranged between the filling opening 516 and the border of the side surface 34 in question on either side of the filling opening 516. The further filling openings 517 can be formed on the side surface 34 of the module housing 500, for example, in the region of the thermally conductive structures 530.

An electromagnetic shielding layer is arranged between the stator unit 400 and the sensor module 200 in the vertical direction 7. The shielding layer is designed to shield electromagnetic fields which are generated on the stator unit 400 from the sensor module 200. In particular, the shielding layer is designed to shield electromagnetic alternating fields from the sensor module 200. The electromagnetic fields to be shielded can be generated, in particular, by the drive currents which flow in the coil conductors 402. In the case of the stator module 2, the electromagnetic shielding layer is formed between the stator unit 400 and the sensor module 200 by the housing cover 510 which is arranged between the stator unit 400 and the sensor module 200.

The first connecting line 120 can be embodied as a mechanically rigid connection between the connection module 100 and the power module 300. As an alternative or in addition, the second connecting line 125 can be designed as a mechanically rigid connection between the connection module 100 and the power module 300. As an alternative or in addition, the third connecting line 230 can be designed as a mechanically rigid connection between the sensor module 200 and the power module 300. As an alternative or in addition, the fourth connecting line 310 can be designed as a mechanically rigid connection between the power module 300 and the stator unit 400. As an alternative, each of the connecting lines 120, 125, 230, 310 can also be designed as a mechanically flexible connection to a flexible line, for example by a cable.

In comparison to a one-piece, cruciform design of the power module 300, less waste is created in respect of the circuit board or printed circuit board of the power module 300 in the case of the embodiment of the power module 300 illustrated in FIGS. 15, 16 and 20 when producing the four module units 320, 322, 324, 326. In addition, the individual press-fit connectors, which each connect one of the module units 320, 322, 324, 326 to the stator unit 400, can each be pressed individually and one after the other with the module units 320, 322, 324, 326 in question and with the stator unit 400 when forming the fourth connecting line 310. As a result, tilting of the contact 315, 316, 317, 318, as can easily occur when pressing a plurality of contact 315, 316, 317, 318 at the same time, can be avoided during the pressing operation.

Figure 21:
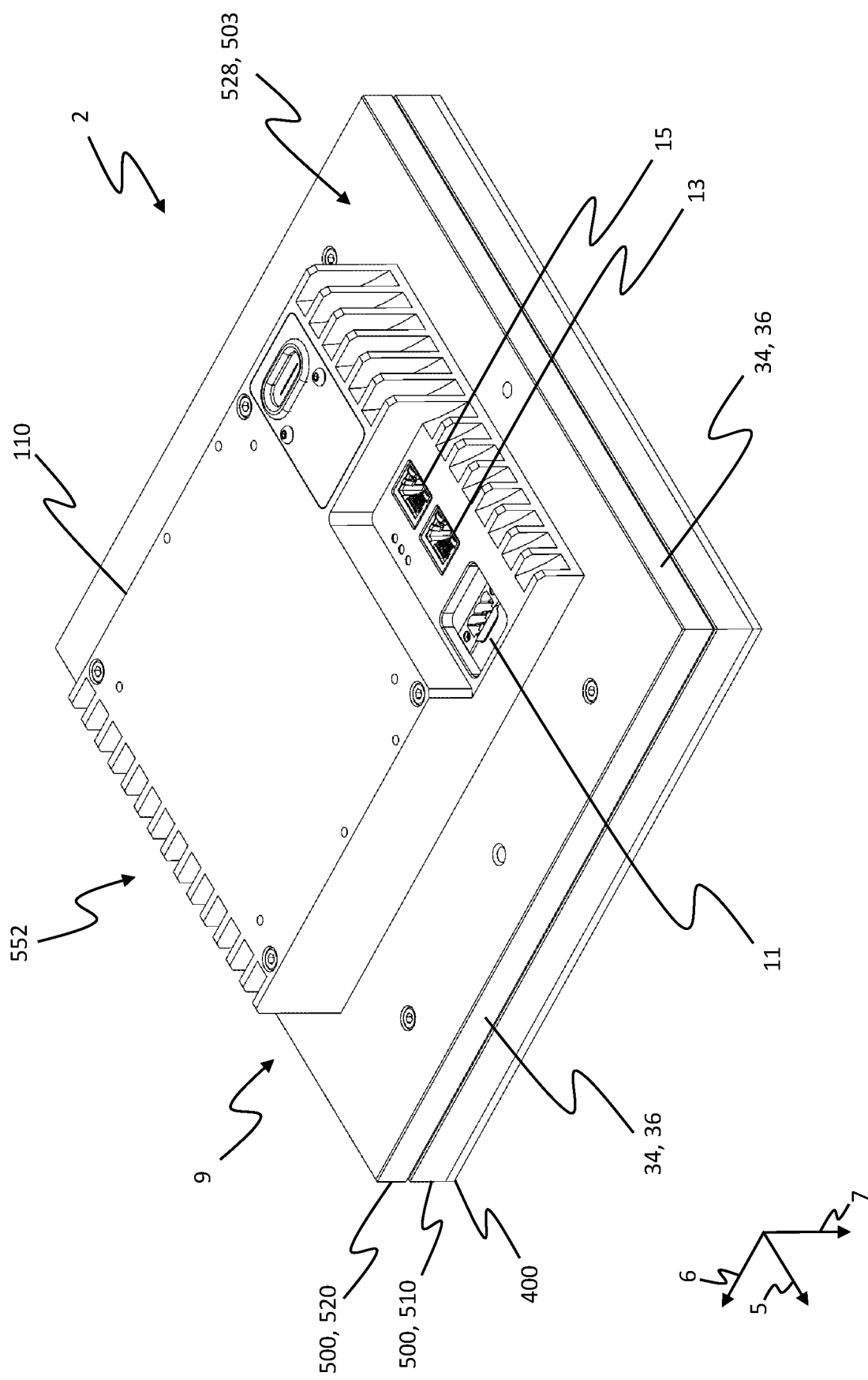
FIG. 21 shows a perspective view of the bottom side of the stator module.

FIG. 21 shows a schematic perspective illustration of the bottom side 9 of the stator module 2. The module covering 110 is arranged on the module housing 500 on the bottom side 9 of the stator module 2. The bottom side 552 of the module housing 500 is partially exposed on the bottom side 9 of the stator module 2. In particular, the base surface 528 of the housing base 520 is partially exposed on the bottom side 9 of the stator module 2.

The portion of the stator module 2 or of the base surface 528 which is exposed on the bottom side 9 forms a bearing surface 503 of the module housing 500 and of the stator module 2. The bearing surface 503 is of flat design. The bearing surface 503 is arranged in a border region of the base surface 528, which border region adjoins the side surfaces 34 of the module housing 500 and the side surfaces 36 of the stator module 2 on the base surface 528. The bearing surface 503 is arranged between the module covering 110 and the side surfaces 34, 36.

The bearing surface 503 can be designed in a manner encircling the module covering 110, as illustrated in FIG. 21. As an alternative, the bearing surface 503 can also be formed only on two sides of the module covering 110, which two sides are situated opposite one another in the first direction 5 or in the second direction 6, between the module covering 110 and the side surfaces 34, 36.

The bearing surface 503 of the stator module 2 can be arranged in a manner resting on a support or machine bed which supports the stator module 2. In particular, the bearing surface 503 can be arranged so as to rest flat on the support or the machine bed. The thermally conductive connection between the stator module 2 and the support or machine bed can be created via the bearing surface 503. The support or the machine bed can comprise a cooling apparatus for cooling the bearing surface 503.

The widths of the bearing surface 503 on sides of the stator module 2 which are opposite the first direction 5 can be of equal magnitude. As an alternative or in addition, the widths of the bearing surface 503 on sides of the stator module 2 which are opposite in the second direction 6 can be of equal magnitude. The widths of the bearing surface 503 on the sides of the stator module 2 which are opposite in the first direction 5 and on the sides of the stator module 2 which are opposite in the second direction 6 can be of different magnitude, as illustrated in FIG. 21. However, they can also be of equal magnitude.

The bearing surface 503 can have a width of more than 5%, for example of 10%, or of more than 15%, for example of 20%, of the total width of the base surface 528 between the side surfaces 34, 36 and the module covering 110 in the first and/or the second direction 5, 6 in each case. In particular, the bearing surface 503 can have a width of more than 15%, for example of 20%, of the total width of the base surface 528 between the side surfaces 34, 36 and the module covering 110 in the first direction 5 in each case and a width of more than 5%, but less than 15%, for example of 10%, of the total width of the base surface 528 in the second direction 6 in each case. As an alternative, in the second direction 6, the widths of the bearing surface 503 can be precisely 5% or less than 5% of the total width of the base surface 528 in the second direction 6. In particular, no bearing surface can be formed on the side surfaces 34, 36 which run along the first direction 5, and therefore the width of the bearing surface 503 in the second direction 6 is precisely 0% of the total width of the base surface 528 in the second direction 6 and the module covering 110 terminates flush with the outer edges 34, 36 in the second direction 6. The bearing surface 503 can comprise a surface area of more than 25%, in particular of more than 50%, of the total surface area of the base surface 528 overall.

Figure 22:
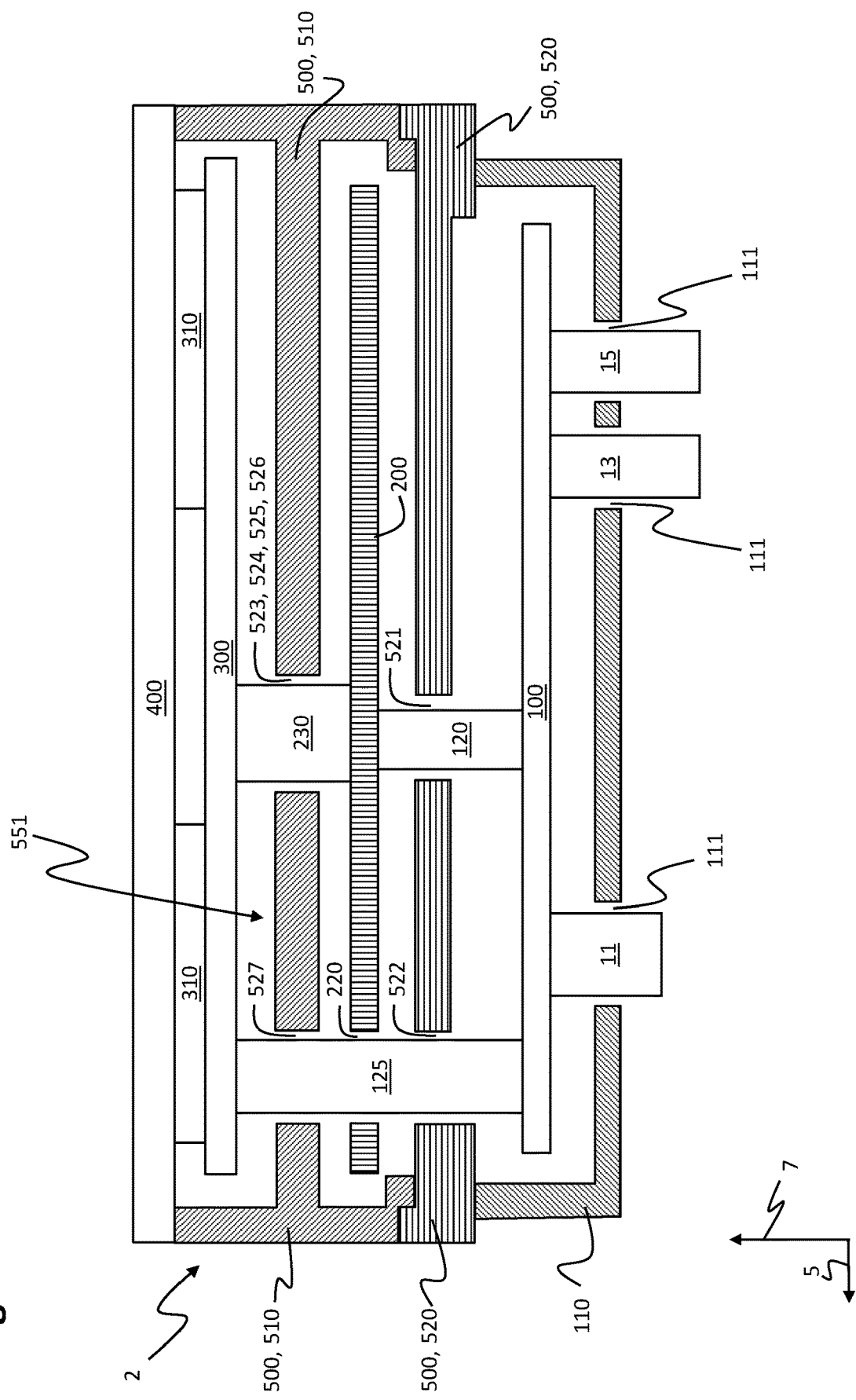
FIG. 22 shows a sectioned side view of the stator module.

FIG. 22 shows a highly simplified schematic illustration of a sectioned side view of the stator module 2 with the profile of the connecting lines 120, 125, 230, 310. This view serves to explain the connection between the individual components and connecting lines, but does not correspond to the spatial arrangement of the individual components and connecting lines according to one of the above-described FIGS. 1 to 21 in a manner true to scale.

The connection 11, 13, 15 are exposed at the apertures 111 on the bottom side of the module covering 110 for connection of the energy supply line 10, of the input line 12 of the data network 16 and of the output line 14 of the data network 16. The connection 11, 13, 15 are arranged on the bottom side of the connection module 100. The first connecting line 120 passes from the top side of the connection module 100 to the bottom side of the sensor module 200. The first connecting line 120 is passed through the first connecting opening 521 in the housing base 520 of the module housing 500.

The third connecting line 230 is passed from the top side of the sensor module 200 to the bottom side of the power module 300. The third connecting line 230 is passed through the third, the fourth, the fifth and the sixth connecting opening 523, 524, 525, 526 in the housing cover 510 of the module housing 500. The fourth connecting line 310 is passed from the top side of the power module 300 to the bottom side of the stator unit 400.

In addition to the first and the third connecting line 120, 230, the second connecting line 125 is passed from the top side of the connection module 100 to the bottom side of the power module 300. The second connecting line 125 is passed through the second connecting opening 522 in the housing base 520 of the module housing 500, through the connecting cutout 220 in the sensor module 200 and through the seventh connecting opening 527 in the housing cover 510 of the module housing 500.

Figure 23:
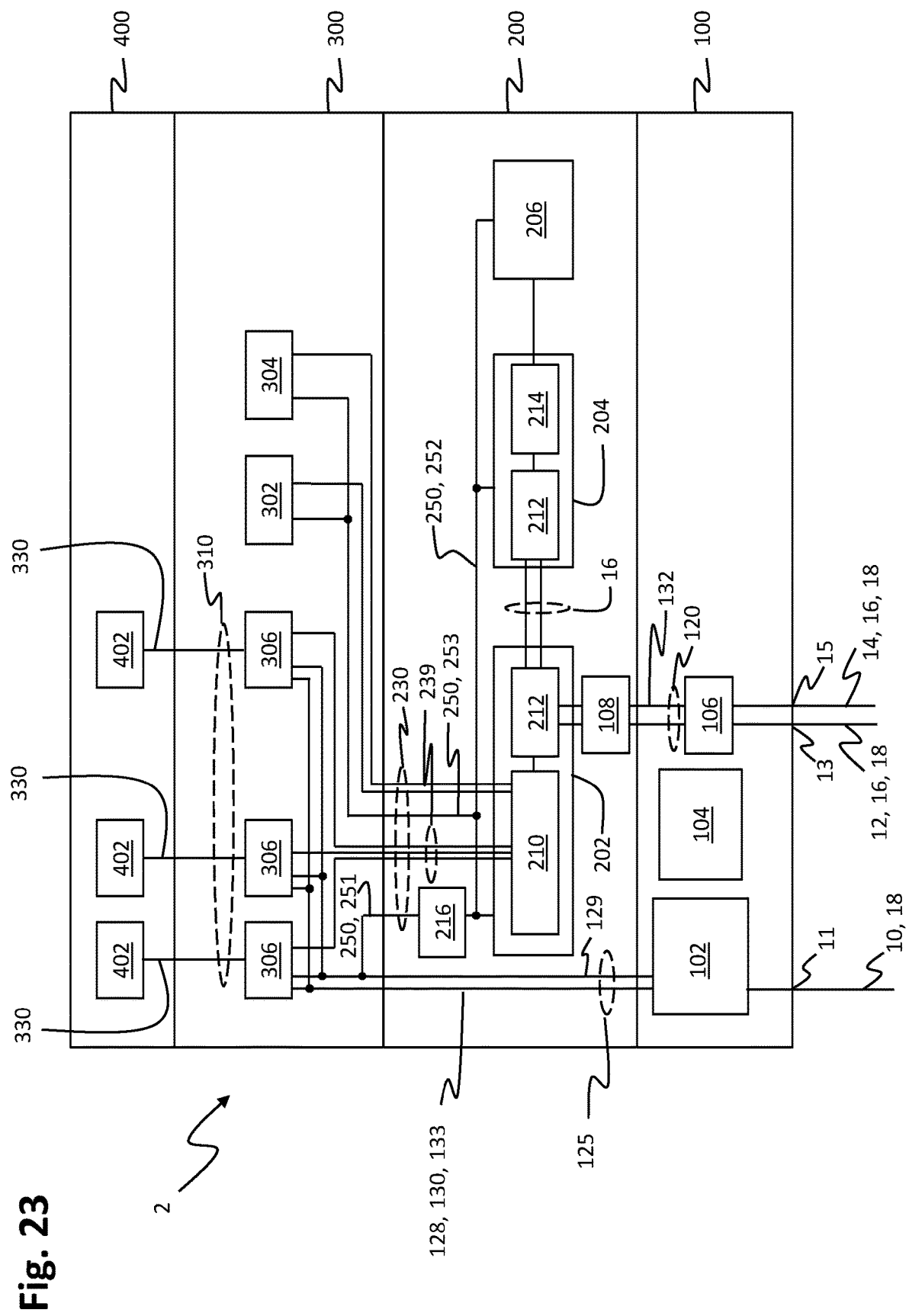
FIG. 23 shows a block diagram of the electrical interconnection of the individual modules of the stator module together with electronic components of the stator module.

FIG. 23 shows a schematic illustration of a block diagram of the stator module 2 with electrical interconnection of the individual modules 100, 200, 300, 400 of the stator module 2.

The connection module 100 is designed to provide drive energy for generating the drive currents for the coil conductors 402. The connection module 100 is designed to obtain the drive energy from electrical energy which is provided via the energy supply line 10 which is connected to the first connection 11. The connection module 100 is designed to provide the drive energy as a DC voltage or a direct current. Electrical energy can be provided, for example, as a single-phase or as a polyphase, in particular three-phase, AC voltage via the first connection 11. The AC voltage can be a power supply system voltage. The phases of the AC voltage can each have a root mean square value of between 50 V and 350 V, in particular of between 90 V and 265 V, in particular of 230 V, and a frequency of 50 Hz. In particular, the connection module 100 can be designed to be operated at any voltage value between 90 V and 265 V.

In order to provide the drive energy, the connection module 100 can comprise a conversion unit 102, as illustrated in FIG. 23. The conversion unit 102 is electrically conductively connected to the connection 11 for the connection of the energy supply line 10. The conversion unit 102 is designed to convert electrical energy which is provided via the energy supply line 10 into the drive energy. The conversion unit 102 can be designed, for example, to convert the energy which is provided as an AC voltage via the energy supply line 10 into the DC voltage or the direct current. To this end, the conversion unit 102 can comprise a rectifier or an AC/DC power supply unit. The conversion unit 102 can be connected to one or more, in particular to all, phases of the polyphase AC voltage.

The conversion unit 102 can be designed to provide the drive energy as a DC voltage of not more than 150 V, in particular not more than 120 V, in particular not more than 60 V. The drive energy can be provided as a DC voltage with a voltage of not more than 10 V, in particular with a voltage of from 6 V to 8 V, for example with a voltage of 6.2 V, 6.5 V, 7 V or 7.5 V. A voltage of not more than 120 V can be provided by the conversion unit 102 as an extra low voltage. A voltage of not more than 60 V can be provided by the conversion unit 102 as a safety extra low voltage or as a protected extra low voltage.

In alternative embodiments of the stator module 2, the conversion unit 102 can also be designed to generate the drive voltage from electrical energy which is provided as DC voltage via the energy supply line 10 and to provide said drive voltage as DC voltage. The conversion unit 102 can comprise, for example, a voltage converter, in particular a DC/DC converter.

The connection module 100 can comprise an electrical energy storage device 104. The energy storage device 104 can be designed to provide electrical energy even after loss of the electrical energy at the first connection 11 in order to ensure emergency operation of the planar drive system 1. The planar drive system 1 can be designed to move to a safe position during emergency operation of the rotor 20, even if electrical energy is no longer being provided via the first connection 11. For example, the safe position can be a lowered position in which the rotor 20 rests on the stator surface 2. The safe position can also be a predetermined position above the stator surface 3 of the stator module 2 or of a further stator module 2 which is arranged next to the stator module 2. The energy storage device 104 can be designed to be fed with the drive energy.

The energy storage device 104 can be arranged in the module housing 500, in particular the energy storage device 104 can be arranged on the connection module 100, as is illustrated in FIG. 23. However, as an alternative, the energy storage device 104 can also be arranged partially or completely outside the module housing 500. For example, the energy storage device 104 can be connected between the energy supply line 10 and the connection 11 for the energy supply line 10. The energy storage device 104 can be designed as an uninterrupted power supply or as part of an uninterrupted power supply.

The connection module 100 is designed to provide the drive energy via a drive energy line 128. The connection module 100 and the conversion unit 102 are electrically conductively connected to the drive energy line 128. The connection module 100 is designed to DC-isolate those parts of the stator module 2 which carry the drive energy, in particular the drive energy line 128, from the first connection 11. To this end, the connection module 100 can comprise an insulation unit. The insulation unit can be designed as a transformer, a current converter or a voltage converter. The insulation unit can be integrated in the conversion unit 102 or the conversion unit 102 can function as an insulation unit. The insulation unit can also be embodied separately from the conversion unit 102 and be arranged, for example, between the first connection 11 and the conversion unit 102.

The connection module 100 and the conversion unit 102 are electrically conductively connected to the power module 300 via the drive energy line 128. The power module 300 has a current-generating unit 306 which is designed to generate the drive current, which drives the rotor 20, from the drive energy. The current-generating unit 306 is connected to the drive energy line 128 and is electrically conductively connected to the connection module 100 and the conversion unit 102 via the drive energy line 128.

The current-generating unit 306 is designed to generate the drive current, which is applied to the coil conductors 402 as alternating current, from the drive energy which is provided as DC voltage via the drive energy line 128. The current-generating unit 306 can be designed to provide the drive current as a pulsed drive current, in particular as a pulse-width-modulated drive current. In order to generate the drive current, the current-generating unit 306 can comprise switching units, in particular transistors.

The power module 300 can have yet further current-generating units 306 in addition to the current-generating unit 306, as illustrated in FIG. 23. The power module 300 can be designed to generate a separate drive current for each coil conductor 402 which can be individually energized respectively. In particular, the power module 300 can have a dedicated current-generating unit 306 for each coil conductor 402 which is to be individually energized respectively. For example, the power module 300 can have a separate current-generating unit 306 for each individual phase of the polyphase systems of the stator unit 400 respectively, in order to generate a phase current for the corresponding phase as drive current. For example, the power module 300 can have a current-generating unit 306 for each of the three phases of a three-phase system comprising interconnected coil conductors 402 respectively. The current-generating units 306 can be designed as electronic parts, in particular as integrated circuits, which are arranged on the printed circuit board or on the printed circuit boards of the power module 300.

Each stator sector 411, 412, 413, 414 can respectively comprise a first number of polyphase systems, of which the coil conductors 402 are extended along the first direction 5, and a second number of polyphase systems, of which the coil conductors 402 are extended along the second direction 6. The first and the second number can be identical. The polyphase systems can each comprise a third number of individual phases. The power module 300 can comprise a current-generating unit 306 for each of the individual phases of the polyphase systems respectively. Therefore, overall, the power module 300 can comprise, for each stator sector 411, 412, 413, 414, a total number of current-generating units 306 which corresponds to the sum of the product of the first and the third number and the product of the second and the third number.

The coil conductors 402 of the stator unit 400 can be interconnected, for example, to produce a total of twenty-four three-phase systems, wherein each stator sector 411, 412, 413, 414 comprises six three-phase systems in each case. From amongst the six three-phase systems of one sector 411, 412, 413, 414, three can consist of coil conductors 402 which are extended in the first direction 5 in each case and three can consist of coil conductors 402 which are extended in the second direction 6 in each case. In the case of a stator unit 400 with twenty-four three-phase systems, the power module 300 can comprise seventy-two current-generating units 306 for generating seventy-two drive or phase currents.

The drive energy line 128 is designed in a manner passed through the module housing 500 and electrically insulated from the sensor module 200. In particular, the drive energy line 128 is passed from the connection module 100, through the housing base 520, into the module housing 500, through the connecting cutout 220 of the sensor module 200 and through the housing cover 510, to the power module 300. The drive energy line 128 can be designed as part of the second connecting line 125, as illustrated in FIG. 23, so that the second connecting line 125 comprises the drive energy line 128.

As is illustrated in FIG. 15, the second connecting line 125, and therefore the drive energy line 128, makes contact with the power module 300 via the second coupling element 127 on the second module unit 322. The drive energy line 128 is passed from the second module unit 322, via the connection 321, 323, 325, 327, to the other module units 320, 324, 326. In particular, the drive energy line 128 is passed, via the first connection 321, to the first module unit 320 and, via the second connection 323, to the third module unit 324. The drive energy line 128 is passed from the third module unit 324, via the third connection 325, to the fourth module unit 326. In addition or as an alternative, the drive energy line 128 is passed from the first module unit 320, via the fourth connection 327, to the fourth module unit 326.

The module units 320, 322, 324, 326 each comprise all of the current-generating units 306 which are necessary for generating the drive currents for the coil conductors 402 which are connected to the respective module unit 320, 322, 324, 326. The first module unit 320 comprises all of the current-generating units 306 which generate the drive currents in the coil conductors 402 of the first and the third stator sector 411, 413 which are oriented along the second direction 6. The second module unit 322 comprises all of the current-generating units 306 which generate the drive currents in the coil conductors 402 of the first and the second stator sector 411, 412 which are oriented along the first direction 5. The third module unit 324 comprises all of the current-generating units 306 which generate the drive currents in the coil conductors 402 of the second and the fourth stator sector 412, 414 which are oriented along the second direction 6. The fourth module unit 326 comprises all of the current-generating units 306 which generate the drive currents in the coil conductors 402 of the third and the fourth stator sector 413, 414 which are oriented along the first direction 5.

Each of the four module units 320, 322, 324, 326 can in each case comprise a total number of current-generating units 306 which corresponds to double the product of the first number of polyphase systems with coil conductors 402 which are extended along the first direction 5 and the third number of individual phases per polyphase system or to double the product of the second number of polyphase systems with coil conductors 402 which are extended along the second direction 6 and the third number of individual phases per polyphase system.

Each of the module units 320, 322, 324, 326 can in each case comprise eighteen current-generating units 306 for generating eighteen drive currents. The eighteen drive currents can be generated as in each case three phases of six three-phase systems.

The current-generating units 306 are connected to the coil conductors 402 of the stator unit 400 via drive current lines 330 in order to transmit the drive currents. The drive current lines 330 are embodied as part of the fourth connecting line 310. The drive current lines 330 are in each case passed across the contact 315, 316, 317, 318 of the fourth connecting line 310. The current-generating units 306 of the first module unit 320 are connected to the coil conductors 402 of the first and the third stator sector 411, 413 which are oriented in the second direction 6 via the drive current lines 330 which are routed in the fourth contact 318. The current-generating units 306 of the second module unit 322 are connected to the coil conductors 402 of the first and the second stator sector 411, 412 which are oriented in the first direction 5 via the drive current lines 330 which are routed in the first contact 315. The current-generating units 306 of the third module unit 324 are connected to the coil conductors 402 of the second and the fourth stator sector 412, 414 which are oriented in the second direction 6 via the drive current lines 330 which are routed in the second contact 316. The current-generating units 306 of the fourth module unit 326 are connected to the coil conductors 402 of the third and the fourth stator sector 413, 414 which are oriented in the first direction 5 via the drive current lines 330 which are routed in the third contact 317.

The stator module 2 can comprise an intermediate circuit 130, in particular a DC voltage intermediate circuit, via which the drive energy is provided as an intermediate circuit voltage 133. In particular, the drive energy can be provided via the intermediate circuit 130 as a DC voltage. The intermediate circuit 130 is formed on the drive energy line 128, so that the drive energy line 128 carries the intermediate circuit voltage 133. In addition, the intermediate circuit 130 can be embodied on the connection module 100 and on the power module 300. In particular, the intermediate circuit 130 can be formed on the connection 321, 323, 325, 327 of the power module 300, so that the intermediate circuit voltage 133 is transmitted via the connection 321, 323, 325, 327.

The intermediate circuit 130 can comprise an electrical intermediate circuit storage device 131 for storing electrical energy. The intermediate circuit storage device 131 can be designed to compensate for voltage and/or load peaks in the intermediate circuit 130. The intermediate circuit storage device 131 can be designed as a capacitor or as a plurality of capacitors. The intermediate circuit storage device 131 can be formed on the connection module 100. For example, the intermediate circuit storage device 131 can be designed as capacitors which are arranged on the connection module 100, as illustrated in FIGS. 7 and 8.

The current-generating units 306 can be connected to the intermediate circuit 130 and can be designed to generate the drive current from the intermediate circuit voltage 133 as an inverter. The conversion unit 102 can likewise be connected to the intermediate circuit 130 and can be designed to generate the intermediate circuit voltage 133 from the electrical energy, which is provided via the first connection 11, as a rectifier or as a voltage converter.

The stator module 2 can be designed to generate drive currents with a current intensity of more than 5 A, in particular of more than 10 A. The current intensity of the drive currents can be, for example, 20 A during continuous operation. In the case of a power module 300 which comprises a printed circuit board, a metallization thickness of the conductor tracks which carry the drive current can be 35 µm to 200 µm, in particular 50 µm to 100 µm, in particular 70 µm. In particular, one, more or all of the conductor track layers of the power module 300 can have the same metallization thickness as the conductor tracks which carry the drive current.

The connection module 100 is designed to provide operating energy for generating the drive currents from the drive energy. The operating energy can be provided, for example, for operating the current-generating units 306. If the current-generating units 306 comprise switching elements, the operating energy can be provided, for example, for operating the switching elements. If the switching elements are designed as transistors, the operating energy can be provided for driving the transistors, in particular for generating a gate current or a gate voltage of the transistors.

The operating energy can be provided, for example, as a DC voltage. The operating energy, like the drive energy, can be provided as a voltage of not more than 150 V, in particular not more than 120 V, in particular not more than 60 V. The operating energy can be provided as a DC voltage with a voltage of not more than 20 V, in particular with a voltage of from 5 V to 15 V, for instance with a voltage of 10 V. The operating energy, like the drive energy, can be provided as an extra low voltage, as a safety extra low voltage or as a protected extra low voltage.

The conversion unit 102 can be designed to provide the operating energy, as illustrated in FIG. 23. As an alternative, the stator module 2, in particular the connection module 100, can also have a further conversion unit. The further conversion unit can be designed to provide the operating energy. The further conversion unit can be designed like the conversion unit 102. The conversion unit 102 and the further conversion unit do not have to be of identical design here. For example, the conversion unit 102 can be designed as a rectifier and the further conversion unit can be designed as a voltage converter for converting DC voltages or as a DC/DC converter.

The connection module 100 and the current-generating units 306 which are arranged on the power module 300 are connected to one another via an operating energy line 129. The operating energy is provided and transmitted to the current-generating units 306 via the operating energy line 129. The operating energy line 129 is electrically insulated from the drive energy line 128. Like the drive energy line 128, the operating energy line 129 can be designed in a manner DC-isolated from the first connection 11. In alternative embodiments of the stator module 2, it is also possible for only the drive energy line 128 to be DC-isolated from the first connection 11 and for the operating energy line 129 to be connected to the first connection 11 without DC-isolation. Particularly in the case of a further connection unit which is designed as a DC/DC converter or as a voltage converter, DC-isolation between the operating energy line 129 and the first connection 11 can be dispensed with.

To this end, the connection module 100 can comprise an insulation unit which is arranged between the connection 11 and the operating energy line 129. The insulation unit can be designed as a transformer, a current converter or a voltage converter. The insulation unit can be integrated in the conversion unit 102 or in the further conversion unit, or the conversion unit 102 or the further conversion unit can function as an insulation unit. The insulation unit can also be embodied separately from the conversion unit 102 or the further conversion unit.

The operating energy line 129 is passed through the module housing 500 and is embodied in a manner electrically insulated from the sensor module 200 which is arranged in the module housing 500. The operating energy line 129 is designed as part of the second connecting line 125, like the drive energy line 128. The second connecting line 125 comprises one or more conductors which form the drive energy line 128 and one or more further conductors which form the operating energy line 129. The connecting line 125 can comprise, for example, five conductors.

In the case of the stator module 2, the second connecting line 125 is embodied as an individual plug-in connection, wherein the plug-in connection or the coupling elements 126, 127 of the plug-in connection comprise conductors, which are insulated from one another, for the drive energy line 128 and the operating energy line 129. In alternative embodiments of the stator module 2, the second connecting line 125 can also have a plurality of plug-in connections or cable connections and the drive energy line 128 and the operating energy line 129 can be embodied on separated plug-in connections or cable connections.

The sensor module 200 comprises a drive control unit 210 which is designed to generate control signals for controlling the current-generating units 306. The current-generating units 306 are designed to generate the drive currents based on the control signals. For example, the drive control unit 210 can be designed to transmit setpoint values for the drive currents to the current-generating units 306 by the control signals. The drive control unit 210 can be arranged in the first processing unit 202 which is arranged on the sensor module 200, as illustrated in FIG. 23.

The drive control unit 210 of the sensor module 200 and the current-generating units 306 of the power module 300 are connected to one another for transmitting the control signals via a control line 239. The control line 239 is passed from the sensor module 200 in the module housing 500, through the top side 551 of the module housing 500 and the housing cover 510.

The control line 239 can be designed as part of the third connecting line 230. The control line 239 can comprise in each case one line element, which connects the sensor module 200 to the module unit 320, 322, 324, 326 in question, for each module unit 320, 322, 324, 326 of the power module 300. The line elements are passed parallel in relation to one another from the sensor module 200 to the power module 300. In the stator module 2, the sensor module 200 is connected to the first module unit 320 via a first line element of the control line 239, to the second module unit 322 via a second line element of the control line 239, to the third module unit 324 via a third line element of the control line 239 and to the fourth module unit 326 via a fourth line element of the control line 239.

In the third connecting line 230, the four line elements each comprise one of the four plug-in connections of the third connecting line 230. The first line element comprises the first plug-in connection to the first coupling element 231 and to the first mating element 232, the second line element comprises the second plug-in connection to the second coupling element 233 and to the second mating element 234, the third line element comprises the third plug-in connection to the third coupling element 235 and to the third mating element 236 and the fourth line element comprises the fourth plug-in connection to the fourth coupling element 237 and to the fourth mating element 238.

The control signals for those current-generating units 306 which are arranged on the module unit 320, 322, 324, 326 which is connected to the line element in question are transmitted via the individual line elements of the control line 239. The current-generating units 306 of the individual module units 320, 322, 324, 325 are each connected to the line element for transmitting the control signals, which line element passes to the module unit 320, 322, 324, 326 in question.

The control signals for the current-generating units 306 which are arranged on the first module unit 320 are transmitted via the first line element, the control signals for the current-generating units 306 which are arranged on the second module unit 322 are transmitted via the second line element, the control signals for the current-generating units 306 which are arranged on the third module unit 324 are transmitted via the third line element and the control signals for the current-generating units 306 which are arranged on the fourth module unit 326 are transmitted via the fourth line element. The current-generating units 306 which are arranged on the first module unit 320 are connected to the first line element, the current-generating units 306 which are arranged on the second module unit 322 are connected to the second line element, the current-generating units 306 which are arranged on the third module unit 324 are connected to the third line element and the current-generating units 306 which are arranged on the fourth module unit 326 are connected to the fourth line element.

The sensor module 200 has a position-processing unit 214. The position-processing unit 214 is designed to read in the items of information, which are obtained from the position-detecting units 206, about the position of the rotor 20 from the position-detecting units 206 and to process said items of information. For example, the position-processing unit 214 can have inputs via which sensor signals of the position-detecting units 206 are read in. The position-processing unit 214 can be designed to process the read-in sensor signals to form communication data which is suitable for transmission via the data network 16 which is connected to the stator module 2. The position-processing unit 214 can be arranged in the second processing unit 204 of the sensor module 200, as illustrated in FIG. 23.

The drive control unit 210 and the position-processing unit 214 are connected to the external data network 16. The position-processing unit 214 is designed to exchange the items of position information, which are obtained from the position-detecting unit 206, via the data network 16. The drive control unit 210 is designed to exchange control data for driving the current-generating units 306 via the external data network 16. The control data can comprise, for example, the setpoint values for the drive currents in the individual coil conductors 402. The items of position information and the control data can be exchanged, for example, with a superordinate control unit which is connected to the data network 16 or with a plurality of control units of this kind.

The drive control unit 210 and the position-processing unit 214 can each be connected to the external data network 16 via a connecting unit 212, as illustrated in FIG. 23. The connecting units 212 are designed to control the access of the respectively connected unit, that is to say of the drive control unit 210 or of the position-processing unit 214, to the data network 16. The connecting units 212 can be designed to manage the addresses for communication via the data network 16. For example, the connecting units 212 can be designed to read out address information from data which is received via the data network 16 and to input address information into data which is to be sent via the data network 16. The connecting units 212 can also be designed to secure the data which is transmitted via the data network 16 by inserted security data. The connecting units 212 can implement the data link layer of the data network 16. The connecting units 212 can comprise a media access controller or can be designed as a media access controller.

The drive control unit 210 and the position processing unit 214 or the connecting units 212 of the drive control unit 210 and the position-processing unit 214 can be connected to the second connection 13 for the input line 12 and to the third connection 15 for the output line 14 of the external data network 16 via a transmission unit 108. The transmission unit 108 can be designed to convert the data which is to be transmitted via the data network 16 into the data signals which are used for the data transmission via the connection 13, 15, and vice versa. In particular, the transmission unit 108 can generate the signal coding which is used for transmitting the data signals. The data signals may be the electrical or optical signals which are used for transmitting individual bits. The transmission unit 108 can implement the functions of the physical layer of the data network 16. The transmission unit 108 can be designed as a PHY chip or comprise a PHY chip.

The drive control unit 210 and the position-processing unit 214 can be connected to the data network 16 in series. In this case, the drive control unit 210 can be connected to the data network 16 between the connection 13, 15 of the input and the output line 12, 14 and the position-processing unit 214, as illustrated in FIG. 23. However, the position-processing unit 214 can also be connected to the data network 16 between the connection 13, 15 of the input and the output line 12, 14 and the drive control unit 210.

The transmission unit 108 can be connected to the data network 16 between the connection 13, 15 and the drive control unit 210 and the position-processing unit 214. In particular, both the drive control unit 210 and also the position-processing unit 214 can be jointly connected to the connection 13, 15 via the transmission unit 108. In this case, the drive control unit 210 can be connected to the data network 16 between the transmission unit 108 and the position-processing unit 214, as illustrated in FIG. 23. However, the position-processing unit 214 can also be connected to the data network 16 between the drive control unit 210 and the transmission unit 108.

The data network 16 can be realized by media-independent interfaces between the transmission unit 108 and the drive control unit 210 and the position-processing unit 214. In order to transmit data, low-voltage differential sampling can be used between the transmission unit 108, the drive control unit 210 and the position-processing unit 214.

The data network 16 can be designed as a fieldbus, for instance as an EtherCAT, Profibus or Interbus fieldbus. The data transmission via the data network 16 can take place in accordance with the EtherCAT standard. In particular, the data transmission can take place in each case in accordance with the Ethernet standard on the input line 12 and on the output line 14 of the data network and/or between the transmission unit 108 and the connecting units 212.

The data transmission via the data network 16 can take place in accordance with the master/slave principle. In this case, the drive control unit 210 and the position-processing unit 214 can each be connected to the fieldbus as slave units. In particular, the connecting units 212 can each be designed as slave connections.

For the transmission of the control data and/or the items of position information via the data network 16, the sensor module 200, in particular the position-processing unit 214 and/or the drive control unit 210, is connected to the connection module 100 and to the external data network 16, in particular to the connection 13, 15 of the external data network 16, via a data line 132. The data line 132 can be arranged between the transmission unit 108 and the connection 13, 15 for the input and the output line 12, 14, as illustrated in FIG. 23. The transmission unit 108 can be arranged on the sensor module 200. However, in alternative embodiments of the stator unit 2, the data line 132 can also be arranged between the transmission unit 108 and the connecting units 212 and the transmission unit 108 can be arranged on the connection module 100.

The data line 132 is passed from the connection module 100, through the bottom side 552 of the module housing 500 and the housing base 520, into the module housing 500 and to the sensor module 200. The data line 132 is designed as part of the first connecting line 120. In addition to the data line 132, the first connecting line 120 can comprise an electrical connection between the sensor module 200 and the fan 112. In particular, the fan 112 can be connected to the drive control unit 210 via the first connecting line 120 in order to be subjected to open-loop control or closed-loop control by the drive control unit 210. In addition, the first connecting line 120 can comprise an electrical connection between the sensor module 200 and temperature sensors and/or status indicators, in particular status LEDs, which are arranged on the connection module 100. For example, the drive control unit 210 can be connected to the temperature sensors and/or status indicators which are arranged on the connection unit 100 and exchange signals with the temperature sensors and/or status indicators.

The sensor module 200 can be designed in a manner DC-isolated from the connection 13, 15 for the input and the output line 12, 14. For the purpose of DC-isolation, the stator module 2 can comprise an insulation unit 106 which is arranged between the connection 13, 15 and the sensor module 200. The insulation unit 106 can be arranged on the connection module 100, as illustrated in FIG. 23. The insulation unit 106 can be arranged between the connection 13, 15 for the input and the output line 12, 14 and the data line 132. The insulation unit 106 can be arranged between the connection 13, 15 for the input and the output line 12, 14 and the transmission unit 108. The insulation unit 106 can comprise one or more transmitters or one or more optocouplers.

The insulation unit 106 and/or the insulation unit for the DC-isolation of the conversion unit 102 and/or of the conversion unit 102 can contain magnetic, in particular ferromagnetic, materials. If the insulation unit 106 and/or the insulation unit for the DC-isolation of the conversion unit 102 and/or of the conversion unit 102 are each arranged on the connection module 100, said units are at a large distance from the drive magnets of the rotor 20. As a result, influencing of the movement of the rotor 20 by the magnetic materials is kept low.

The drive control unit 210 and the position-processing unit 214 are designed to communicate via the external data network 16 as independent communication subscribers in each case. To this end, the drive control unit 210 and the position-processing unit 214 are connected to the data network 16 as independent communication subscribers in each case. In particular, the drive control unit 210 and the position-processing unit 214 are each designed to be connected to the data network 16 as subscribers with a dedicated network address in each case. Both the drive control unit 210 and also the position-processing unit 214 can have the connecting unit 212 for the respectively independent connection to the data network 16. The subscriber-specific network addresses can each be stored in the connecting units 212. The connecting units 212 can each be designed as EtherCAT IP cores.

The stator module 2 can comprise a current sensor 302 and/or a temperature sensor 304, as illustrated in FIG. 23. The stator module 2 can also comprise a plurality of current sensors 302 and/or a plurality of temperature sensors 304. The current sensors 302 and/or the temperature sensors 304 can be arranged on the power module 300. In particular, each of the module units 320, 322, 324, 326 of the power module 300 can comprise current sensors 302 and/or temperature sensors 304. As an alternative or in addition, the current sensors 302 and/or the temperature sensors 304 can also be arranged on the sensor module 200 and/or on the connection module 100.

The current sensor 302 is designed to detect a current intensity of an electric current which flows in the stator module 2 and to generate a current signal which represents the current intensity. For example, the current sensor 302 can detect the current intensity of one or more of the drive currents. The current sensor 302 can also detect the current intensity on the drive energy line 128. The temperature sensor 304 is designed to detect a temperature of the stator module 2 and to generate a temperature signal which represents the detected temperature. The temperature can be detected, for example, on a conductor track or on an electronic component of the power module 300 and/or of the sensor module 200 and/or of the connection module 100.

The current sensor 302 and/or the temperature sensor 304 of the power module 300 are/is connected to the drive control unit 210, which is arranged on the sensor module 200, via sensor lines. The sensor lines are designed as part of the third connecting line 230 between the power module 300 and the sensor module 200. In particular, the sensor module 200 can be connected to each module unit 320, 322, 324, 326 via at least one separate sensor line. The first plug-in connection to the first coupling element 231 and to the first mating element 232 respectively comprises a sensor line which passes to the first module unit 320, the second plug-in connection to the second coupling element 233 and to the second mating element 234 respectively comprises a sensor line which passes to the second module unit 322, the third plug-in connection to the third coupling element 235 and to the third mating element 236 respectively comprises a sensor line which passes to the third module unit 324, and the fourth plug-in connection to the fourth coupling element 237 and to the fourth mating element 238 respectively comprises a sensor line which passes to the fourth module unit 326.

A current sensor which is arranged on the connection module 100 and/or a temperature sensor which is arranged on the connection module 100 can be connected to the drive control unit 210 which is arranged on the sensor module 200 likewise via one or more sensor lines. The sensor lines can each be designed as part of the first connecting line 120. For example, the first connecting line 120 can comprise separate conductors for the sensor lines, in addition to the conductors for the data line 132.

The drive control unit 210 is designed to read out the current signals and/or the temperature signals from the sensors 302, 304. For example, the drive control unit 210 can have inputs which are connected to the sensors 302, 304 for reading in the data. The drive control unit 210 is designed to process the current signals and/or the temperature signals and/or to convert said current signals into communication data for transmission of the measured current and/or temperature values via the data network 16.

The stator module 2 is designed to provide supply energy for operating electronic components of the stator module 2. The supply energy can be provided, for example, for operating the position-detecting units 206 and/or the position-processing unit 214 and/or the drive control unit 210 and/or the current sensors 302 and/or the temperature sensors 304. The supply energy can be provided as a supply voltage. The supply voltage can be provided as a DC voltage with a voltage of not more than 20 V, in particular with a voltage of from 2.5 V to 15 V, for instance with a voltage of 5 V or 10 V. The supply energy can be provided as an extra low voltage, as a safety extra low voltage or as a protective extra low voltage, like the drive energy and the operating energy.

The stator module 2 can be designed to generate the supply energy from the operating energy. The stator module 2 can have an energy-generating unit 216 which generates the supply energy from the operating energy, as illustrated in FIG. 23. The energy-generating unit 216 can be designed, for example, as a DC/DC converter or as a voltage converter.

The stator module 2 has a supply line 250 for providing the supply energy. In particular, the electronic components which are supplied with the supply energy, for example the position-detecting units 206 and/or the position-processing unit 214 and/or the drive control unit 210 and/or the current sensor 302 and/or the temperature sensor 304, are electrically conductively connected to the supply line 250. In addition, the energy-generating unit 216 is connected to the supply line 250.

The electronic components which are arranged on the sensor module 200 and are supplied with the supply energy, that is to say in particular the position-detecting units 206 and/or the position-processing unit 214 and/or the drive control unit 210, are supplied with the supply energy from the power module 300. In particular, the power module 300 and the sensor module 200 are connected to one another via the supply line 250 for providing the supply energy. The supply line 250 is passed from the power module 300 to the sensor module 200 and to the electronic components which are arranged on the sensor module 200.

The supply line 250 has a first portion 251. The first portion 251 of the supply line 250 is passed from the power module 300 to the sensor module 200. In particular, the first portion 251 of the supply line 250 is passed from the power module 300, through the top side 551 of the module housing 500 and of the housing cover 510, to the sensor module 200 in the module housing 500.

As is illustrated in FIG. 23, the supply energy can be generated by the sensor module 200. In particular, the energy-generating unit 216 for generating the supply energy can be arranged on the sensor module 200. In order to provide the supply energy, the energy-generating unit 216 is then connected to the power module 300 via the first portion 251 of the supply line 250. The first portion 251 of the supply line 250 can be connected to the operating energy line 129 on the power module 300. The first portion 251 of the supply line 250 can be connected to an input of the energy-generating unit 216 on the sensor module 200. In this case, the first portion 251 of the supply line 250 carries the operating energy.

The first portion 251 of the supply line 250 can be designed as part of the third connecting line 230. The first portion 251 of the supply line 250 can be passed across the first line element and/or the second line element and/or the third line element and/or the fourth line element of the third connecting line 230. In particular, the first portion 251 of the supply line 250 can be passed exclusively across the second line element which passes to the second module unit 322. The first portion 251 of the supply line 250 can be connected to the operating energy line 129, which is passed from the connection unit 100 to the second module unit 322, on the second module unit 322.

The supply energy is supplied to the electronic components which are arranged on the sensor module 200 and are supplied with the supply energy via a second portion 252 of the supply line 250, which second portion carries the supply energy. In particular, the electronic components which are arranged on the sensor module 200 and are supplied with the supply energy are connected to the second portion 252 of the supply line 250. The second portion 252 of the supply line 250 is formed on the sensor module 200. The second portion 252 of the supply line 250 can be connected to the energy-generating unit 216 which is arranged on the sensor module 200, for instance to an output of the energy-generating unit 216, which output provides the supply energy. The electronic components which are arranged on the sensor module 200 and are supplied with the supply energy are electrically conductively connected to the energy-generating unit 216 via the second portion 252 of the supply line 250.

In addition to the electronic components which are arranged on the sensor module 200, electronic components of the stator module 2 which are arranged on the power module 300, in particular the current sensors 302 and/or temperature sensors 304 which are arranged on the power module 300, can be connected to the supply line 250. The supply energy is supplied to the electronic components which are arranged on the power module 300 and are supplied with the supply energy via a third portion 253 of the supply line 250. In particular, the electronic components which are arranged on the power module 300 are connected to the third portion 253 of the supply line 250.

The third portion 253 of the supply line 250 is passed from the power module 300 to the sensor module 200. In particular, the third portion 253 of the supply line 250 is passed from the power module 300, through the top side 551 of the module housing 500 and of the housing cover 510, to the sensor module 200 in the module housing 500. The third portion 253 of the supply line 250 can be electrically conductively connected to the second portion 252 of the supply line 250 on the sensor module 200, as illustrated in FIG. 23. In addition, the third portion 253 of the supply line 250 can be electrically conductively connected to the energy-generating unit 216 which is arranged on the sensor module 200.

The third portion 253 of the supply line 250 can be designed as part of the third connecting line 230. The third portion 253 of the supply line 250 can be passed across the first line element and/or the second line element and/or the third line element and/or the fourth line element of the third connecting line 230. In particular, the third portion 253 of the supply line 250 can comprise four strands, wherein the line elements of the third connecting line 230 each comprise one of the strands. A first strand of the third portion 253 of the supply line 250 can be comprised by the first line element of the third connecting line 230, a second strand of the third portion 253 of the supply line 250 can be comprised by the second line element, a third strand of the third portion 253 of the supply line 250 can be comprised by the third line element and a fourth strand of the third portion 253 of the supply line 250 can be comprised by the fourth line element.

Those electronic components which are arranged on the module unit 320, 322, 324, 326 which is connected to the line element in question of the third connecting line 230 are respectively arranged on the strands of the third portion 253 of the supply line 250 which are routed in one of the line elements of the third connecting line 230. The first strand of the third portion 253 of the supply line 250 is connected to the components which are arranged on the first module unit 320 and are supplied with the supply energy, the second strand of the third portion 253 of the supply line 250 is connected to the components which are arranged on the second module unit 322 and are supplied with the supply energy, the third strand of the third portion 253 of the supply line 250 is connected to the components which are arranged on the third module unit 324 and are supplied with the supply energy, and the fourth strand of the third portion 253 of the supply line 250 is connected to the components which are arranged on the fourth module unit 326 and are supplied with the supply energy.

As an alternative, the third portion 253 of the supply line 250 can also be connected to one of the module units 320, 322, 324, 326 of the power module 300 only via one of the line elements of the third connecting line 250. The third portion 253 of the supply line 250 can then be passed from the module unit 320, 322, 324, 326 in question, via the connecting 321, 323, 325, 327, to the other module units 320, 322, 324, 326 and there connected to the electrical components which are supplied with the supply energy.

In an alternative embodiment of the stator module 2, the power module 300 can also be designed to generate the supply energy. In particular, the energy-generating unit 216 can also be arranged on the power module 300. The energy-generating unit 216 can be arranged, for example, on the second module unit 322 of the power module 300, which second module unit is connected to the second connecting line 125. The energy-generating unit 216 which is arranged on the power module 300 can be directly connected to the operating energy line 129 on the power module 300 via a feed line which is arranged on the power module 300. The feed line then carries the operating energy. The first portion 251 of the supply line 250 can then be connected to the output of the energy-generating unit 216, which output provides the supply energy, and can carry the supply energy. The second portion 252 and possibly the third portion 253 of the supply line 250 can be directly connected to the first portion 251 of the supply line 250, which first portion is passed from the power module 300 to the sensor module 200, on the sensor module 200.

As an alternative, the electronic components which are arranged on the power module 300 and are supplied with the supply energy can also be directly connected to the first portion 251 of the supply line 250 on the power module 300. In this case, the third portion 253 of the supply line 250 can be embodied on the power module 300. For example, the electronic components which are arranged on the second module unit 322 and are supplied with the supply energy can be directly connected to the energy-generating unit 216 which is likewise arranged on the second module unit 322. The third portion 253 of the supply line 250 can be passed across the first connection 321 for connection of the electronic components which are arranged on the first module unit 320 and are supplied with the supply energy, across the second connection 323 for connection of the electronic components which are arranged on the third module unit 324 and are supplied with the supply energy, and across the first and the fourth connection 321, 327 or the second and the third connection 323, 325 for connection of the electronic components which are arranged on the fourth module unit 326 and are supplied with the supply energy.

In a further alternative embodiment of the stator module 2, the connection module 100 can also be designed to generate the supply energy. In particular, the energy-generating unit 216 can be arranged on the connection module 100 or the conversion unit 102 can be designed to provide the supply energy. For example, the connection module 100 or the energy-generating unit 216 or the conversion unit 102 can be designed to generate the supply energy from the electrical energy which is provided via the first connection 11. To this end, the conversion unit 102 can comprise a rectifier and/or a transformer.

If the supply energy is generated on the connection module 100, the first portion 251 of the supply line 250 can be passed from the power module 300 to the connection module 100, as has already been described in connection with the operating energy line 129. In this case, the first portion 251 of the supply line 250 can be passed from the power module 300, through the top side 551 of the module housing 500, through the interior of the module housing 500 and through the bottom side 552 of the module housing 500, to the connection module 100. In particular, the first portion 251 of the supply line 250, which first portion is passed through the module housing 500, can be embodied in a manner electrically insulated from the sensor module 200.

In the case of supply energy which is generated on the connection module 100, the electronic components which are arranged on the power module 300 and are supplied with the supply energy and also the electronic components which are arranged on the sensor module 200 and are supplied with the supply energy can be connected to the supply line 250 in the same way, as has been described in connection with the supply energy which is generated on the power module 300.

The connection module 100 can also be designed to generate the supply energy from a further external energy source which is supplied to the connection module 100 in addition to the electrical energy which is provided via the first connection 11. For example, the supply energy can be generated together with the operating energy from an externally supplied supply voltage. However, the supply energy and the operating energy can also be provided separately in each case by two separate further conversion units or the conversion unit 102 and the energy-generating unit 216.

The operating energy for the current-generating units 306 and the supply energy for the electronic components of the stator module 2 can also be generated by an individual energy source, for example by an individual voltage source. In particular, the first portion 251 of the supply line 250 can be embodied together with the operating energy line 129 on common conductors which are passed between the power module 300 and the connection module 100, and can be connected to the common energy source.

In alternative embodiments of the stator module 2, the electronic components which are supplied with the supply energy can also be directly connected to the operating energy line 129 without the energy-generating unit 216 via the supply line 250. In this case, the supply energy is also provided at the same time as the operating energy and the operating energy line forms part of the first portion 251 of the supply line 250 which is passed through the module housing 500 and is designed in a manner insulated from the sensor module 200 in the module housing 500 at the same time.

Overall, the sensor module 200 can be supplied with the supply energy for operating the electronic components of the sensor module 200 exclusively via the third connecting line 230 which is arranged between the power module 300 and the sensor module 200. Similarly, a ground connection between the connection module 100 and the sensor module 200 can be created exclusively via the second connecting line 125, the power module 300 and the third connecting line 230. In particular, a ground connection between the conversion unit 102 and the drive control unit 210 and/or the position-processing unit 214 and/or the position-detecting units 206 can be created exclusively via the second connecting line 125, the power module 300 and the third connecting line 230. The first connecting line 120 between the connection module 100 and the sensor module 200 can be designed in a manner electrically insulated from the ground potential on the connection module 100 and/or from the ground potential on the sensor module 200.

In the case of the stator module 2, there is a direct electrical connection between the connection module 100 on the bottom side 552 of the module housing 500, which connection module is connected to the external energy supply line 10, and the power module 300 comprising the current-generating units 306, which power module is arranged on the top side 551 of the module housing 500. This direct electrical connection is realized via the second connecting line 125. In this way, the electrical energy for generating the drive currents can be directly conducted to the current-generating units 306 without diversion via further modules of the stator unit 2, in particular without diversion via the sensor module 200. The second connecting line 125 can be designed in a simple manner for transmitting high current intensities. Electrical losses can be kept particularly small when directly forwarding the drive energy from the connection module 100 to the current-generating units 306.

Supplying the electrical energy for operating the electronic components of the sensor module 200 via the power module 300 renders it possible to dispense with an additional further ground connection between the connection module 100 and the sensor module 200, in addition to the ground connection via the power module 300 and the second connecting line 125. As a result, disturbance of the electronic components of the sensor module 200 and/or of the power module 300 is prevented by forming a ground loop.

In the case of the stator module 2, firstly the stator unit 400, then the power module 300, then the sensor module 200 and finally the connection module 100 are arranged one above the other in the vertical direction 7 in succession. In particular, the power module 300 is arranged above the sensor module 200 in the vertical direction 7. In alternative embodiments of the stator module 2, the power module 300 can also be arranged beneath the sensor module in the vertical direction 7. For example, the power module 300 can be arranged on the bottom side 552 of the module housing 500. The fourth connecting line 310 can then be passed from the bottom side 552 of the module housing 500, through the interior of the module housing 500, to the top side 551 of the module housing 500 and to the stator unit 400, analogously to the drive energy line 128. The fourth connecting line 310 can then be designed in a manner electrically insulated from the sensor module 200 which is arranged in the interior of the module housing 500.

When the power module 300 is arranged beneath the sensor module 200, the fourth connecting line 310 can be designed as a cable connection instead of as a press-fit connection. As in the stator module 2, the fourth connecting line 310 can make contact with the stator unit 400 at the cruciform contact arrangement 420 which is formed along the center lines when the power module 300 is arranged below the sensor module 200 as well.

In the case of the stator module 2, the individual modules which are formed by the connection module 100, the sensor module 200, the power module 300 and the stator unit 400 are each formed as flat plates which are extended in the first and the second direction 5, 6. A particularly flat construction of the stator module 2 can be realized by way of the plate-like individual modules being arranged one above the other in the vertical direction 7.

In the case of the stator module 2, the connection module 100, the sensor module 200 and the power module 300 are each dimensioned and shaped in such a way that neither the connection module 100, nor the sensor module 200, nor the power module 300 extends completely beyond the total width of the stator module 2 in the first direction 5 and in the second direction 6 and covers the entire cross-sectional area of the stator module 2 in the first direction and the second direction 5, 6. The only incomplete coverage of the cross-sectional area can be achieved by a cruciform shape and the clearances 61, 62, 63, 64 which result from the cruciform shape, as in the power module 300. As in the sensor module 200, the incomplete coverage of the cross-sectional area can be achieved by the housing through-passages 240 which are arranged in the border region 242. As in the connection module 100, the incomplete coverage of the cross-sectional area can be achieved by way of the dimensions of a module in the first and/or the second direction 5, 6 being smaller than the dimensions which the stator module 2 has in the plane of the module in question.

The only incomplete coverage of the cross-sectional areas of the stator module 2 in the planes of the connection module 100, of the sensor module 200 and of the power module 300 render it possible to realize a thermally conductive connection between the stator unit 400 on the top side 8 of the stator module 2 or the base surface 401 of the stator unit and the bearing surface 503 on the bottom side 9 of the stator module 2. In this case, the thermally conductive connection can be established by contact surfaces of large surface area.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

TABLE 1

| List of Reference Numerals: 100-330 | |
|---|---|
| 100 | Connection module |
| 102 | Conversion unit |
| 104 | Energy storage device |
| 106 | Insulation unit |
| 108 | Transmission unit |
| 110 | Module covering |
| 111 | Aperture |
| 112 | Fan |
| 120 | First connecting line |
| 121 | First coupling element |
| 122 | Second coupling element |
| 125 | Second connecting line |
| 126 | First coupling element |
| 127 | Second coupling element |
| 128 | Drive energy line |
| 129 | Operating energy line |
| 130 | Intermediate circuit |
| 131 | Intermediate circuit storage device |
| 132 | Data line |
| 133 | Intermediate circuit voltage |
| 161 | First outer edge |
| 162 | Second outer edge |
| 163 | First inner edge |
| 164 | Second inner edge |
| 171 | First outer edge |
| 172 | Second outer edge |
| 173 | First inner edge |
| 174 | Second inner edge |
| 181 | First outer edge |
| 182 | Second outer edge |
| 183 | First inner edge |
| 184 | Second inner edge |
| 191 | First outer edge |
| 192 | Second outer edge |
| 193 | First inner edge |
| 194 | Second inner edge |
| 200 | Sensor module |
| 202 | First processing unit |
| 204 | Second processing unit |
| 206 | Position-detecting unit |
| 210 | Drive control unit |
| 212 | Connecting unit |
| 214 | Position-processing unit |
| 216 | Energy-generating unit |
| 220 | Connecting cutout |
| 230 | Third connecting line |
| 231 | First coupling element |
| 232 | First mating element |
| 233 | Second coupling element |
| 234 | Second mating element |
| 235 | Third coupling element |
| 236 | Third mating element |

TABLE 1-continued

List of Reference Numerals: 100-330

| | |
|---|---|
| 237 | Fourth coupling element |
| 238 | Fourth mating element |
| 239 | Control line |
| 240 | Housing through-passage |
| 241 | Web |
| 242 | Border region |
| 243 | Central region |
| 250 | Supply line |
| 251 | First portion |
| 252 | Second portion |
| 253 | Feed line |
| 265 | Insulation layer |
| 300 | Power module |
| 302 | Current sensor |
| 304 | Temperature sensor |
| 306 | Current-generating unit |
| 310 | Fourth connecting line |
| 311 | First connection arrangement |
| 312 | Second connection arrangement |
| 313 | Third connection arrangement |
| 314 | Fourth connection arrangement |
| 315 | First contact |
| 316 | Second contact |
| 317 | Third contact |
| 318 | Fourth contact |
| 320 | First module unit |
| 321 | First connection |
| 322 | Second module unit |
| 323 | Second connection |
| 324 | Third module unit |
| 325 | Third connection |
| 326 | Fourth module unit |
| 327 | Fourth connection |
| 330 | Drive current line |

TABLE 2

List of Reference Numerals: 400-552

| | |
|---|---|
| 400 | Stator unit |
| 401 | Base surface |
| 402 | Coil conductor |
| 411 | First stator sector |
| 412 | Second stator sector |
| 413 | Third stator sector |
| 414 | Fourth stator sector |
| 420 | Cruciform contact arrangement |
| 421 | First contact structure |
| 422 | Second contact structure |
| 423 | Third contact structure |
| 424 | Fourth contact structure |
| 430 | First stator layer |
| 431 | Second stator layer |
| 432 | Third stator layer |
| 433 | Fourth stator layer |
| 500 | Module housing |
| 503 | Bearing surface |
| 510 | Housing cover |
| 511 | Cutout |
| 512 | Border at the bottom side of the housing cover |
| 513 | Border at the top side of the housing cover |
| 514 | Installation space for the power module |
| 516 | Filling opening |
| 517 | Further filling openings |
| 520 | Housing base |
| 521 | First connecting opening |
| 522 | Second connecting opening |
| 523 | Third connecting opening |
| 524 | Fourth connecting opening |
| 525 | Fifth connecting opening |
| 526 | Sixth connecting opening |
| 527 | Seventh connecting opening |
| 528 | Base surface |
| 529 | Cutout |
| 530 | Thermally conductive structure |

TABLE 2-continued

List of Reference Numerals: 400-552

| | |
|---|---|
| 534 | Surface of the housing base |
| 540 | Thermally conductive element |
| 541 | Upper surface |
| 542 | Border region |
| 543 | Central region |
| 544 | Intermediate space |
| 551 | Top side of the module housing |
| 552 | Bottom side of the module housing |

The invention claimed is:

1. A stator module for electromagnetically driving a rotor of a planar drive system
comprising a connection module which is designed to provide drive energy,
comprising a power module which has a current-generating unit which is designed to generate a drive current, which drives the rotor, from the drive energy,
a stator unit which has a coil conductor, to which the drive current can be applied, for generating a magnetic field which drives the rotor, and
a sensor module which has a position-detecting unit which is designed to detect a position of the rotor over a sensor unit,
wherein the sensor module is arranged in a module housing and the module housing encloses the sensor module,
wherein the stator unit and the power module are arranged on a top side of the module housing,
wherein the connection module is arranged on a bottom side of the module housing, which bottom side is situated opposite the top side,
wherein the current-generating unit of the power module and the connection module are connected via a drive energy line for transmitting the provided drive energy, and
wherein the drive energy line passes through the module housing and is designed in a manner electrically insulated from the sensor module in the module housing.

2. The stator module as claimed in claim 1,
wherein the connection module is designed to provide the current-generating unit with operating energy for generating the drive current from the drive energy,
wherein the connection module and the current-generating unit are connected via an operating energy line for transmitting the provided operating energy, and
wherein the operating energy line passes through the module housing and is designed in a manner electrically insulated from the sensor module in the module housing.

3. The stator module as claimed in claim 1,
wherein the stator module is designed to provide supply energy for operating the position-detecting unit,
wherein the power module and the sensor module are connected to one another via a supply line for providing the supply energy, and
wherein a portion of the supply line is passed from the power module, through the top side of the module housing, to the sensor module in the module housing.

4. The stator module as claimed in claim 1,
wherein the sensor module comprises a drive control unit which is designed to generate a control signal for controlling the current-generating unit, and
wherein the drive control unit is connected to the current-generating unit of the power module via a control line, which is passed through the top side of the module housing, for transmitting the control signal.

5. The stator module as claimed in claim 4,
wherein the drive control unit is designed to exchange control data for actuating the current-generating unit via the data line and the external data network, and
wherein the drive control unit and a position-processing unit are designed to communicate via an external data network as independent communication subscribers in each case.

6. The stator module as claimed in claim 1,
wherein the connection module is designed to be connected to an external data network,
wherein the sensor module has a position-processing unit which is designed to exchange an item of position information of the rotor, which item of position information is obtained from the position-detecting unit, via the external data network,
wherein the connection module and the external data network is connected to the position-processing unit of the sensor module via a data line for exchanging the items of position information, and
wherein the data line is passed from the connection module, through the bottom side of the module housing, to the sensor module.

7. The stator module as claimed in claim 1,
comprising an intermediate circuit in order to provide the drive energy as DC voltage by an intermediate circuit voltage,
wherein the current-generating unit is connected to the intermediate circuit and is designed to generate the drive current from the intermediate circuit voltage as an inverter, and
wherein the intermediate circuit is arranged on the power module, the drive energy line and the connection module.

8. The stator module as claimed in claim 7,
wherein the connection module comprises a conversion unit, and
wherein the conversion unit is connected to the intermediate circuit and is designed to generate the intermediate circuit voltage from electrical supply energy, which is provided via an external energy supply line, as a rectifier.

9. A stator module for electromagnetically driving a rotor of a planar drive system
comprising a connection module which is designed to provide drive energy,
comprising a power module which has a current-generating unit which is designed to generate a drive current, which drives the rotor, from the drive energy,
a stator unit which has a coil conductor, to which the drive current can be applied, for generating a magnetic field which drives the rotor, and
a sensor module which has a position-detecting unit which is designed to detect a position of the rotor over a sensor unit,
wherein the sensor module is arranged in a module housing and the module housing encloses the sensor module,
wherein the stator unit and the power module, which is arranged beneath the stator unit, are arranged on a top side on a housing cover of the module housing,
wherein the connection module is arranged on a bottom side on a housing base of the module housing, which bottom side is situated opposite the top side,
wherein the current-generating unit of the power module and the connection module are connected via a drive energy line for transmitting the provided drive energy, and
wherein the drive energy line passes through the module housing, extends from the connection module, through the housing base, into the module housing, through a connecting cutout of the sensor module and through the housing cover, to the power module and is designed in a manner electrically insulated from the sensor module in the module housing.

10. The stator module as claimed in claim 9,
wherein the connection module is designed to provide the current-generating unit with operating energy for generating the drive current from the drive energy,
wherein the connection module and the current-generating unit are connected via an operating energy line for transmitting the provided operating energy, and
wherein the operating energy line passes through the module housing and is designed in a manner electrically insulated from the sensor module in the module housing.

11. The stator module as claimed in claim 9,
wherein the stator module is designed to provide supply energy for operating the position-detecting unit,
wherein the power module and the sensor module are connected to one another via a supply line for providing the supply energy, and
wherein a portion of the supply line is passed from the power module, through the top side of the module housing, to the sensor module in the module housing.

12. The stator module as claimed in claim 9,
wherein the sensor module comprises a drive control unit which is designed to generate a control signal for controlling the current-generating unit, and
wherein the drive control unit is connected to the current-generating unit of the power module via a control line, which is passed through the top side of the module housing, for transmitting the control signal.

13. The stator module as claimed in claim 9,
wherein the connection module is designed to be connected to an external data network,
wherein the sensor module has a position-processing unit which is designed to exchange an item of position information of the rotor, which item of position information is obtained from the position-detecting unit, via the external data network,
wherein the connection module and the external data network is connected to the position-processing unit of the sensor module via a data line for exchanging the items of position information, and
wherein the data line is passed from the connection module, through the bottom side of the module housing, to the sensor module.

14. The stator module as claimed in claim 13,
wherein the drive control unit is designed to exchange control data for actuating the current-generating unit via the data line and the external data network, and
wherein the drive control unit and the position-processing unit are designed to communicate via the external data network as independent communication subscribers in each case.

15. The stator module as claimed in claim 9,
comprising an intermediate circuit in order to provide the drive energy as DC voltage by an intermediate circuit voltage, wherein the current-generating unit is connected to the intermediate circuit and is designed to generate the drive current from the intermediate circuit voltage as an inverter, and wherein the intermediate circuit is arranged on the power module, the drive energy line and the connection module.

16. The stator module as claimed in claim 15, wherein the connection module comprises a conversion unit, and wherein the conversion unit is connected to the intermediate circuit and is designed to generate the intermediate circuit voltage from electrical supply energy, which is provided via an external energy supply line, as a rectifier.

* * * * *